(12) United States Patent
Kim et al.

(10) Patent No.: US 10,318,821 B2
(45) Date of Patent: Jun. 11, 2019

(54) DRIVER ASSISTANCE FOR A VEHICLE

(71) Applicant: LG ELECTRONICS INC., Seoul (KR)

(72) Inventors: Jeongsu Kim, Seoul (KR); Hyeonju Bae, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/081,342

(22) Filed: Mar. 25, 2016

(65) Prior Publication Data

US 2016/0318523 A1    Nov. 3, 2016

(30) Foreign Application Priority Data

Apr. 30, 2015 (KR) .................. 10-2015-0061846

(51) Int. Cl.
    *B60W 30/18*      (2012.01)
    *B60W 50/00*      (2006.01)
    (Continued)

(52) U.S. Cl.
    CPC ............ *G06K 9/00791* (2013.01); *B60R 1/00* (2013.01); *B60W 30/18018* (2013.01); *B60W 30/18154* (2013.01); *F02N 11/0837* (2013.01); *B60K 37/02* (2013.01); *B60K 2350/1072* (2013.01); *B60K 2350/1096* (2013.01); *B60K 2350/905* (2013.01); *B60R 2300/105* (2013.01); *B60R 2300/205* (2013.01); *B60R 2300/307* (2013.01); *B60W 2050/0095* (2013.01); *B60W 2420/42* (2013.01); *B60W 2550/22* (2013.01); *B60W 2550/402* (2013.01); *B62D 15/0285* (2013.01);
(Continued)

(58) Field of Classification Search
None
See application file for complete search history.

(56) References Cited

U.S. PATENT DOCUMENTS

| | | |
|---|---|---|
| 2007/0041614 A1 | 2/2007 | Tanji |
| 2012/0143468 A1* | 6/2012 | Kim .................. F02N 11/0833 701/102 |

(Continued)

FOREIGN PATENT DOCUMENTS

| | | |
|---|---|---|
| CN | 103670737 | 3/2014 |
| CN | 104279109 | 1/2015 |

(Continued)

OTHER PUBLICATIONS

Machine translation of JP 2014-195195.*

(Continued)

*Primary Examiner* — Navid Ziaeianmehdizadeh
(74) *Attorney, Agent, or Firm* — Fish & Richardson P.C.

(57) ABSTRACT

Disclosed are systems and techniques for automated driver assistance in a vehicle having an Idle Stop and Go (ISG) function that controls an engine of the vehicle. A driver assistance apparatus includes at least one object detection sensor configured to acquire an image of a view ahead of the vehicle or a view around the vehicle, and a processor configured to detect information from the acquired image. The processor determines navigation information related to the vehicle, and provides a control signal to enable or disable the ISG function based on at least one of the information detected from the acquired image or the navigation information.

32 Claims, 58 Drawing Sheets

(51) Int. Cl.
  *G06K 9/00* (2006.01)
  *B60R 1/00* (2006.01)
  *F02N 11/08* (2006.01)
  *B60K 37/02* (2006.01)
  *G08G 1/14* (2006.01)
  *B62D 15/02* (2006.01)
  *G01C 21/36* (2006.01)

(52) U.S. Cl.
  CPC ..... *F02N 11/0822* (2013.01); *F02N 2200/123* (2013.01); *F02N 2200/124* (2013.01); *F02N 2200/125* (2013.01); *F02N 2300/2011* (2013.01); *G01C 21/3602* (2013.01); *G01C 21/3667* (2013.01); *G08G 1/146* (2013.01)

(56) References Cited

U.S. PATENT DOCUMENTS

| | | |
|---|---|---|
| 2013/0033601 A1 | 2/2013 | Kim et al. |
| 2013/0191005 A1* | 7/2013 | Hrovat ............... F02N 11/0837 701/102 |
| 2014/0222324 A1* | 8/2014 | Muetzel ............... G08G 1/0116 701/118 |
| 2014/0343830 A1 | 11/2014 | Elwart et al. |
| 2015/0105999 A1 | 4/2015 | Sangameswaran et al. |
| 2016/0176341 A1* | 6/2016 | Raghu ............... G06K 9/00798 348/148 |

FOREIGN PATENT DOCUMENTS

| | | |
|---|---|---|
| DE | 10200785 | 7/2003 |
| DE | 102012217076 | 4/2013 |
| EP | 2567875 | 3/2013 |
| JP | 2004-326730 | 11/2004 |
| JP | 2010-195195 | 9/2010 |
| JP | 2012-116299 | 6/2012 |
| JP | 2014-105661 | 6/2014 |
| JP | 2014-194194 | 10/2014 |
| KR | 10-2013-0015242 | 2/2013 |
| KR | 10-2014-0051573 | 5/2014 |

OTHER PUBLICATIONS

Machine translation of JP 2012-116299.*
Machine translation of JP 2004-326730.*
Extended European Search Report issued in European Application No. 16164197.2 dated Oct. 4, 2016, 12 pages.
Korean Office Action, with Translation; dated Feb. 22, 2016.
Korean Notice of Allowance, with Translation; dated Jul. 29, 2016.
CN Office Action in Chinese Application No. 201610223447.4, dated Aug. 1, 2018, 19 pages (with English Translation).

* cited by examiner

DRIVER ASSISTANCE FOR A VEHICLE

CROSS-REFERENCE TO RELATED APPLICATION

Pursuant to 35 U.S.C. § 119(a), this application claims the benefit of an earlier filing date and right of priority to Korean Patent Application No. 10-2015-0061846, filed on Apr. 30, 2015 in the Korean Intellectual Property Office, the disclosure of which is incorporated herein by reference.

TECHNICAL FIELD

The present application relates to driver assistance for a vehicle.

BACKGROUND

A vehicle is an apparatus that allows a user who gets thereinto to move the apparatus in a desired direction. A representative example of the vehicle may be an automobile.

In order to improve the convenience of a user who uses a vehicle, a vehicle is typically provided with various sensors and electronic devices. In particular, for example, various devices for user driving convenience have been developed.

As interest in self-driving cars has increased, there has been research on sensors installed in the self-driving cars. The sensors installed in self-driving cars may include object detection sensors, for example, a camera, an infrared sensor, a radar, a GPS, LiDAR, and a gyroscope. Thereamong, the camera may perform important functions as a sensor to detect objects or environmental conditions around a vehicle.

Some vehicles are equipped with an Idle Stop and Go (ISG) function. The ISG function is a function that automatically turns off the engine of a vehicle when the vehicle stops and automatically turns the engine back on when the vehicle starts. The ISG function may, for example, improve the fuel efficiency of the vehicle and reduce carbon dioxide emission by reducing idling of the vehicle.

SUMMARY

Systems and techniques are disclosed that enable a driver assistance apparatus to adaptively enable or disable an Idle Stop-and-Go (ISG) function based on detected road situations.

In one aspect, a driver assistance apparatus may be included in a vehicle having an Idle Stop and Go (ISG) function that controls an engine of the vehicle. The driver assistance apparatus may include at least one object detection sensor configured to acquire sensor data external to the vehicle in a driving direction of the vehicle or around the vehicle. The driver assistance apparatus may also include a processor configured to detect information from the acquired sensor data; and provide a control signal to enable or disable the ISG function based on the information detected from the acquired sensor data.

In some implementations, the object detection sensor may be configured to acquire the image of the view ahead of the vehicle or the view around the vehicle by acquiring an image of at least one of a traffic light, a traffic sign, or a road surface. The processor may be configured to detect the information from the acquired image by detecting information regarding at least one of a traffic light, a traffic sign, or a road surface from the acquired image.

In some implementations, driver assistance apparatus may further include an interface unit configured to receive navigation information. The processor may be configured to provide the control signal to enable or disable the ISG function further based on the navigation information. The navigation information may include information regarding a location of the vehicle on a road.

In some implementations, the processor may be configured to detect the information from the acquired image by detecting information regarding an on-ramp on which the vehicle travels to join a main road. The processor may be further configured to determine that the vehicle slows down or temporarily stops while travelling on the on-ramp; and based on a determination that the vehicle slows down or temporarily stops while travelling on the on-ramp, provide a control signal to disable the ISG function.

In some implementations, the processor may be configured to detect the information regarding the on-ramp on which the vehicle travels to join a main road by detecting information from the traffic sign detected from the acquired image.

In some implementations, the processor may be further configured to detect a side portion of another vehicle from the acquired image, and the processor may be configured to detect the information regarding the on-ramp on which the vehicle travels to join a main road based on the detected side portion of the vehicle.

In some implementations, the driver assistance apparatus may further include an interface unit configured to receive the navigation information. The processor may be configured to detect the information regarding the on-ramp on which the vehicle travels to join a main road based on the navigation information.

In some implementations, the vehicle may be a Left Hand Drive (LHD) or a Right Hand Drive (RHD) vehicle, wherein the LHD vehicle is configured to join the main road from the on-ramp via a right-hand turn, and the RHD vehicle is configured to join the main road from the on-ramp via a left-hand turn.

In some implementations, the processor may be configured to provide the control signal to enable or disable the ISG function based on at least one of the information detected from the acquired image or the navigation information by: detecting temporary stop information based on the information detected from the acquired image, wherein the temporary stop information is detected from the traffic sign detected in the acquired image or from a stop line detected on the road surface detected in the acquired image; determining that the vehicle slows down or temporarily stops at the detected temporary stop information; and providing a control signal to disable the ISG function based on a determination that the vehicle slows down or temporarily stops at the detected temporary stop information.

In some implementations, the processor may be configured to provide the control signal to disable the ISG function based on the determination that the vehicle slows down or temporarily stops at the detected temporary stop information by providing the control signal at least a predetermined number of times.

In some implementations, the driver assistance apparatus may further include an interface unit configured to receive the navigation information. The processor may be further configured to determine, based on the navigation information, whether the vehicle travels on a road around a crossroad provided with no traffic light.

In some implementations, the processor may be further configured to determine that the vehicle is travelling on a local road, and the processor is configured to provide the control signal to disable the ISG function based on the determination that the vehicle slows down or temporarily stops at the detected temporary stop information and based on the determination that the vehicle is travelling on a local-access road.

In some implementations, the processor may be configured to determine that the vehicle is travelling on a local-access road by: determining that a lane is not detected on the road surface detected in the acquired image; and determining that the vehicle is travelling on a local-access road based on a determination that a lane is not detected on the road surface detected in the acquired image.

In some implementations, the driver assistance apparatus may further include an interface unit configured to receive the navigation information. The processor may be configured to determine whether the vehicle is travelling on a local-access road based on the navigation information.

In some implementations, the processor may be configured to provide the control signal to disable or enable the ISG function based on at least one of the information detected from the acquired image or the navigation information by: detecting go information based on the information detected from the acquired image, wherein the go information is detected from the traffic light detected in the acquired image; determining that the vehicle slows down or temporarily stops at a crossroad; and providing a control signal to disable the ISG function based on detecting the go information and based on a determination that the vehicle slows down or temporarily stops in front of the crossroad.

In some implementations, the processor may be further configured to detect that a preceding vehicle in the image of the view ahead of the vehicle is moving; and provide the control signal to disable the ISG function further based on detecting that the preceding vehicle is moving.

In some implementations, the driver assistance apparatus may further include an interface unit configured to receive the navigation information. The processor may be configured to provide the control signal to enable or disable the ISG function based on at least one of the information detected from the acquired image or the navigation information by: determining that the vehicle is traveling at a crossroad based on the image acquired by the object detection sensor or based on the navigation information, and providing a control signal to disable the ISG function based on a determination that the vehicle is traveling at the crossroad.

In some implementations, the processor may be configured to provide the control signal to enable or disable the ISG function based on at least one of the information detected from the acquired image or the navigation information by: determining that the vehicle is a LHD vehicle that slows down or temporarily stops for a right-turn, or that the vehicle is a RHD vehicle that slows down or temporarily stops for a left-turn; and providing a control signal to disable the ISG function based on a determination that the vehicle is a LHD vehicle that slows down or temporarily stops for a right-turn, or that the vehicle is a RHD vehicle that slows down or temporarily stops for a left-turn.

In some implementations, providing the control signal to disable the ISG function based on a determination that the vehicle is a LHD vehicle that slows down or temporarily stops for a right-turn, or that the vehicle is a RHD vehicle that slows down or temporarily stops for a left-turn further may include: determining that the traffic light detected in the acquired image includes a pedestrian traffic light; determining that the pedestrian traffic light indicates a pedestrian stop signal; and providing the control signal to disable the ISG function based on a determination that the pedestrian traffic light indicates a pedestrian stop signal.

In some implementations, the driver assistance apparatus may further include an interface unit configured to receive the navigation information or turn signal information. Determining that the vehicle is a LHD vehicle slowing down or temporarily stopping for a right-turn, or that the vehicle is a RHD vehicle slowing down or temporarily stopping for a left-turn may include: determining that the vehicle is traveling at a crossroad based on the image acquired by the object detection sensor or based on the navigation information; and determining that the vehicle is making a right-turn or a left-turn based on the navigation information or the turn-signal information, and based on a determination that the vehicle is traveling at a crossroad.

In some implementations, the processor may be configured to provide the control signal enable or disable the ISG function based on at least one of the information detected from the acquired image or the navigation information by: detecting a preceding vehicle in the image of the view ahead of the vehicle; detecting that a stop lamp of the detected preceding vehicle is in an ON state; and providing a control signal to enable the ISG function based on detecting that the stop lamp of the detected preceding vehicle is in the ON state.

In some implementations, the processor may be configured to provide the control signal to enable or disable the ISG function based on at least one of the information detected from the acquired image or the navigation information by: determining that the vehicle is in a parking situation; and providing a control signal to disable the ISG function based on a determination that the vehicle is in a parking situation.

In some implementations, determining that the vehicle is in a parking situation may include: detecting parking lot information from the detected traffic sign or the detected road surface in the acquired image; and determining that the vehicle is in a parking situation based on the detected parking lot information.

In some implementations, detecting parking lot information from the detected traffic sign or the detected road surface in the acquired image may include: detecting a parking space on the road surface detected in the acquired image; and detecting the parking lot information based on the detected parking space.

In some implementations, the driver assistance apparatus may further include an interface unit configured to receive vehicle speed information, steering wheel rotation angle information, or gearshift information. Determining that the vehicle is in a parking situation may include: determining whether a parking operation is performed based on the vehicle speed information, the steering wheel rotation angle information, or the gearshift information, and determining that the vehicle is in a parking situation based on a determination of whether a parking operation is performed.

In some implementations, the driver assistance apparatus may further include an interface unit configured to receive user input that initiates an automated parking mode. Determining that the vehicle is in a parking situation may be based on a received user input that initiates an automated parking mode.

In some implementations, determining that the vehicle is in a parking situation may include: determining that the vehicle is located in a parking lot based on the navigation information; and determining that the vehicle is in a parking situation based on a determination that the vehicle is located in a parking lot.

In some implementations, the processor may be configured to provide the control signal to enable or disable the ISG function based on at least one of the information detected from the acquired image or the navigation information by: determining that the vehicle is an LHD vehicle slowing down or temporarily stopping for an unprotected left-turn or that the vehicle is an RHD vehicle slowing down or temporarily stopping for an unprotected right-turn; and providing a control signal to disable the ISG function based on a determination that the vehicle is an LHD vehicle slowing down or temporarily stopping for an unprotected left-turn or that the vehicle is an RHD vehicle slowing down or temporarily stopping for an unprotected right-turn.

In some implementations, the driver assistance apparatus may further include an interface unit configured to receive the navigation information or turn signal information. Determining that the vehicle is an LHD vehicle slowing down or temporarily stopping for an unprotected left-turn or that the vehicle is an RHD vehicle slowing down or temporarily stopping for an unprotected right-turn may be based on at least one of a traffic sign detected from the image, the navigation information, or the turn signal information.

In some implementations, the processor may be configured to provide the control signal to enable or disable the ISG function based on at least one of the information detected from the acquired image or the navigation information by: determining that the traffic light detected in the acquired image includes a pedestrian traffic light; determining that the pedestrian traffic light indicates a pedestrian go signal; determining that the vehicle is an LHD vehicle making an unprotected left-turn or that the vehicle is an RHD vehicle making an unprotected right-turn; and providing a control signal to disable the ISG function based on determining that the pedestrian traffic light indicates a pedestrian go signal and based on determining that the vehicle is an LHD vehicle making an unprotected left-turn or that the vehicle is an RHD vehicle making an unprotected right-turn.

In some implementations, the processor may be configured to provide the control signal to enable or disable the ISG function based on at least one of the information detected from the acquired image or the navigation information by: determining that the vehicle slows down or temporarily stops for a left-turn in a center left-turn lane; and providing a control signal to disable the ISG function based on a determination that the vehicle slows down or temporarily stops for a left-turn in a center left-turn lane.

In some implementations, determining that the vehicle slows down or temporarily stops for a left-turn in a center left-turn lane may include: detecting a center left-turn lane in the acquired image; and determining whether the vehicle is located in a center left-turn lane based on detecting the center left-turn lane in the acquired image.

In some implementations, the driver assistance apparatus may further include an interface unit configured to receive turn signal information. The processor may be configured to provide the control signal to enable or disable the ISG function based on at least one of the information detected from the acquired image or the navigation information by: determining that turn signal information has been received for a left-turn in a state in which a center left-turn lane is detected in the acquired image; and providing a control signal to disable the ISG function based on a determination that turn signal information has been received for a left-turn in a state in which a center left-turn lane is detected in the acquired image.

In some implementations, the driver assistance apparatus may further include an interface unit configured to receive traffic light change information acquired from an external server. The processor may be configured to provide the control signal to enable or disable the ISG function based on at least one of the information detected from the acquired image or the navigation information by: providing a control signal to disable the ISG function based on the information detected from the acquired image and based on the traffic light change information acquired from the external server.

In some implementations, the object detection sensor may be configured to acquire the image of the view ahead of the vehicle or the view around the vehicle by acquiring an image of a pedestrian at crosswalk. The processor may be configured to detect the information from the acquired image by detecting information regarding the pedestrian at the crosswalk from the acquired image.

In some implementations, the object detection sensor may be configured to acquire the image of the view ahead of the vehicle or the view around the vehicle by acquiring an image of another vehicle. The processor may be configured to detect the information from the acquired image by detecting information regarding the another vehicle from the acquired image.

All or part of the features described throughout this application can be implemented as a computer program product including instructions that are stored on one or more non-transitory machine-readable storage media, and that are executable on one or more processing devices. All or part of the features described throughout this application can be implemented as an apparatus, method, or electronic system that can include one or more processing devices and memory to store executable instructions to implement the stated functions.

The details of one or more implementations are set forth in the accompanying drawings and the description below. Other features will be apparent from the description and drawings, and from the claims. The description and specific examples below are given by way of illustration only, and various changes and modifications will be apparent.

DETAILED DESCRIPTION

Figure 1:
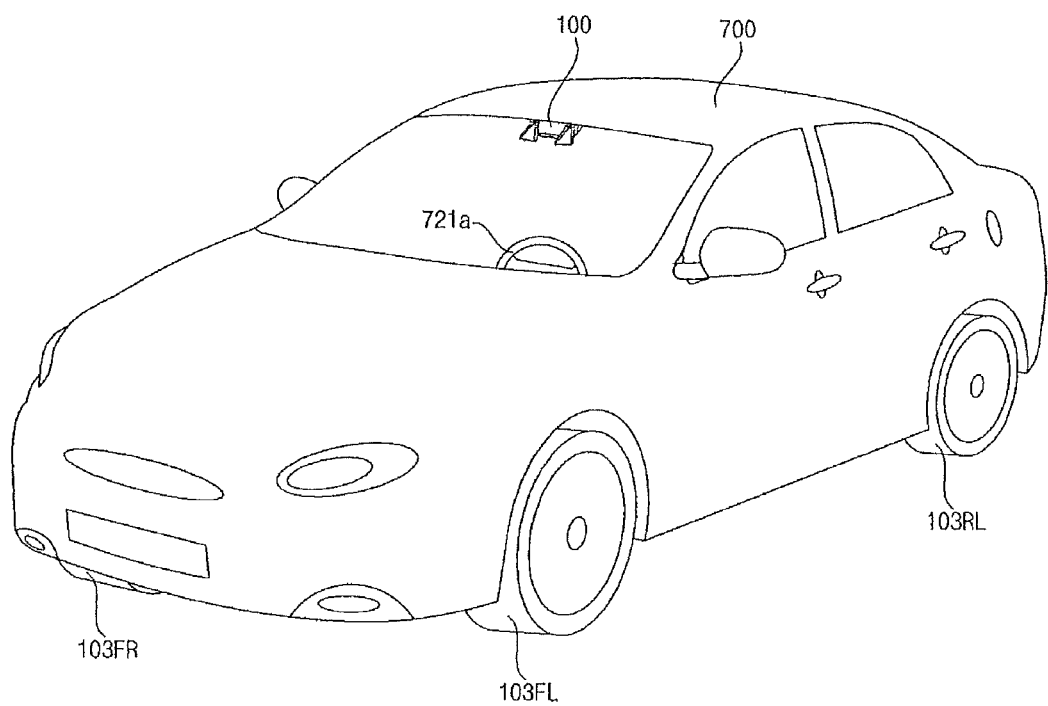
FIG. 1 is a diagram illustrating an example of a vehicle provided with a driver assistance apparatus.

In some scenarios, a vehicle may include an ISG function that automatically turns the engine of the vehicle on or off based on factors such as, for example, vehicle speed, accelerator pedal input, and brake pedal input. For example, through use of the ISG function, a vehicle stops operation of a power source to automatically turn off the engine during traveling in response to an input to a brake pedal in a state in which a vehicle speed is a reference speed or less and there is no input to an accelerator pedal. In addition, through use of the ISG function, the vehicle again operates the power source to automatically turn on the engine when there is an input to the accelerator pedal and no input to the brake pedal. The ISG function may improve fuel efficiency and reduce carbon dioxide emission.

However, in such scenarios, the ISG function may not take into account road situations, such as surrounding vehicles, traffic information, traffic lights/signs, or other conditions around a vehicle. As such, the ISG function may automatically turn the engine of the vehicle on or off at inappropriate times, causing delay and inefficiencies.

Systems and techniques are disclosed herein that enable a driver assistance apparatus to adaptively enable or disable an Idle Stop-and-Go (ISG) function based on detected road situations. By adaptively enabling or disabling the ISG function based on detected road situations, the driver assistance apparatus is able to account for conditions around the vehicle to reduce inefficiency and delays caused by the ISG function turning on or off the engine of the vehicle at inappropriate times.

Various types of information may be detected from the surroundings of a vehicle, and such information may be used by the driver assistance apparatus to enable or disable an ISG function. For example, information regarding movement of surrounding vehicles, traffic lights or signs, road conditions, etc., may be automatically detected by one or more sensors in the vehicle, and such information may be used by the driver assistance apparatus to enable or disable the ISG function.

As such, the driver assistance apparatus may improve the efficiency of the vehicle (e.g., by enabling the ISG function to turn the engine off when appropriate) while avoiding unnecessary delays (e.g., by disabling the ISG function to leave the engine on when appropriate).

A vehicle as described in this application may include a car or a motorcycle, but implementations are not necessarily limited thereto, and may generally include any suitable vehicle that transports people. Hereinafter, a description will be given based on a car.

In addition, a vehicle as described in this application may include an internal combustion engine vehicle including an engine as a power source, a hybrid vehicle including both an engine and an electric motor as a power source, an electric vehicle including an electric motor as a power source, or generally a vehicle that is motorized by any suitable power source.

In the following description, the left-hand side of a vehicle refers to the left-hand side in a direction of travel of the vehicle, and a right-hand side of a vehicle refers to a right-hand side in a direction of travel of the vehicle.

A left-hand drive (LHD) vehicle refers to a vehicle in which a driver's seat is located at the left-hand side of the vehicle. A right-hand drive (RHD) vehicle refers to a vehicle in which a driver's seat is located at the right-hand side of the vehicle. LHD vehicles are used in countries where vehicles travel on a right-hand side of two-way traffic, and RHD vehicles are used in countries where vehicles travel on a left-hand side of two-way traffic.

The following description will be given based on a Left Hand Drive (LHD) vehicle unless mentioned otherwise.

Furthermore, in the following description, "turning off the ISG function" refers to disabling the ISG function, such that the engine of the vehicle functions as if it were not controlled by the ISG function. Conversely, "turning on the ISG function" refers to enabling the ISG function, such that the engine of the vehicle is automatically turned on or off by the ISG function.

FIG. 1 is a view illustrating an outer appearance of a vehicle provided with a driver assistance apparatus.

Referring to FIG. 1, the vehicle 700 may include wheels 103FR, 103FL, 103RL . . . that are rotated by a power source, a steering input unit 721a to adjust the direction of travel of the vehicle 700, and a driver assistance apparatus 100 provided in the vehicle 700.

The vehicle 700 as described in the present application has an Idle Stop and Go (ISG) function.

The driver assistance apparatus 100 is configured to acquire various images related to the vehicle travel. For example, the driver assistance apparatus 100 may acquire an image of a view ahead of the vehicle (a forward image) or an image of a view around the vehicle (an around view image) for the vehicle 700. Based on the acquired image(s), the driver assistance apparatus 100 may detect information from the acquired image, and provide a control signal to turn the ISG function on or off based on the detected information, thereby adaptively controlling the ISG function according to various complex road situations. The control signal may be output to a controller (770 in FIG. 7) and the controller (770 in FIG. 7) may control the ISG function based on the control signal.

Figure 3A:
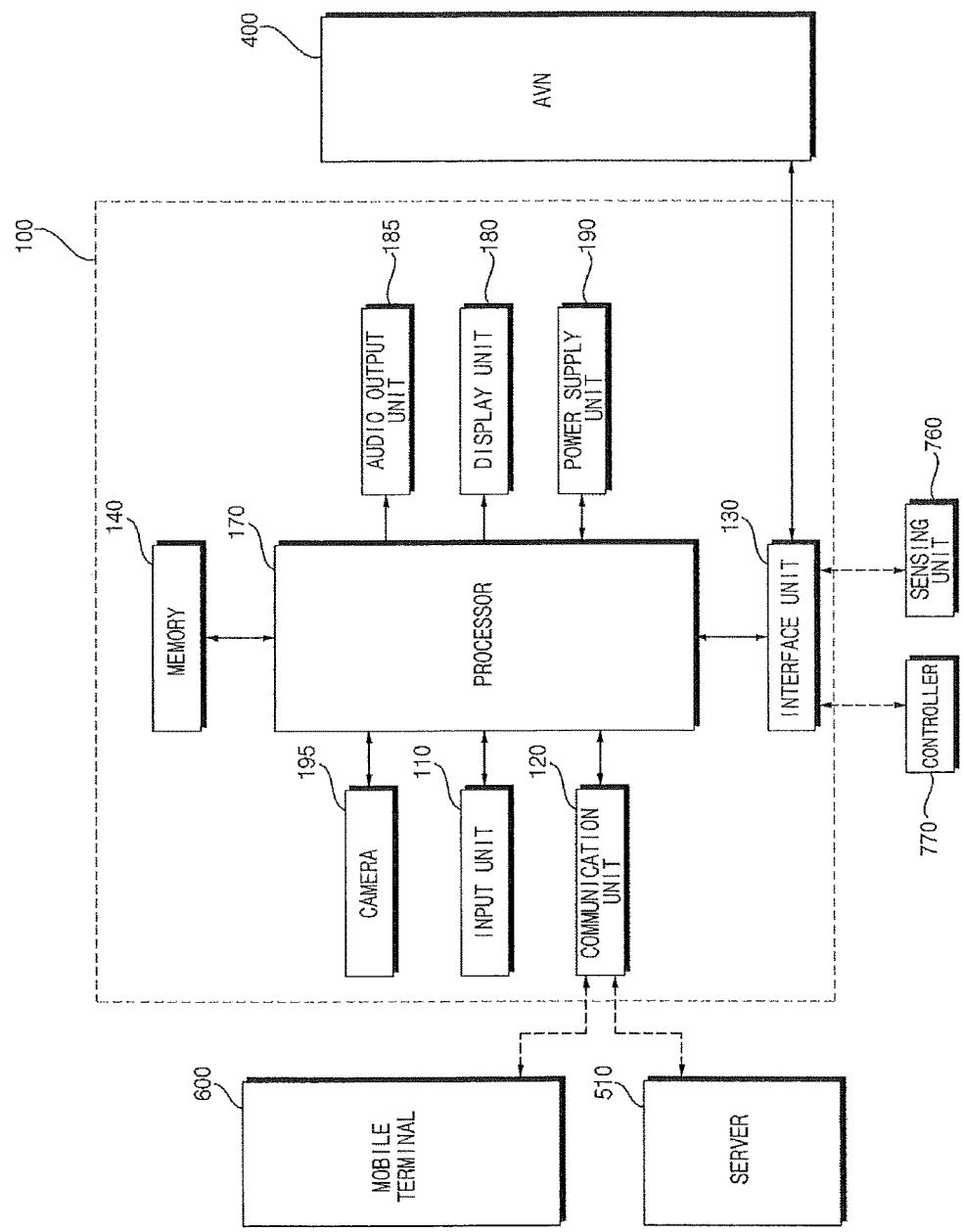
FIGS. 3A to 3C are internal block diagrams illustrating various examples of a driver assistance apparatus.
Figure 3B:
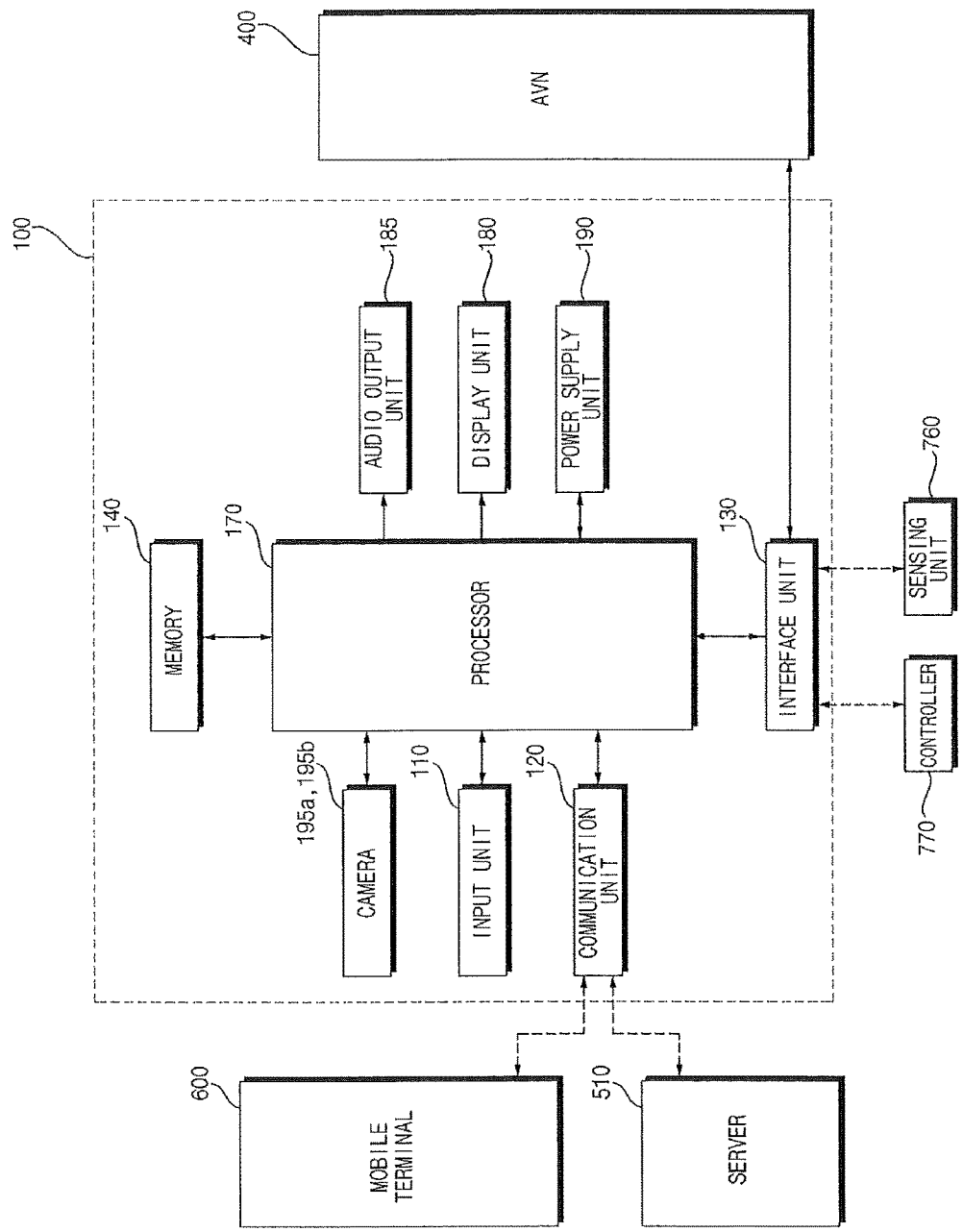

The driver assistance apparatus 100 may include at least one object detection sensor such as a camera, and an image acquired by the camera may be signal-processed in a processor (170 in FIGS. 3A and 3B).

The drawings illustrate the driver assistance apparatus 100 including two cameras.

Figure 2A:
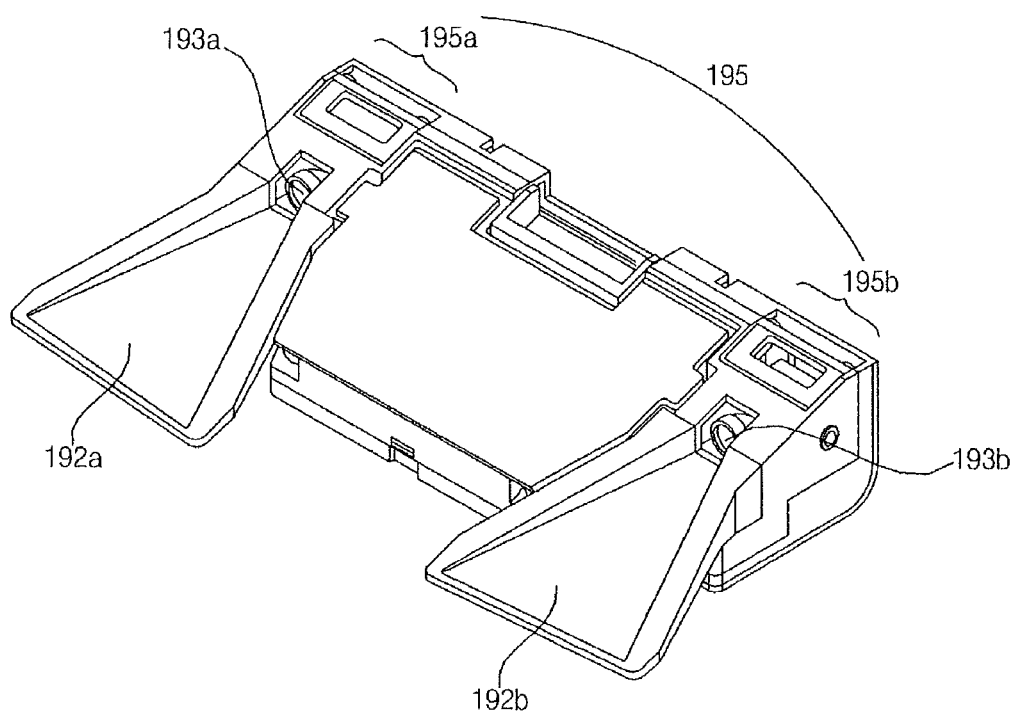
FIGS. 2A to 2C are diagrams illustrating examples of cameras attached to a vehicle.
Figure 2B:
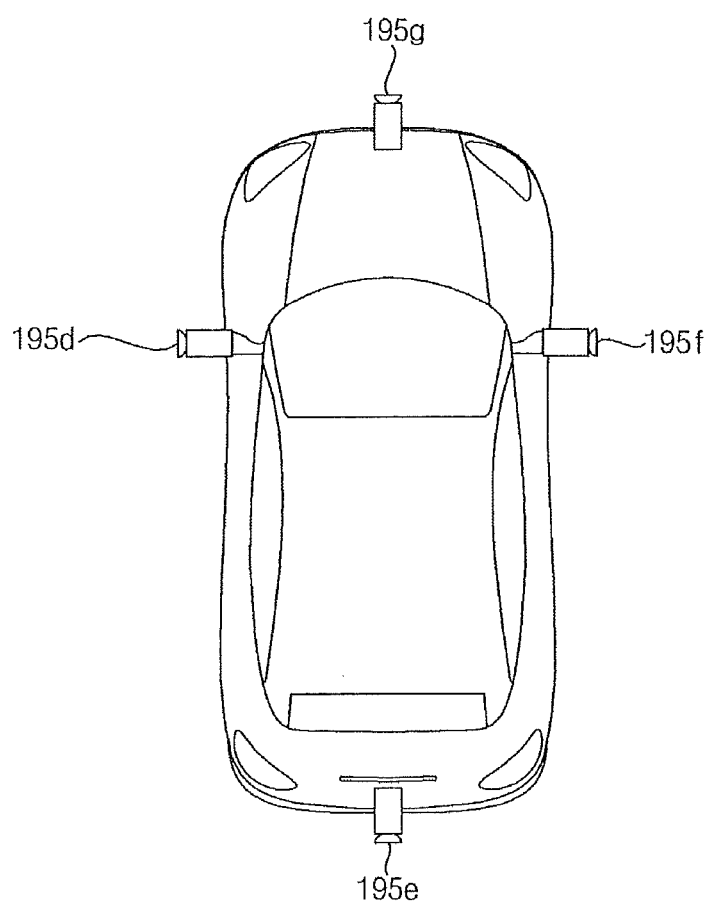
Figure 2C:
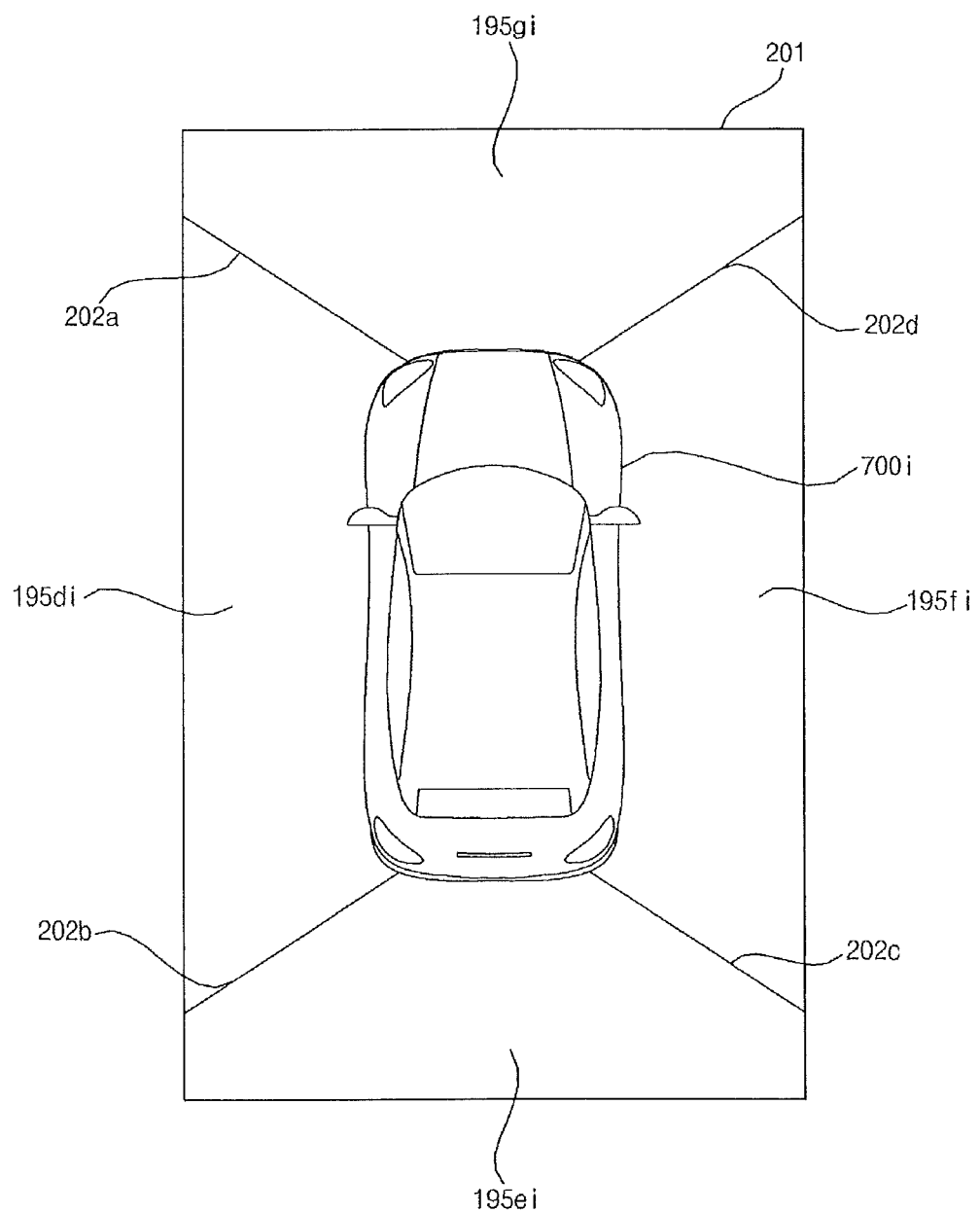

FIGS. 2A to 2C are views referenced to explain cameras attached to the vehicle of FIG. 1.

First, the driver assistance apparatus 100 including cameras 195a and 195b to capture a forward image based on a view in front of the vehicle will be described with reference to FIG. 2A.

Although FIG. 2A illustrates the driver assistance apparatus 100 as including two cameras, note that implementations are not limited as to the number of cameras.

Referring to FIG. 2A, the driver assistance apparatus 100 may include a first camera 195a having a first lens 193a and a second camera 195b having a second lens 193b. In this case, these cameras 195 may be referred to as stereo cameras.

The driver assistance apparatus 100 may further include a first light shield 192a and a second light shield 192b, which shield light introduced to the first lens 193a and the second lens 193b.

The driver assistance apparatus 100 of FIG. 2A may have a structure for attachment or detachment to or from the ceiling or windshield of the vehicle 700.

The driver assistance apparatus 100 as described above may acquire stereo images for a forward view of the vehicle from the first and second cameras 195a and 195b, perform binocular disparity detection based on the stereo images, perform object detection for at least one stereo image based on binocular disparity information, and continuously track movement of an object after object detection.

Now, the driver assistance apparatus 100 including cameras 195d, 195e, 195f and 195g to acquire an around view image of the vehicle will be described with reference to FIGS. 2B and 2C.

Although FIGS. 2B and 2C illustrate the driver assistance apparatus 100 as including four cameras, note that implementations are not limited as to the number of cameras.

Referring to FIGS. 2B and 2C, the driver assistance apparatus 100 may include a plurality of cameras 195d, 195e, 195f and 195g. In this case, these cameras 195 may be referred to as around view cameras.

The cameras 195d, 195e, 195f and 195g may be located respectively at the left side, the rear side, the right side, and the front side of the vehicle.

The left camera 195d may be located in the interior of a case enclosing a left side view mirror. Alternatively, the left camera 195d may be located at the exterior of the case enclosing the left side view mirror. Yet alternatively, the left camera 195d may be located at a region of the exterior of a left front door, a left rear door, or a left fender.

The right camera 195f may be located in the interior of a case enclosing a right side view mirror. Alternatively, the right camera 195f may be located at the exterior of the case enclosing the right side view mirror. Yet alternatively, the right camera 195f may be located at a region at the exterior of a right front door, a right rear door, or a right fender.

The rear camera 195e may be located near a rear license plate or a trunk switch.

The front camera 195g may be located near an emblem or a radiator grill.

Respective images captured by the cameras 195d, 195e, 195f and 195g may be transmitted to the processor 170 and the processor 170 may combine the images to create an around view image of the vehicle.

FIG. 2C illustrates one example of the around view image of the vehicle. The around view image 201 may include a first image region 195di captured by the left camera 195d, a second image region 195ei captured by the rear camera 195e, a third image region 195fi captured by the right camera 195f, and a fourth image region 195gi captured by the front camera 195g.

Upon creation of an around view image from a plurality of the cameras, boundaries are generated between the respective image regions. These boundaries may be subjected to image blending, for natural display thereof.

Boundary lines 202a, 202b, 202c and 202d may be displayed at the boundaries between the respective image regions.

The around view image 201 may include a vehicle image 700i. Here, the vehicle image 700i may be an image created by the processor 170.

The around view image 201 may be displayed via a display unit 741 of the vehicle 700 or a display unit 180 of the driver assistance apparatus 100.

Figure 3C:
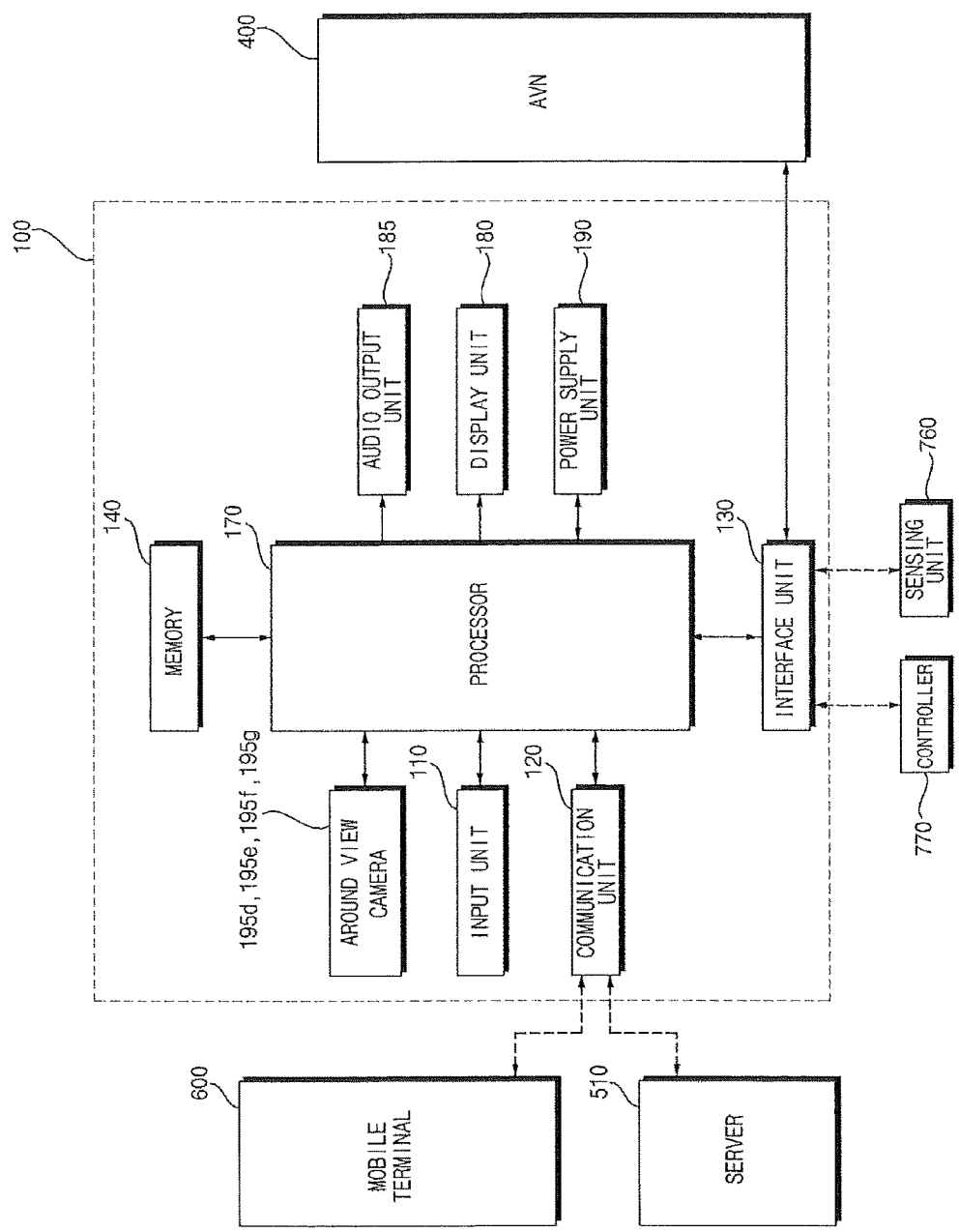

FIGS. 3A to 3C are internal block diagrams illustrating various examples of the driver assistance apparatus.

The driver assistance apparatus 100 of FIGS. 3A and 3B may generate vehicle associated information via computer vision based signal processing of an image received from the camera 195. Here, the vehicle associated information may include vehicle control information for direct control of the vehicle or driver assistance information to guide a vehicle driver during traveling.

Here, the camera 195 may be a monocular camera. Alternatively, the camera 195 may be stereo cameras 195a and 195b that capture a forward image of the vehicle. Yet alternatively, the camera 195 may be around view cameras 195d, 195e, 195f and 195g that capture an around view image of the vehicle.

FIG. 3A is an internal block diagram of the driver assistance apparatus 100.

Referring to FIG. 3A, the driver assistance apparatus 100 may include an input unit 110, a communication unit 120, an interface unit 130, a memory 140, a processor 170, a power supply unit 190, a camera 195, a display unit 180, and an audio output unit 185.

The input unit 110 may include a plurality of buttons or a touchscreen attached to the driver assistance apparatus 100, more particularly, to the camera 195. The driver assistance apparatus 100 may be powered on to operate via the buttons or the touchscreen. In addition, the input unit 110 may perform various input operations.

The communication unit 120 may exchange data with a mobile terminal 600 or a server 510 in a wireless manner. In particular, the communication unit 120 may exchange data with a mobile terminal of the driver in a wireless manner. Various wireless data communication protocols such as, for example, Bluetooth, Wi-Fi, Wi-Fi direct, APiX, and NFC may be used.

The communication unit 120 may receive weather information and road traffic state information such as, for example, Transport Protocol Expert Group (TPEG) information, from the mobile terminal 600 or the server 510. The communication unit 120 may transmit real-time information, acquired by the driver assistance apparatus 100, to the mobile terminal 600 or the server 510.

When a user gets into the vehicle 700, the mobile terminal 600 of the user may pair with the driver assistance apparatus 100 automatically or as the user executes an application.

The communication unit 120 may receive traffic light change information from the external server 510. Here, the external server 510 may be a server located in a traffic control center.

The interface unit 130 may receive vehicle associated data, or externally transmit signals processed or created by the processor 170. To this end, the interface unit 130 may perform data communication with, for example, the controller 770 inside the vehicle 700, an Audio Video Navigation (AVN) apparatus 400, and a sensing unit 760 in a wired or wireless communication manner.

The interface unit 130 may receive navigation information via data communication with the controller 770, the AVN apparatus 400, or a separate navigation apparatus. Here, the navigation information may include set destination information, destination based routing information, map information related to vehicle traveling, and vehicle's current location information. The navigation information may include information regarding a vehicle's location on a road.

The interface unit 130 may receive sensor information from the controller 770 or the sensing unit 760.

Here, the sensor information may include at least one selected from among vehicle travel direction information, vehicle location information (GPS information), vehicle angle information, vehicle speed information, vehicle acceleration information, vehicle tilt information, vehicle forward/backward movement information, battery information, fuel information, tire information, vehicle lamp information, vehicle interior temperature information, and vehicle interior humidity information.

The sensor information may be acquired from, for example, a heading sensor, a yaw sensor, a gyro sensor, a position module, a vehicle forward/backward movement sensor, a wheel sensor, a vehicle speed sensor, a vehicle body gradient sensor, a battery sensor, a fuel sensor, a tire sensor, a steering sensor based on the rotation of a steering wheel, a vehicle interior temperature sensor, and a vehicle interior humidity sensor. The position module may include a GPS module to receive GPS information.

Among the above-described sensor information, the vehicle travel direction information, the vehicle location information, the vehicle angle information, the vehicle speed information, and the vehicle tilt information, which are related to vehicle traveling, may be referred to as vehicle traveling information.

The interface unit 130 may receive turn-signal information. Here, the turn-signal information may be a turn-on signal of a turn signal for left-turn or right-turn input by the user. When an input to turn on a left or right turn signal is received via a user input unit (724 in FIG. 7) of the vehicle 700, the interface unit 130 may receive turn-signal information for left-turn or right-turn.

The interface unit 130 may receive vehicle speed information, steering wheel rotation angle information, or gearshift information. The interface unit 130 may receive vehicle speed information, steering wheel rotation angle information, or gearshift information sensed via the sensing unit 760 of the vehicle 700. Alternatively, the interface unit 130 may receive vehicle speed information, steering wheel rotation angle information, or gearshift information from the controller 770 of the vehicle 700. Gearshift information may be information regarding how a gearshift of the vehicle. For example, gearshift information may be information regarding which is the gearshift in any one of Park (P), Reverse (R), Neutral (N), and Drive (D) gears, and gears one through three.

The interface unit 130 may receive user input received via the user input unit 724 of the vehicle 700. The interface unit 130 may receive user input from the input unit 720 of the vehicle 700, or may receive user input by way of the controller 770.

The interface unit 130 may receive information acquired from the external server 510. The external server 510 may be a server located in a traffic control center. For example, when traffic light change information is received from the external server 510 via a communication unit (710 in FIG. 7) of the vehicle 700, the interface unit 130 may receive the traffic light change information from the controller (770 of FIG. 7).

The memory 140 may store various data for overall operation of the driver assistance apparatus 100 such as, for example, programs for processing or control of the processor 170.

The memory 140 may store data for object verification. For example, when a prescribed object is detected from an image captured by the camera 195, the memory 140 may store data to verify, using a prescribed algorithm, what the object corresponds to.

The memory 140 may store data related to traffic information. For example, when prescribed traffic information is detected from an image captured by the camera 195, the memory 140 may store data to verify, using a prescribed algorithm, what the traffic information corresponds to.

The memory 140 may be any one of various hardware storage devices such as, for example, a ROM, a RAM, an EPROM, a flash drive, and a hard drive.

The processor 170 controls overall operation of each unit inside the driver assistance apparatus 100.

The processor 170 may process a forward image or an around view image of the vehicle acquired by the camera 195. In particular, the processor 170 implements computer vision based signal processing. As such, the processor 170 may acquire a forward image or an around view image of the vehicle from the camera 195 and perform object detection and object tracking based on the image. In particular, the processor 170 may perform, for example, Lane Detection (LD), Vehicle Detection (VD), Pedestrian Detection (PD), Bright-spot Detection (BD), Traffic Sign Recognition (TSR), and road surface detection during object detection.

A traffic signal may be various types of information that may be transmitted to the driver of the vehicle 700. The traffic signal may be transmitted to the driver via a traffic light, a traffic sign, or a road surface. For example, the traffic signal may be a go signal or a stop signal for a vehicle or a pedestrian, which is output from a traffic light. For example, the traffic signal may be various pictures or text marked on a traffic sign. For example, the traffic signal may be various pictures or text marked on a road surface.

The processor 170 may detect information from a forward image or an around view image of the vehicle acquired by the camera 195.

The information may be vehicle travel situation information. For example, the information may include vehicle traveling road information, traffic rule information, adjacent vehicle information, vehicle or pedestrian traffic light information, construction information, traffic state information, parking lot information, and lane information.

The information may be traffic information. The processor 170 may detect traffic information from any one of a traffic light, a traffic sign, and a road surface included in an image captured by the camera 195. For example, the processor 170 may detect a go signal or a stop signal for a vehicle or a pedestrian from a traffic light included in an image. For example, the processor 170 may detect various pictures or text from a traffic sign included in an image. For example, the processor 170 may detect various pictures or text from a road surface included in an image.

The processor 170 may verify information by comparing detected information with information stored in the memory 140.

For example, the processor 170 detects a picture or text indicating a ramp from an object included in an acquired image. Here, the object may be a traffic sign or a road surface. The processor 170 may verify ramp information by comparing the detected picture or text with traffic information stored in the memory 140.

For example, the processor 170 detects a picture or text indicating vehicle or pedestrian stop from an object included in an acquired image. Here, the object may be a traffic sign or a road surface. The processor 170 may verify stop information by comparing the detected picture or text with traffic information stored in the memory 140. Alternatively, the processor 170 detects a stop line from a road surface included in an acquired image. The processor 170 may verify stop information by comparing the detected stop line with traffic information stored in the memory 140.

For example, the processor 170 may detect whether a lane is present from an object included in an acquired image. Here, the object may be a road surface. The processor 170 may check the color of a detected lane. The processor 170 may check whether the detected lane is a travel lane or a left-turn lane.

For example, the processor 170 may detect vehicle go or stop information from an object included in an acquired image. Here, the object may be a vehicle traffic light. Here, the vehicle go information may be a signal to instruct a vehicle to go straight or to turn to the left or right. The vehicle stop information may be a signal to instruct a vehicle to stop. The vehicle go information may be displayed in green and the vehicle stop information may be displayed in red.

For example, the processor 170 may detect pedestrian go or stop information from an object included in an acquired image. Here, the object may be a pedestrian traffic light. Here, the pedestrian go information may be a signal to instruct a pedestrian to cross the street at a crosswalk. The pedestrian stop information may be a signal to instruct a pedestrian to stop at a crosswalk.

The processor 170 may control the zoom of the camera 195. For example, the processor 170 may control the zoom of the camera 195 based on an object detection result. Assuming that a traffic sign is detected, but content written on the traffic sign is not detected, the processor 170 may control the camera 195 to zoom in.

The processor 170 may receive weather information and road traffic state information, for example, Transport Protocol Expert Group (TPEG) information via the communication unit 120.

The processor 170 may recognize, in real time, traffic state information around the vehicle 700 that has been recognized, based on stereo images, by the driver assistance apparatus 100.

The processor 170 may receive, for example, navigation information from the AVN apparatus 400 or a separate navigation apparatus via the interface unit 130.

The processor 170 may receive sensor information from the controller 770 or the sensing unit 760 via the interface unit 130. Here, the sensor information may include at least one selected from among vehicle travel direction information, vehicle location information (GPS information), vehicle angle information, vehicle speed information, vehicle acceleration information, vehicle tilt information, vehicle forward/backward movement information, battery information, fuel information, tire information, vehicle lamp information, vehicle interior temperature information, vehicle interior humidity information, and steering wheel rotation information.

The processor 170 may receive navigation information from the controller 770, the AVN apparatus 400 or a separate navigation apparatus via the interface unit 130.

The processor 170 may generate and provide a control signal required to turn the ISG function on or off. The processor 170 may generate a control signal to turn the ISG function on or off based on navigation information or information detected from an forward image or an around view image of the vehicle 700. The processor 170 may provide the controller 770 of the vehicle 700 with the generated control signal.

The processor 170 may be implemented using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for implementation of other functions.

The processor 170 may be controlled by the controller 770.

The display unit 180 may display various information processed in the processor 170. The display unit 180 may display an image related to operation of the driver assistance apparatus 100. To display such an image, the display unit 180 may include a cluster or a Heads-Up Display (HUD) mounted at the front of the interior of the vehicle. When the display unit 180 is a HUD, the display unit 180 may include a projector module to project an image to the windshield of the vehicle 700.

The audio output unit 185 may externally output sound based on an audio signal processed in the processor 170. To this end, the audio output unit 185 may include at least one speaker.

An audio input unit may receive user voice. To this end, the audio input unit may include a microphone. The received voice may be converted into electrical signals to thereby be transmitted to the processor 170.

The power supply unit 190 may supply power required to operate the respective components under control of the processor 170. In particular, the power supply unit 190 may receive power from, for example, a battery inside the vehicle 700.

The camera 195 acquires a forward image or an around view image of the vehicle. The camera 195 may be a monocular camera or the stereo cameras 195a and 195b to capture a forward image of the vehicle. Alternatively, the camera 195 may be the cameras 195d, 195e, 195f and 195g to capture an around view image of the vehicle.

The camera 195 may include an image sensor (for example, a CMOS or a CCD) and an image processing module.

The camera 195 may process a still image or a moving image acquired by the image sensor. The image processing module may process the still image or the moving image acquired by the image sensor. In some implementations, the image processing module may be separate from or integrated with the processor 170.

The camera 195 may acquire an image capturing at least one of a traffic light, a traffic sign, and a road surface.

The camera 195 may be set to zoom in/out under control of the processor 170. For example, under control of the processor 170, a zoom barrel included in the camera 195 may be moved to zoom in/out.

The camera 195 may be focused under control of the processor 170. For example, under control of the processor 170, a focus barrel included in the camera 195 may be moved to set a focus. The focus may be automatically set based on zoom in/out setting.

The processor 170 may automatically control the focus to correspond to zoom control.

FIG. 3B is an internal block diagram of the driver assistance apparatus 100 according to another implementation.

Referring to FIG. 3B, the driver assistance apparatus 100 has a difference in that it includes stereo cameras 195a and 195b as compared to the driver assistance apparatus 100 of FIG. 3A. The following description will focus on this difference.

The driver assistance apparatus 100 may include first and second cameras 195a and 195b. Here, the first and second cameras 195a and 195b may be referred to as stereo cameras.

The stereo cameras 195a and 195b may be configured to be detachably attached to the ceiling or windshield of the vehicle 700. The stereo cameras 195a and 195b may respectively include a first lens 193a and a second lens 193b.

The stereo cameras 195a and 195b may respectively include a first light shield 192a and a second light shield 192b, which shield light to be introduced to the first lens 193a and the second lens 193b.

The first camera 195a captures a first forward image of the vehicle. The second camera 195b captures a second forward image of the vehicle. The second camera 195b is spaced apart from the first camera 195a by a prescribed distance. As the first and second cameras 195a and 195b are spaced apart from each other by a prescribed distance, binocular disparity is generated, which enables detection of a distance to an object based on binocular disparity.

When the driver assistance apparatus 100 includes the stereo cameras 195a and 195b, the processor 170 may implement computer vision based signal processing. As such, the processor 170 may acquire stereo images for a view in front of the vehicle from the stereo cameras 195a and 195b, perform binocular disparity calculation for the view in front of the vehicle based on the stereo images, perform object detection for at least one of the stereo images based on the calculated binocular disparity information, and continuously track movement of an object after object detection. Here, the stereo images are based on the first forward image received from the first camera 195a and the second forward image received from the second camera 195b.

In particular, the processor 170 may perform, for example, Lane Detection (LD), Vehicle Detection (VD), Pedestrian Detection (PD), Bright-spot Detection (BD), Traffic Sign Recognition (TSR), and road surface detection during object detection.

In addition, the processor 170 may perform, for example, calculation of a distance to a detected adjacent vehicle, calculation of a speed of the detected adjacent vehicle, and calculation of a speed difference with the detected adjacent vehicle.

The processor 170 may control the zoom of the first and second cameras 195a and 195b individually. The processor 170 may periodically change a zoom magnification of the second camera 195b while fixing the zoom of the first camera 195a. The processor 170 may periodically change a zoom magnification of the first camera 195a while fixing the zoom of the second camera 195b.

The processor 170 may control the first or second camera 195a or 195b to zoom in or zoom out at a prescribed period.

The processor 170 may set the zoom of the first camera 195a to a high magnification so as to be advantageous for object detection at a long distance. In addition, the processor 170 may set the zoom of the second camera 195b to a low magnification so as to be advantageous for object detection at a short distance. The processor 170 may control the first camera 195a to zoom in and the second camera 195b to zoom out.

Conversely, the processor 170 may set the zoom of the first camera 195a to a low magnification so as to be advantageous for object detection at a short distance. In addition, the processor 170 may set the zoom of the second camera 195b to a high magnification so as to be advantageous for object detection at a long distance. The processor

170 may control the first camera 195*a* to zoom out and the second camera 195*b* to zoom in.

For example, the processor 170 may control the zoom of the first camera 195*a* or the second camera 195*b* according to object detection results. For example, when a traffic sign is detected, but content written on the traffic sign is not detected, the processor 170 may control the first camera 195*a* or the second camera 195*b* to zoom in.

The processor 170 may automatically control a focus to correspond to the zoom control of the camera 195.

FIG. 3C is an internal block diagram of the driver assistance apparatus 100 according to a still another implementation.

Referring to FIG. 3C, the driver assistance apparatus 100 has a difference in that it includes around view cameras 195*d*, 195*e*, 195*f* and 195*g* as compared to the driver assistance apparatus 100 of FIG. 3A. The following description will focus on this difference.

The driver assistance apparatus 100 may include the around view cameras 195*d*, 195*e*, 195*f* and 195*g*.

Each of the around view cameras 195*d*, 195*e*, 195*f* and 195*g* may include a lens and a light shield configured to shield light to be introduced to the lens.

The around view cameras may include a left camera 195*d*, a rear camera 195*e*, a right camera 195*f* and a front camera 195*g*.

The left camera 195*d* captures a leftward image of the vehicle. The rear camera 195*e* captures a rearward image of the vehicle. The right camera 195*f* captures a rightward image of the vehicle. The front camera 195*g* captures a forward image of the vehicle.

The respective images captured by the around view cameras 195*d*, 195*e*, 195*f* and 195*g* are transmitted to the processor 170.

The processor 170 may generate an image of a view around the vehicle by combining the leftward image, the rearward image, the rightward image and the forward image of the vehicle. The image of the view around the vehicle may be a top view or bird's eye view image. The processor 170 may receive each of the leftward image, the rearward image, the rightward image and the forward image of the vehicle, combine the received images, and convert the combined image into a top view image, thereby generating an around view image of the vehicle.

The processor 170 may detect an object based on the image of the view around the vehicle. In particular, the processor 170 may perform, for example, Lane Detection (LD), Vehicle Detection (VD), Pedestrian Detection (PD), Bright-spot Detection (BD), Traffic Sign Recognition (TSR), and road surface detection during object detection.

The processor 170 may control the zoom of the around view cameras 195*d*, 195*e*, 195*f* and 195*g* individually. The zoom control of the processor 170 may be equal to that of the stereo cameras as described above with reference to FIG. 3B.

Figure 4A:
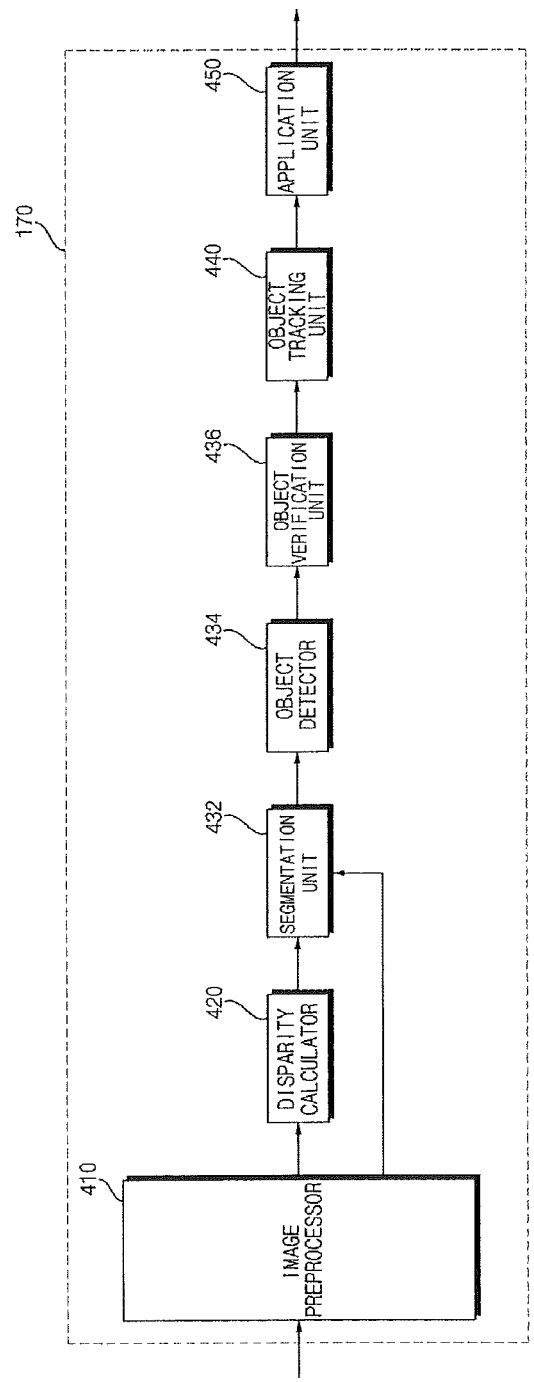
FIGS. 4A and 4B are internal block diagrams illustrating various examples of a processor included in a driver assistance apparatus.
Figure 4B:
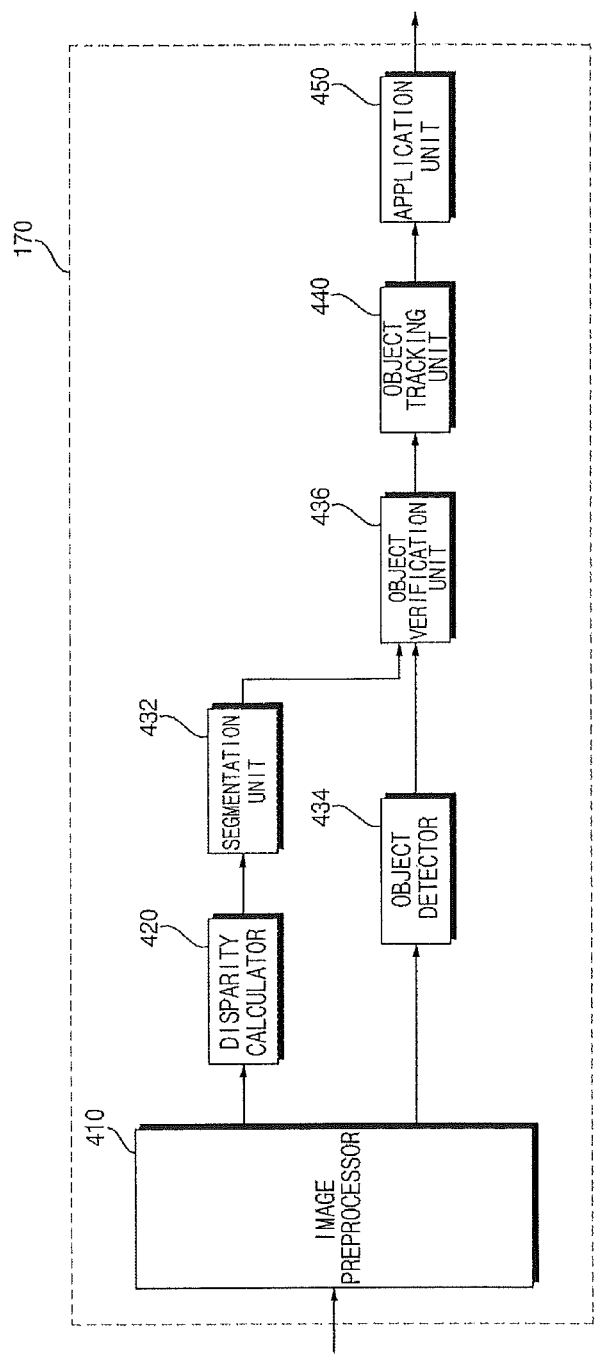

FIGS. 4A and 4B are internal block diagrams illustrating various examples of the processor of FIGS. 3A and 3B, and FIGS. 5A and 5B are views referenced to explain operation of the processor of FIGS. 4A and 4B.

First, referring to FIG. 4A illustrating one example of the processor 170 in internal block diagram, the processor 170 inside the driver assistance apparatus 100 may include an image preprocessor 410, a disparity calculator 420, a segmentation unit 432, an object detector 434, an object verification unit 436, an object tracking unit 440, and an application unit 450.

The image preprocessor 410 may receive an image from the camera 195 and preprocess the received image.

Specifically, the image preprocessor 410 may perform, for example, noise reduction, rectification, calibration, color enhancement, Color Space Conversion (CSC), interpolation, and camera gain control for the image. As such, the image preprocessor 410 may acquire an image more vivid than stereo images captured by the camera 195.

The disparity calculator 420 may receive images signal-processed by the image preprocessor 410, perform stereo matching for the received images, and acquire a binocular disparity map based on the stereo matching. For example, the disparity calculator 420 may acquire binocular disparity information related to the stereo images for a view in front of the vehicle.

The stereo matching may be performed on a per pixel basis or on a per prescribed block basis of the stereo images. The binocular disparity map may refer to a map in which binocular parallax information between stereo images, i.e. left and right images are represented by numerical values.

The segmentation unit 432 may perform segmentation and clustering on at least one of the stereo images based on the binocular disparity information from the disparity calculator 420.

Specifically, the segmentation unit 432 may segment at least one of the stereo images into a background and a foreground based on the binocular disparity information.

For example, the segmentation unit 432 may calculate a region of the disparity map, in which the binocular disparity information is a predetermined value or less, as a background and exclude the corresponding region. In this way, a foreground may be relatively separated.

In another example, the segmentation unit 432 may calculate a region of the disparity map, in which the binocular disparity information is a predetermined value or more, as a foreground and exclude the corresponding region. In this way, the background may be separated.

As described above, when the image is segmented into the foreground and the background based on the binocular disparity information extracted based on the stereo images, it is possible to reduce a signal processing speed and signal processing amount during subsequent object detection.

Subsequently, the object detector 434 may detect an object based on image segment by the segmentation unit 432.

For example, the object detector 434 may detect an object for at least one of the stereo images based on the binocular disparity information.

Specifically, the object detector 434 may detect an object for at least one of the stereo images. For example, the object detector 434 may detect an object from the foreground separated by image segment.

Subsequently, the object verification unit 436 may classify and verify the separated object.

To this end, the object verification unit 436 may use, for example, an identification method using a neural network, a Support Vector Machine (SVM) method, an AdaBoost identification method using a Harr-like feature, or a Histograms of Oriented Gradients (HOG) method.

The object verification unit 436 may compare the detected object with objects stored in the memory 140 to verify the detected object.

For example, the object verification unit 436 may verify an adjacent vehicle, a lane, a road surface, a traffic sign, a dangerous zone, and a tunnel, which are located around the vehicle 700.

The object tracking unit 440 may track the verified object. For example, the object tracking unit 440 may verify an object included in sequentially acquired stereo images, calculate motion or a motion vector of the verified object, and track, for example, movement of the corresponding object based on the calculated motion or motion vector. As such, the object tracking unit 440 may track, for example, adjacent vehicles, lanes, road surface, traffic signs, dangerous zones, and tunnels, which are located around the vehicle 700.

Subsequently, the application unit 450 may calculate, for example, the accident risk of the vehicle 700 based on various objects located around the vehicle 700, for example, other vehicles, lanes, road surface, and traffic signs. In addition, the application unit 450 may calculate the possibility of front-end collision with a front vehicle and whether or not loss of traction occurs.

In addition, the application unit 450 may output, for example, a message to notify a user of driver assistance information such as, for example, the calculated risk, collision possibility, or traction loss. Alternatively, the application unit 450 may generate a control signal, as vehicle control information, for attitude control or traveling control of the vehicle 700.

The image preprocessor 410, the disparity calculator 420, the segmentation unit 432, the object detector 434, the object verification unit 436, the object tracking unit 440, and the application unit 450 may be internal components of an image processing unit 810 inside the processor 170 to be described below with reference to FIG. 7 and the following drawings.

In some implementations, the processor 170 may include only some of the image preprocessor 410, the disparity calculator 420, the segmentation unit 432, the object detector 434, the object verification unit 436, the object tracking unit 440, and the application unit 450. For example, when the camera 195 is a monocular camera or around view cameras, the disparity calculator 420 may be excluded. In addition, in some implementations, the segmentation unit 432 may be excluded.

FIG. 4B is an internal block diagram illustrating another example of the processor.

Referring to FIG. 4B, the processor 170 includes the same internal units as those of the processor 170 of FIG. 4A, but has a signal processing sequence different from that of the processor 170 of FIG. 4A. The following description will focus on this difference.

The object detector 434 may receive stereo images and detect an object for at least one of the stereo images. Differently from FIG. 4A, the object detector 434 may not detect an object for a segmented image based on the binocular disparity information, but directly detect an object from the stereo images.

Subsequently, the object verification unit 436 classifies and verifies the detected and separated object based on image segment by the segmentation unit 432 and the object detected by the object detector 434.

To this end, the object verification unit 436 may use an identification method using a neural network, a SVM method, an AdaBoost identification method using a Haar-like feature, or a HOG method.

Figure 5A:
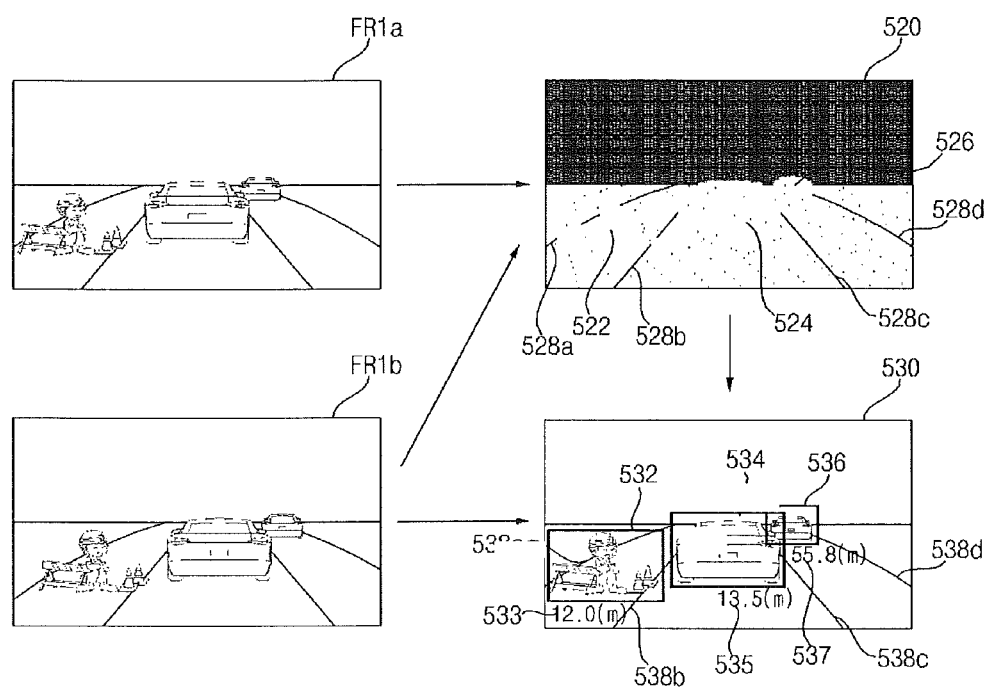
FIGS. 5A and 5B are diagrams illustrating examples of operations of a processor included in a driver assistance apparatus.
Figure 5B:
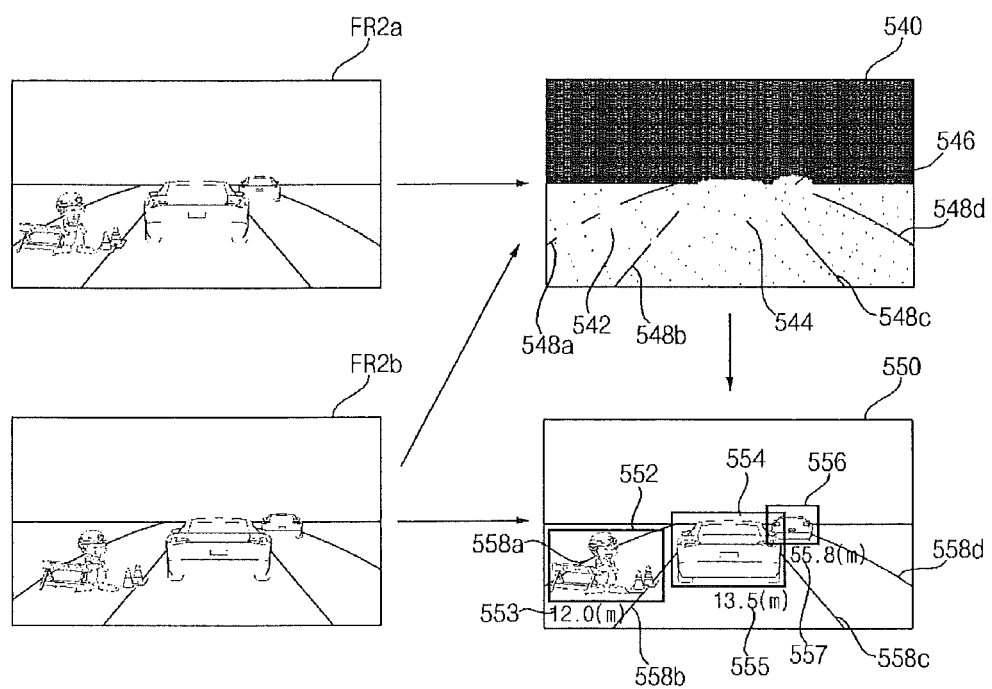

FIGS. 5A and 5B are views referenced to explain an operation method of the processor 170 illustrated in FIG. 4A based on stereo images acquired respectively from first and second frame periods.

Referring first to FIG. 5A, the stereo cameras 195 acquire stereo images during a first frame period.

The disparity calculator 420 included in the processor 170 receives stereo images FR1a and FR1b signal-processed by the image preprocessor 410 and performs stereo matching for the received stereo images FR1a and FR1b to acquire a disparity map 520.

The disparity map 520 shows a binocular disparity between the stereo images FR1a and FR1b as levels. As a disparity level is higher, a distance to the vehicle may be calculated as being shorter. As a disparity level is lower, a distance to the vehicle may be calculated as being longer.

When the disparity map is displayed, the disparity map may be displayed with higher brightness as a disparity level is higher and displayed with lower brightness as a disparity level is lower.

FIG. 5A shows, by way of example, that, in the disparity map 520, first to fourth lanes 528a, 528b, 528c, and 528d have their own disparity levels and a construction zone 522, a first preceding vehicle 524, and a second preceding vehicle 526 have their own disparity levels.

The segmentation unit 432, the object detector 434, and the object verification unit 436 respectively perform segmentation, object detection, and object verification for at least one of the stereo images FR1a and FR1b based on the disparity map 520.

FIG. 5A shows, by way of example, that object detection and object verification for the second stereo image FR1b are performed using the disparity map 520.

For example, object detection and object verification for first to fourth lanes 538a, 538b, 538c, and 538d, a construction zone 532, a first preceding vehicle 534, and a second preceding vehicle 536 in an image 530 may be performed.

Next, referring to FIG. 5B, the stereo cameras 195 acquire stereo images during a second frame period.

The disparity calculator 420 included in the processor 170 receives stereo images FR2a and FR2b signal-processed by the image preprocessor 410 and performs stereo matching for the received stereo images FR2a and FR2b to acquire a disparity map 540.

FIG. 5B shows, by way of example, that, in the disparity map 540, first to fourth lanes 548a, 548b, 548c, and 548d have their own disparity levels and a construction zone 542, a first preceding vehicle 544, and a second preceding vehicle 546 have their own disparity levels.

The segmentation unit 432, the object detector 434, and the object verification unit 436 respectively perform segmentation, object detection, and object verification for at least one of the stereo images FR2a and FR2b based on the disparity map 540.

FIG. 5B shows, by way of example, that object detection and object verification for the second stereo image FR2b are performed using the disparity map 540.

For example, object detection and object verification for first to fourth lanes 558a, 558b, 558c, and 558d, a construction zone 552, a first preceding vehicle 554, and a second preceding vehicle 556 in an image 550 may be performed.

The object tracking unit 440 may track verified objects by comparing FIGS. 5A and 5B with each other.

Specifically, the object tracking unit 440 may track movement of an object based on motion or motion vectors of respective objects verified from FIGS. 5A and 5B. As such, the object tracking unit 440 may track, for example, lanes, a construction zone, a first preceding vehicle and a second preceding vehicle, which are located around the vehicle 700.

Figure 6A:
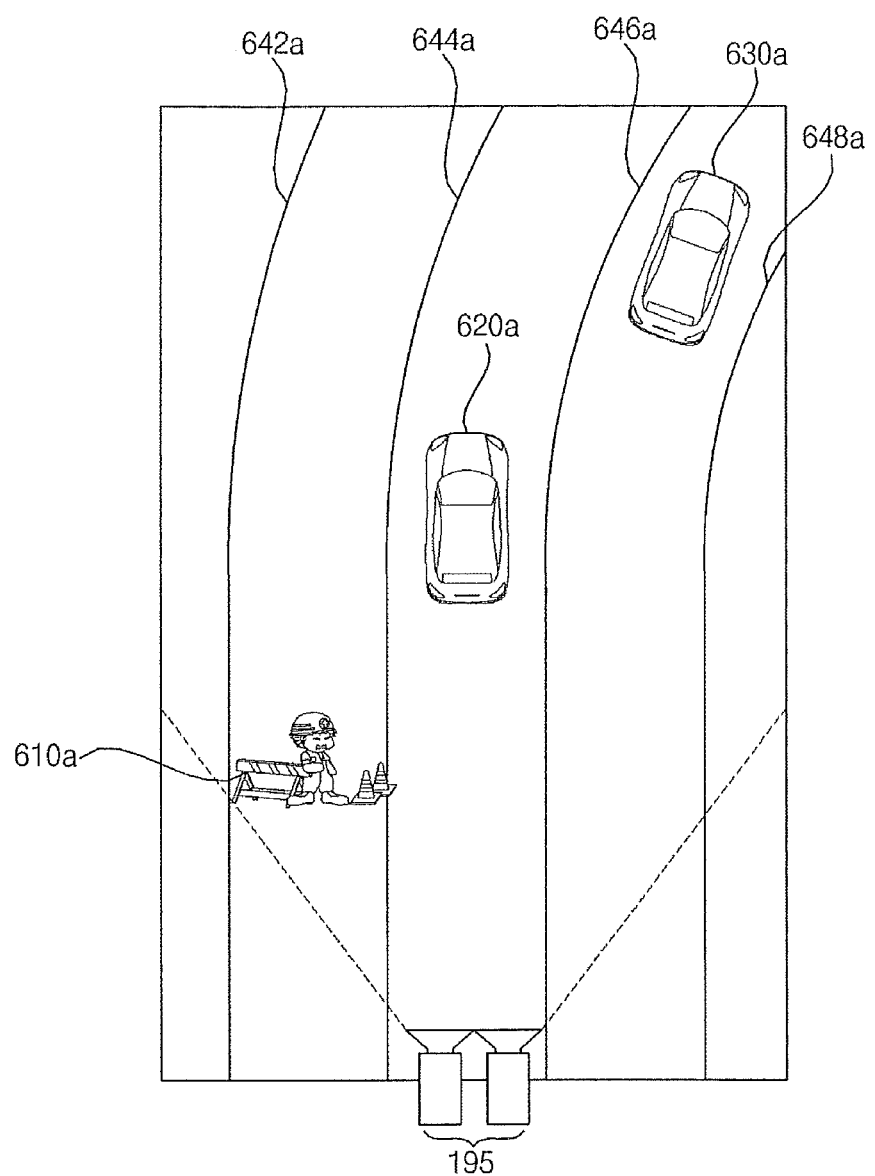
FIGS. 6A and 6B are diagrams illustrating examples of operations of a driver assistance apparatus.
Figure 6B:
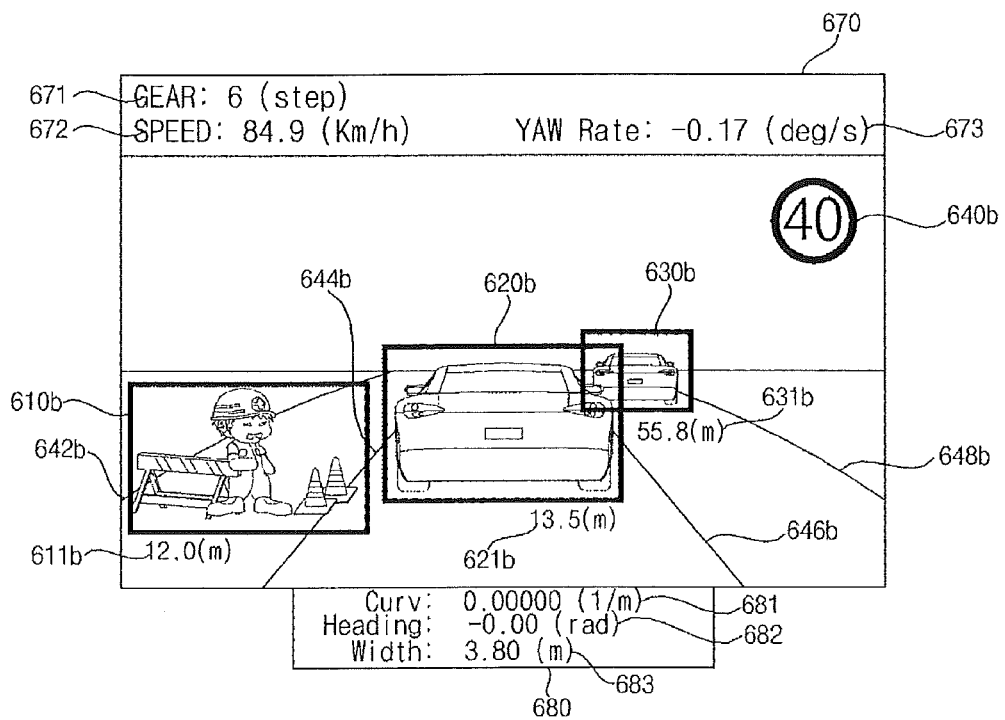

FIGS. 6A and 6B are views referenced to explain operation of the driver assistance apparatus of FIGS. 3A to 3C.

First, FIG. 6A is a view illustrating a situation in front of the vehicle captured by the stereo cameras 195 mounted in the vehicle. In particular, FIG. 6A illustrates a situation in front of the vehicle in a bird's eye view form.

Referring to FIG. 6A, a first lane 642a, a second lane 644a, a third lane 646a, and a fourth lane 648a are arranged from the left to the right, a construction zone 610a is located between the first lane 642a and the second lane 644a, a first preceding vehicle 620a is located between the second lane 644a and the third lane 646a, and a second preceding vehicle 630a is located between the third lane 646a and the fourth lane 648a.

Next, FIG. 6B illustrates a situation in front of the vehicle recognized by the driver assistance apparatus along with various information. In particular, an image as illustrated in FIG. 6B may be displayed on the display unit 180 provided in the driver assistance apparatus 100, the AVN apparatus 400, or the display unit 741.

Differently from FIG. 6A, FIG. 6B illustrates display of information based on images captured by the stereo cameras 195.

Referring to FIG. 6B, a first lane 642b, a second lane 644b, a third lane 646b, and a fourth lane 648b are arranged from the left to the right, a construction zone 610b is located between the first lane 642b and the second lane 644b, a first preceding vehicle 620b is located between the second lane 644b and the third lane 646b, and a second preceding vehicle 630b is located between the third lane 646b and the fourth lane 648b.

The driver assistance apparatus 100 may verify objects for the construction zone 610b, the first preceding vehicle 620b, and the second preceding vehicle 630b by signal processing stereo images captured by the stereo cameras 195. In addition, the driver assistance apparatus 100 may verify the first lane 642b, the second lane 644b, the third lane 646b, and the fourth lane 648b.

In the example of FIG. 6B, in order to represent object verification for the construction zone 610b, the first preceding vehicle 620b, and the second preceding vehicle 630b, the construction zone 610b, the first preceding vehicle 620b, and the second preceding vehicle 630b are highlighted in black boxes.

The driver assistance apparatus 100 may calculate distance information regarding the construction zone 610b, the first preceding vehicle 620b, and the second preceding vehicle 630b based on the stereo images captured by the stereo cameras 195.

FIG. 6B illustrates display of calculated first distance information 611b, second distance information 621b, and third distance information 631b, which correspond respectively to the construction zone 610b, the first preceding vehicle 620b, and the second preceding vehicle 630b.

The driver assistance apparatus 100 may receive vehicle sensor information from the controller 770 or the sensing unit 760. In particular, the driver assistance apparatus 100 may receive vehicle speed information, gear information, yaw rate information that represents the change rate of a rotation angle (yaw) of the vehicle, and vehicle angle information and display the information.

Although FIG. 6B illustrates that vehicle speed information 672, gear information 671, and yaw rate information 673 are displayed in an upper portion 670 of an forward image of the vehicle and vehicle angle information 682 is displayed in a lower portion 680 of the forward image of the vehicle, various other examples are possible. In addition, vehicle width information 683 and road curvature information 681 may be displayed along with the vehicle angle information 682.

The driver assistance apparatus 100 may receive speed limit information for a road on which the vehicle 700 is traveling via the communication unit 120 or the interface unit 130. FIG. 6B illustrates display of speed limit information 640b.

Although the driver assistance apparatus 100 may display various information illustrated in FIG. 6B via, for example, the display unit 180, alternatively, the driver assistance apparatus 100 may store various information without displaying the same. In addition, the driver assistance apparatus 100 may utilize the information in a variety of applications.

Figure 7:
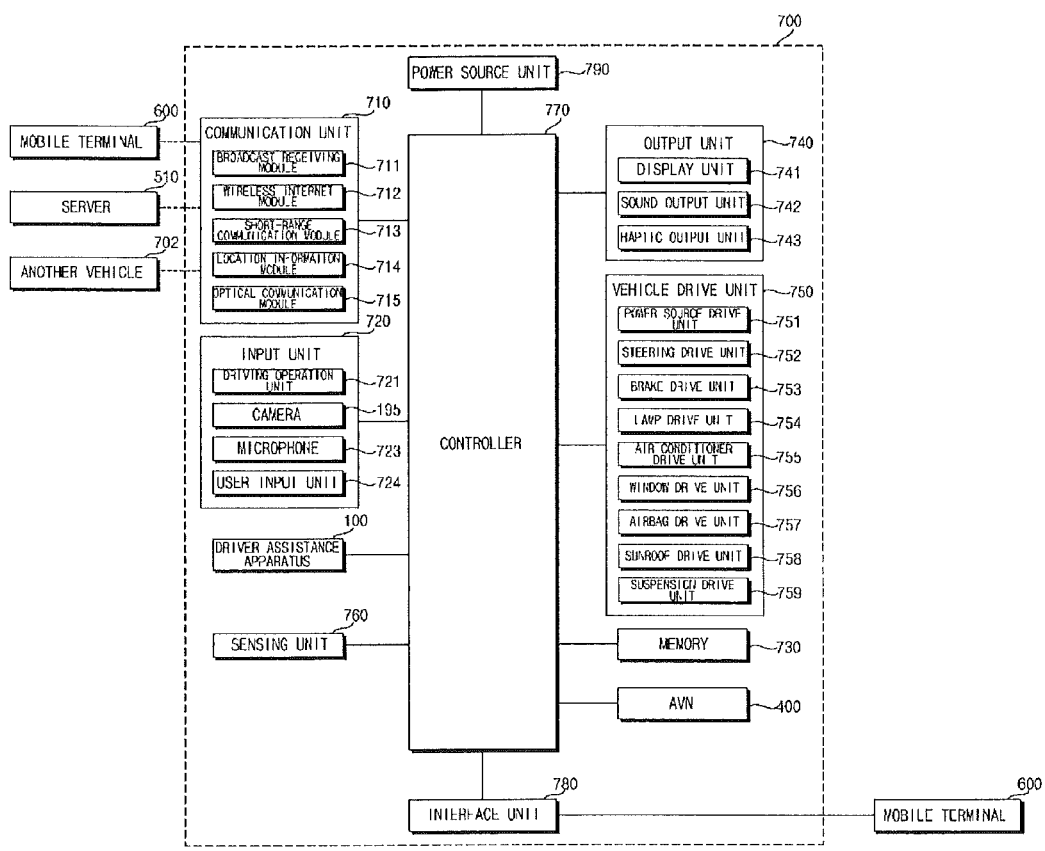
FIG. 7 is an internal block diagram illustrating one example of a vehicle.

FIG. 7 is a block diagram illustrating one example of the vehicle of FIG. 1.

The vehicle 700 may include the communication unit 710, the input unit 720, the sensing unit 760, an output unit 740, a vehicle drive unit 750, a memory 730, an interface unit 780, the controller 770, the power source unit 790, the driver assistance apparatus 100, and the AVN apparatus 400.

The communication unit 710 may include one or more modules to enable wireless communication between the vehicle 700 and the mobile terminal 600, between the vehicle 700 and the external server 510, or between the vehicle 700 and another vehicle 702. In addition, the communication unit 710 may include one or more modules to connect the vehicle 700 to one or more networks.

The communication unit 710 may include a broadcast receiving module 711, a wireless Internet module 712, a short-range communication module 713, a location information module 714, and an optical communication module 715.

The broadcast receiving module 711 is configured to receive a broadcast signal or broadcast associated information from an external broadcast managing server via a broadcast channel. Here, broadcast includes radio broadcast or TV broadcast.

The wireless Internet module 712 is a module for wireless Internet access. The wireless Internet module 712 may be internally or externally coupled to the vehicle 700. The wireless Internet module 712 may transmit or receive wireless signals via communication networks according to wireless Internet technologies.

Examples of such wireless Internet technologies include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), and LTE-A (Long Term Evolution-Advanced). The wireless Internet module 712 may transmit and receive data according to one or more of such wireless Internet technologies, and other Internet technologies as well. For example, the wireless Internet module 712 may exchange data with the external server 510 in a wireless manner. The wireless Internet module 712 may receive weather information and road traffic state information (e.g., Transport Protocol Expert Group (TPEG) information) from the external server 510.

The short-range communication module 713 may assist short-range communication using at least one selected from among Bluetooth™, Radio Frequency IDdentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication module 713 forms wireless area networks to perform short-range communication between the vehicle 700 and at least one external device. For example, the short-range communication module 713 may exchange data with the mobile terminal 600 in a wireless manner. The short-range communication module 713 may receive weather information and road traffic state information (e.g., Transport Protocol Expert Group (TPEG) information) from the mobile terminal 600. When the user gets into the vehicle 700, the mobile terminal 600 of the user and the vehicle 700 may pair with each other automatically or as the user executes a pairing application.

The location information module 714 is a module to acquire a location of the vehicle 700. A representative example of the location information module 714 includes a Global Position System (GPS) module. For example, when vehicle utilizes a GPS module, a location of the vehicle may be acquired using a signal transmitted from GPS satellites.

The optical communication module 715 may include a light emitting unit and a light receiving unit.

The light receiving unit may convert light into electrical signals to receive information. The light receiving unit may include Photo Diodes (PDPs) to receive light. The photo diodes may convert light into an electrical signal. For example, the light receiving unit, may receive information regarding a preceding vehicle via light emitted from a light source included in the preceding vehicle.

The light emitting unit may include at least one element to convert electrical signals into light. Here, the light emitting element may be a Light Emitting Diode (LED). The light emitting unit converts electrical signals into light to thereby emit the light. For example, the light emitting element may externally emit light via flickering of the light emitting element corresponding to a prescribed frequency. In some implementations, the light emitting unit may include an array of a plurality of light emitting elements. In some implementations, the light emitting unit may be integrated with a lamp provided in the vehicle 700. For example, the light emitting unit may be at least one selected from among a headlight, a taillight, a brake light, a turn signal, and a sidelight. For example, the optical communication module 715 may exchange data with another vehicle 702 via optical communication.

The input unit 720 may include a driving operation unit 721, the camera 195, a microphone 723, and the user input unit 724.

The driving operation unit 721 is configured to receive user input for driving of the vehicle 700. The driving operation unit 721 may include the steering input unit 721*a*, a shift input unit 721*b*, an acceleration input unit 721*c*, and a brake input unit 721*d*.

The steering input unit 721*a* is configured to receive a user input with regard to the direction of travel of the vehicle 700. The steering input unit 721*a* may take the form of a wheel to enable steering input via rotation thereof. In some implementations, the steering input unit 721*a* may be configured as a touchscreen, a touch pad, or a button.

The shift input unit 721*b* is configured to receive input for selecting one of Park (P), Drive (D), Neutral (N) and Reverse (R) gears of the vehicle 700. The shift input unit 721*b* may have a lever form. In some implementations, the shift input unit 721*b* may be configured as a touchscreen, a touch pad, or a button.

The acceleration input unit 721*c* is configured to receive user input for acceleration of the vehicle 700. The brake input unit 721*d* is configured to receive user input for speed reduction of the vehicle 700. Each of the acceleration input unit 721*c* and the brake input unit 721*d* may have a pedal form. In some implementations, the acceleration input unit 721*c* or the brake input unit 721*d* may be configured as a touchscreen, a touch pad, or a button.

The camera 195 may include an image sensor and an image processing module. The camera 195 may process a still image or a moving image acquired by the image sensor (e.g., a CMOS or a CCD). The image processing module may extract required information by processing a still image or a moving image acquired via the image sensor and, then, transmit the extracted information to the controller 770. The vehicle 700 may include the camera 195 to capture a forward image or an around view image of the vehicle and an internal camera 195*c* to capture an image of the interior of the vehicle.

The internal camera 195*c* may capture an image of a passenger. The internal camera 195*c* may capture an image for biometrics of the passenger.

Although the example of FIG. 7 illustrates the camera 195 as being included in the input unit 720, the camera 195 may be described as being a component of the driver assistance apparatus 100 as described above with reference to FIGS. 2 to 6.

The microphone 723 may process external sound signals into electrical data. The processed data may be utilized in various ways according to a function that the vehicle 700 is performing. The microphone 723 may convert a user voice command into electrical data. The converted electrical data may be transmitted to the controller 770.

In some implementations, the camera 195 or the microphone 723 may be components of the sensing unit 760, other than components of the input unit 720.

The user input unit 724 is configured to receive information from the user. When information is input via the user input unit 724, the controller 770 may control operation of the vehicle 700 to correspond to the input information. The user input unit 724 may include a touch input unit or a mechanical input unit. In some implementations, the user input unit 724 may be located in a region of a steering wheel. In this case, the driver may operate the user input unit 724 with the fingers while gripping the steering wheel.

The sensing unit 760 is configured to sense signals associated with, for example, the traveling of the vehicle 700. To this end, the sensing unit 760 may include a collision sensor, a wheel sensor, a speed sensor, a gradient sensor, a weight sensor, a heading sensor, a yaw sensor, a gyro sensor, a position module, a vehicle forward/backward movement sensor, a battery sensor, a fuel sensor, a tire sensor, a steering sensor based on the rotation of a steering wheel, a vehicle interior temperature sensor, a vehicle interior humidity sensor, an ultrasonic sensor, a radar, and Lidar.

As such, the sensing unit 760 may acquire sensing signals with regard to vehicle collision information, vehicle travel direction information, vehicle location information (GPS information), vehicle angle information, vehicle speed information, vehicle acceleration information, vehicle tilt information, vehicle forward/backward movement information, battery information, fuel information, tire information, vehicle lamp information, vehicle interior temperature information, vehicle interior humidity information, and steering wheel rotation angle information.

The sensing unit 760 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The sensing unit 760 may include a biometric information sensing unit. The biometric information sensing unit is configured to sense and acquire biometric information of the passenger. The biometric information may include fingerprint information, iris-scan information, retina-scan information, hand geometric information, facial recognition information, and voice recognition information. The biometric information sensing unit may include a sensor to sense biometric information of the passenger. Here, the internal camera 195c and the microphone 723 may operate as sensors. The biometric information sensing unit may acquire hand geometric information and facial recognition information via the internal camera 195c.

The output unit 740 is configured to output information processed in the controller 770. The output unit 740 may include the display unit 741, a sound output unit 742, and a haptic output unit 743.

The display unit 741 may display information processed in the controller 770. For example, the display unit 741 may display vehicle associated information. Here, the vehicle associated information may include vehicle control information for direct control of the vehicle or driver assistance information to guide vehicle driving. In addition, the vehicle associated information may include vehicle state information that notifies a current state of the vehicle or vehicle traveling information regarding the traveling of the vehicle.

The display unit 741 may include at least one selected from among a Liquid Crystal Display (LCD), a Thin Film Transistor LCD (TFT LCD), an Organic Light Emitting Diode (OLED), a flexible display, a 3D display, and an e-ink display.

The display unit 741 may configure an inter-layer structure with a touch sensor or be integrally formed with the touch sensor to implement a touchscreen. The touchscreen may function as the user input unit 724 that provides an input interface between the vehicle 700 and the user and also function to provide an output interface between the vehicle 700 and the user. In this case, the display unit 741 may include a touch sensor that senses a touch to the display unit 741 so as to receive a control command in a touch manner. When a touch is input to the display unit 741 as described above, the touch sensor may sense the touch and the controller 770 may generate a control command corresponding to the touch. Content input in a touch manner may be characters or numbers, or may be, for example, instructions in various modes or menu items that may be designated.

The display unit 741 may include a cluster to allow a driver to check vehicle state information or vehicle traveling information while driving the vehicle. The cluster may be located on a dashboard. In this case, the driver may check information displayed on the cluster while looking forward.

In some implementations, the display unit 741 may be implemented as a Head Up display (HUD). When the display unit 741 is implemented as a HUD, information may be output via a transparent display provided at the windshield. Alternatively, the display unit 741 may include a projector module to output information via an image projected to the windshield.

The sound output unit 742 is configured to convert electrical signals from the controller 770 into audio signals and to output the audio signals. To this end, the sound output unit 742 may include, for example, a speaker. The sound output unit 742 may output sound corresponding to operation of the user input unit 724.

The haptic output unit 743 is configured to generate tactile output. For example, the haptic output unit 743 may operate to vibrate a steering wheel, a safety belt, or a seat so as to allow the user to recognize an output.

The vehicle drive unit 750 may control operation of various devices of the vehicle 700. The vehicle drive unit 750 may include a power source drive unit 751, a steering drive unit 752, a brake drive unit 753, a lamp drive unit 754, an air conditioner drive unit 755, a window drive unit 756, an airbag drive unit 757, a sunroof drive unit 758, and a suspension drive unit 759.

The power source drive unit 751 may perform electronic control for a power source inside the vehicle 700.

For example, in the case where a fossil fuel based engine is a power source, the power source drive unit 751 may perform electronic control of the engine. As such, the power source drive unit 751 may control, for example, an output torque of the engine. In the case where the power source drive unit 751 is the engine, the power source drive unit 751 may control the speed of the vehicle 700 by controlling the output torque of the engine under control of the controller 770.

In another example, when an electric motor is a power source, the power source drive unit 751 may perform control for the motor. As such, the power source drive unit 751 may control, for example, an RPM and a torque of the motor.

The steering drive unit 752 may perform electronic control of a steering apparatus inside the vehicle 700. As such, the steering drive unit 752 may change the direction of travel of the vehicle 700.

The brake drive unit 753 may perform electronic control of a brake apparatus inside the vehicle 700. For example, the brake drive unit 753 may reduce the speed of the vehicle 700 by controlling operation of brakes located at wheels. In another example, the brake drive unit 753 may adjust the direction of travel of the vehicle 700 leftward or rightward by differentiating operation of respective brakes located at left and right wheels.

The lamp drive unit 754 may turn lamps arranged inside and outside the vehicle 700 on or off. In addition, the lamp drive unit 754 may control, for example, the intensity and direction of light of each lamp. For example, the lamp drive unit 754 may perform control for a turn signal or a stop lamp, for example.

The air conditioner drive unit 755 may perform electronic control of an air conditioner inside the vehicle 700. For example, when the interior temperature of the vehicle is high, the air conditioner drive unit 755 may operate the air conditioner to supply cold air to the interior of the vehicle 700.

The window drive unit 756 may perform electronic control of a window apparatus inside the vehicle 700. For example, the window drive unit 756 may control opening or closing of left and right windows of the vehicle 700.

The airbag drive unit 757 may perform electronic control of an airbag apparatus inside the vehicle 700. For example, the airbag drive unit 757 may control an airbag to be deployed in a dangerous situation.

The sunroof drive unit 758 may perform electronic control of a sunroof apparatus inside the vehicle 700. For example, the sunroof drive unit 758 may control opening or closing of a sunroof.

The suspension drive unit 759 may perform electronic control of a suspension apparatus inside the vehicle 700. For example, when the road surface is uneven, the suspension drive unit 759 may control the suspension apparatus to reduce vibration of the vehicle 700.

The memory 730 is electrically connected to the controller 770. The memory 730 may store basic data for each unit, control data for operation control of the unit, and input/output data. The memory 730 may be various hardware storage devices such as, for example, a ROM, a RAM, an EPROM, a flash drive, and a hard drive. The memory 730 may store various data for overall operation of the vehicle 700 such as, for example programs for processing or control of the controller 770.

The interface unit 780 may serve as a passage for various kinds of external devices to be connected to the vehicle 700. For example, the interface unit 780 may have a port that is connectable to the mobile terminal 600 and may be connected to the mobile terminal 600 via the port. In this case, the interface unit 780 may exchange data with the mobile terminal 600.

The interface unit 780 may serve as a passage for supply of electrical energy to the connected mobile terminal 600. When the mobile terminal 600 is electrically connected to the interface unit 780, the interface unit 780 supplies electrical energy from the power source unit 790 to the mobile terminal 600 under control of the controller 770.

The controller 770 may control overall operation of each unit inside the vehicle 700. The controller 770 may be referred to as an Electronic Control Unit (ECU).

The controller 770 may be implemented in a hardware manner using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for implementation of other functions.

The controller 770 may control the ISG function. When the vehicle 700 encounters a first condition, the controller 770 may implement the ISG function by controlling the power source drive unit 751 to stop operation of the power source. For example, the controller 770 receives vehicle speed information during traveling via the sensing unit 760. The controller 770 receives input information of the brake input unit 721*d*. The controller 770 receives input information of the acceleration input unit 721*c*. Here, the first condition may be a condition in which input to the brake input unit 721*d* is received in a state in which a vehicle speed is a reference speed or less during traveling and there is no input via the acceleration input unit 721*c*.

When the vehicle 700 encounters a second condition in a state in which operation of the power source has stopped, the controller 770 may implement the ISG function by controlling the power source drive unit 751 to again operate the power source. Here, the second condition may be a condition in which input to the brake input unit 721*d* is released or input to the acceleration input unit 721*c* is received.

A configuration including the controller 770, the brake input unit 721*d*, the acceleration input unit 721*c*, the sensing unit 760 to sense vehicle speed information, the power source drive unit 751, and the power source as described above may be referred to as an ISG apparatus or an ISG system.

The controller 770 may control the ISG function based on a control signal provided by the driver assistance apparatus 100. When a control signal to turn off the ISG function is received from the driver assistance apparatus 100, the controller 770 may control the ISG function to be turned off even if the first condition is satisfied. When a control signal to turn on the ISG function is received from the driver assistance apparatus 100 and the first condition is satisfied, the controller 770 may control the ISG function to be turned on.

The power source unit 790 may supply power required to operate the respective components under control of the controller 770. In particular, the power source unit 790 may receive power from, for example, a battery inside the vehicle 700.

The driver assistance apparatus 100 may exchange data with the controller 770. A control signal generated in the driver assistance apparatus 100 may be output to the controller 770. The controller 770 may control the ISG function based on a control signal received by the driver assistance apparatus 100. Here, the driver assistance apparatus 100 may be the driver assistance apparatus as described above with reference to FIGS. 1 to 6B.

The AVN apparatus 400 may exchange data with the controller 770. The controller 770 may receive navigation information from the AVN apparatus 400 or a separate navigation apparatus. Here, the navigation information may include set destination information, destination based routing information, and map information or vehicle location information related to vehicle traveling.

Figure 8A:
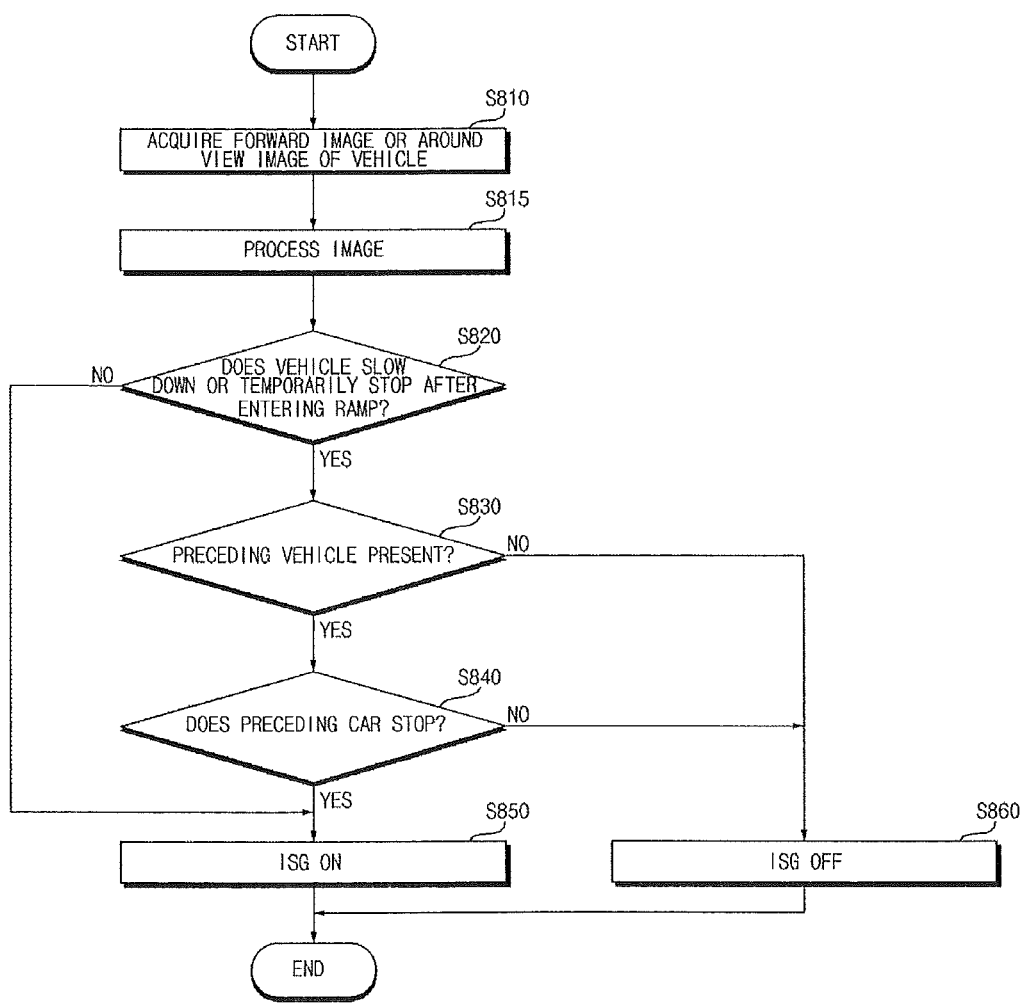
FIG. 8A is a flowchart illustrating an example of operations of a driver assistance apparatus according to a first implementation.

FIG. 8A is a flowchart referenced to explain operation of the driver assistance apparatus according to a first implementation.

Referring to FIG. 8A, the processor 170 may acquire a forward image or an around view image of the vehicle via the camera 195 (S810). Here, the camera 195 may be the camera as described above with reference to FIGS. 2A to 3C. In some implementations, three or more cameras 195 may be provided.

The camera 195 may capture a forward image or an around view image of the vehicle under control of the processor 170. The image captured by the camera 195 may include at least one object.

The camera 195 may capture an image of at least one of a traffic light, a traffic sign, and a road surface under control of the processor 170.

In a state in which the forward image or the around view image of the vehicle has been acquired, the processor 170 may process the acquired forward image or the acquired around view image of the vehicle (S815). The processor 170 detects an object from the forward image or the around view image of the vehicle. The processor 170 may detect information from the detected object. Here, the object may be at least one of a traffic light, a traffic sign and a road surface. In addition, the object may be at least one of a lane, an adjacent vehicle, a pedestrian, a light, and a traffic signal.

The information may be vehicle travel situation information. For example, the information may be ramp information. A ramp may be a sloping road junction that connects to higher and lower roads intersecting each other. For example, the vehicle may join a main road via a ramp, which may be referred to as an on-ramp to the main road.

The processor 170 may detect an object from the image and detect a symbol or text indicating a ramp from the detected object. Here, the object may be a traffic sign or a road surface.

The processor 170 may verify ramp information by comparing the detected information with information stored in the memory 140.

The processor 170 may detect side portions of other vehicles from the forward image or the around view image of the vehicle.

The processor 170 may detect a preceding vehicle from the forward image or the around view image of the vehicle. When the camera 195 is a monocular camera, the processor 170 may detect a distance to the preceding vehicle based on variation in the size of the preceding vehicle that is detected in a plurality of frames generated according to the lapse of time. In addition, when the camera 195 includes stereo cameras, the processor 170 may detect a distance to the preceding vehicle based on binocular disparity caused by a distance between first and second cameras 195*a* and 195*b*.

Subsequently, the processor 170 may determine whether the vehicle 700 slows down or temporarily stops after entering the ramp (S820). Here, slowing down is a condition that causes the ISG function to be turned on and may mean that the vehicle travels at a predetermined speed or less (e.g., 10 km/h or less). Here, temporary stop is a condition that causes the ISG function to be turned on and may mean that the vehicle stops during a short time (e.g., 1 second or less) and thereafter accelerates.

The processor 170 may determine whether the vehicle 700 has entered the ramp based on detected information.

For example, when ramp information is detected from a traffic sign included in the forward image or the around view image of the vehicle, the processor 170 may determine that the vehicle 700 enters the ramp.

In another example, when side portions of other vehicles are detected from the forward image or the around view image of the vehicle, the processor 170 may determine that the vehicle 700 enters the ramp based on the detected side portions of other vehicles. This is because, when the vehicle 700 enters a main road via the ramp, side portions of other vehicles that are traveling on the main road are detected from the forward image or the around view image of the vehicle.

In a further example, the processor 170 may determine whether the vehicle 700 enters the ramp based on navigation information. Here, the navigation information may be received from the AVN apparatus 400, the controller 770 or a separate navigation apparatus via the interface unit 130.

Once the vehicle 700 has entered the ramp, the processor 170 determines whether the vehicle 700 slows down or temporarily stops.

For example, the processor 170 may determine whether the vehicle 700 slows down or temporarily stops by detecting a prescribed object from the forward image or the around view image of the vehicle and tracking the detected object. Specifically, the processor 170 may determine whether the vehicle 700 slows down or temporarily stops based on a relative distance or a speed relative to the detected object.

For example, the processor 170 may receive vehicle speed information from the sensing unit 760 or the controller 770 via the interface unit 130 and determine whether the vehicle 700 slows down or temporarily stops based on a vehicle speed.

Thereafter, the processor 170 may determine whether a preceding vehicle is detected from the forward image or the around view image of the vehicle and whether the detected preceding vehicle is stationary (S830 and S840).

The processor 170 may determine whether the preceding vehicle is stationary based on vehicle speed information and information regarding a distance to the preceding vehicle. Specifically, the processor 170 may determine whether the preceding vehicle is stationary based on a speed relative to the preceding vehicle that is calculated based on a vehicle speed and a relative distance to the preceding vehicle. Alternatively, the processor 170 may determine whether the preceding vehicle is stationary based on a stop lamp of the detected preceding vehicle. The processor 170 may determine that the preceding vehicle is stationary when the detected stop lamp is in an ON state.

When the preceding vehicle is detected and the detected preceding vehicle is determined as being stationary, the processor 170 may generate a control signal to turn on the ISG function (S850). The control signal may be transmitted to the controller 770.

When the preceding vehicle is not detected or the detected preceding vehicle is determined as being traveling, the processor 170 may generate a control signal to turn off the ISG function (S860). The control signal may be transmitted to the controller 770.

The vehicle 700 may be a Left Hand Drive (LHD) or Right Hand Drive (RHD) vehicle.

Assuming that the vehicle is an LHD vehicle, the vehicle 700 may join the main road via a right-turn on the ramp.

In addition, assuming that the vehicle is an RHD vehicle, the vehicle 700 may join the main road via a left-turn on the ramp.

Generally, when an input to the brake pedal 721*d* is received in a state in which the vehicle travels at a predetermined speed or less or stops and no input to the accelerator pedal 721*c* is received, the ISG function is turned on to stop operation of the power source. However, according to the first implementation, when the vehicle 700 slows down or temporarily stops after entering the ramp, the ISG function may not be turned on even under an ISG operating condition. This may allow the vehicle 700 to rapidly join the main road without delay. Accordingly, the driver assistance apparatus 100 has the effects of preventing travel delay caused when the ISG function is turned on during traveling on the ramp and preventing accidents due to travel delay.

Figure 8B:
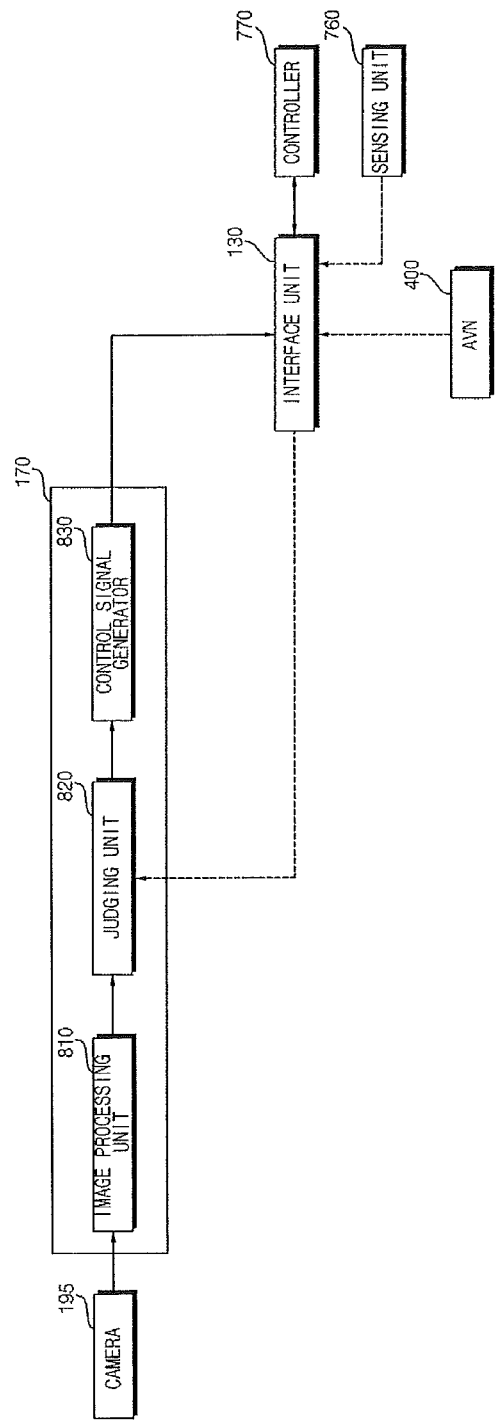
FIG. 8B is a block diagram illustrating an example of details of a processor according to the first implementation.

FIG. 8B is a detailed block diagram of the processor according to the first implementation.

Referring to FIG. 8B, the processor 170 may include an image processing unit 810, a judging unit 820, and a control signal generator 830.

The image processing unit 810 may include the image preprocessor 410, the disparity calculator 420, the segmentation unit 432, the object detector 434, the object verification unit 436, the object tracking unit 440, and the application unit 450 as described above with reference to FIGS. 4A and 4B.

The image processing unit 810 may process a forward image or an around view image of the vehicle acquired via the camera 195. The image processing unit 810 may detect an object based on the forward image or the around view image of the vehicle. The image processing unit 810 may detect information from the detected object. Here, the object may be at least one of a traffic light, a traffic sign, and a road surface. In addition, the object may be at least one of a lane, an adjacent vehicle, a pedestrian, a light, and a traffic signal.

The information may be vehicle travel situation information. For example, the information may be ramp information.

The image processing unit 810 may detect ramp information based on a symbol or text marked on a traffic sign or a road surface. The image processing unit 810 may verify the ramp information by comparing detected information with information stored in the memory 140.

The image processing unit 810 may detect side portions of other vehicles from the forward image or the around view image of the vehicle.

The image processing unit 810 may detect a preceding vehicle from the forward image or the around view image of the vehicle. When the camera 195 is a monocular camera, the image processing unit 810 may detect a distance to the preceding vehicle based on variation in the size of the preceding vehicle that is detected in a plurality of frames generated according to the lapse of time. In addition, when the camera 195 includes stereo cameras, the image processing unit 810 may detect a distance to the preceding vehicle based on binocular disparity caused by a distance between the first and second cameras 195a and 195b.

The judging unit 820 may determine whether the vehicle 700 slows down or temporarily stops after entering the ramp.

For example, when ramp information is detected from a traffic sign included in the forward image or the around view image of the vehicle, the judging unit 820 may determine whether the vehicle 700 enters the ramp.

In another example, when side portions of other vehicles are detected from the forward image or the around view image of the vehicle, the judging unit 820 may determine whether the vehicle 700 enters the ramp based on the detected side portions of other vehicles.

In a further example, the judging unit 820 may determine whether the vehicle 700 enters the ramp based on navigation information. Here, navigation information may be received from the AVN apparatus 400, the controller 770 or a separate navigation apparatus via the interface unit 130.

Once the vehicle 700 has entered the ramp, the judging unit 820 determines whether the vehicle 700 slows down or temporarily stops.

For example, the image processing unit 810 detects an object and tracks the detected object. In this case, the judging unit 820 may determine whether the vehicle 700 slows down or temporarily stops via tracking information. Specifically, the judging unit 820 may determine whether the vehicle 700 slows down or temporarily stops based on whether a relative distance or a speed relative to the detected object decreases.

For example, the judging unit 820 may receive vehicle speed information from the sensing unit 760 or the controller 770 via the interface unit 130 and determine whether the vehicle slows down or temporarily stops based on a vehicle speed.

The judging unit 820 determines whether the detected preceding vehicle is stationary from the forward image or the around view image of the vehicle. The judging unit 820 may determine whether the preceding vehicle is stationary based on vehicle speed information and information regarding a distance to the preceding vehicle. Specifically, the judging unit 820 may determine whether the preceding vehicle is stationary based on a speed relative to the preceding vehicle that is calculated based on a vehicle speed and a relative distance to the preceding vehicle. Alternatively, the judging unit 820 may determine whether the preceding vehicle temporarily stops based on a stop lamp of the detected preceding vehicle. The image processing unit 810 detects a stop lamp of the preceding vehicle. The judging unit 820 may determine that the preceding vehicle is stationary when the detected stop lamp is in an ON state.

The control signal generator 830 may generate a control signal to turn the ISG function on or off based on a determined result of the judging unit 820.

When the determined result of the judging unit 820 is that the vehicle 700 does not enter the ramp, the control signal generator 830 generates a control signal to turn on the ISG function.

When the determined result of the judging unit 820 is that the vehicle 700 does not slow down or temporarily stop after entering the ramp, the control signal generator 830 generates a control signal to turn on the ISG function.

When the determined result of the judging unit 820 is that a preceding vehicle is detected and the detected vehicle is stationary in a state in which the vehicle 700 slows down or temporarily stops after entering the ramp, the control signal generator 830 generates a control signal to turn on the ISG function.

When the determined result of the judging unit 820 is that the vehicle 700 slows down or temporarily stops after entering the ramp, the control signal generator 830 generates a control signal to turn off the ISG function.

When the determined result of the judging unit 820 is that no preceding vehicle is detected in a state in which the vehicle 700 slows down or temporarily stops after entering the ramp, the control signal generator 830 generates a control signal to turn off the ISG function.

When the determined result of the judging unit 820 is that a preceding vehicle is detected and the detected preceding vehicle is traveling in a state in which the vehicle 700 slows down or temporarily stops after entering the ramp, the control signal generator 830 generates a control signal to turn off the ISG function.

The control signal generated in the control signal generator 830 may be provided to the controller 770. In this case, the control signal generator 830 may output the control signal to the controller 770 via the interface unit 130.

Figure 9A:
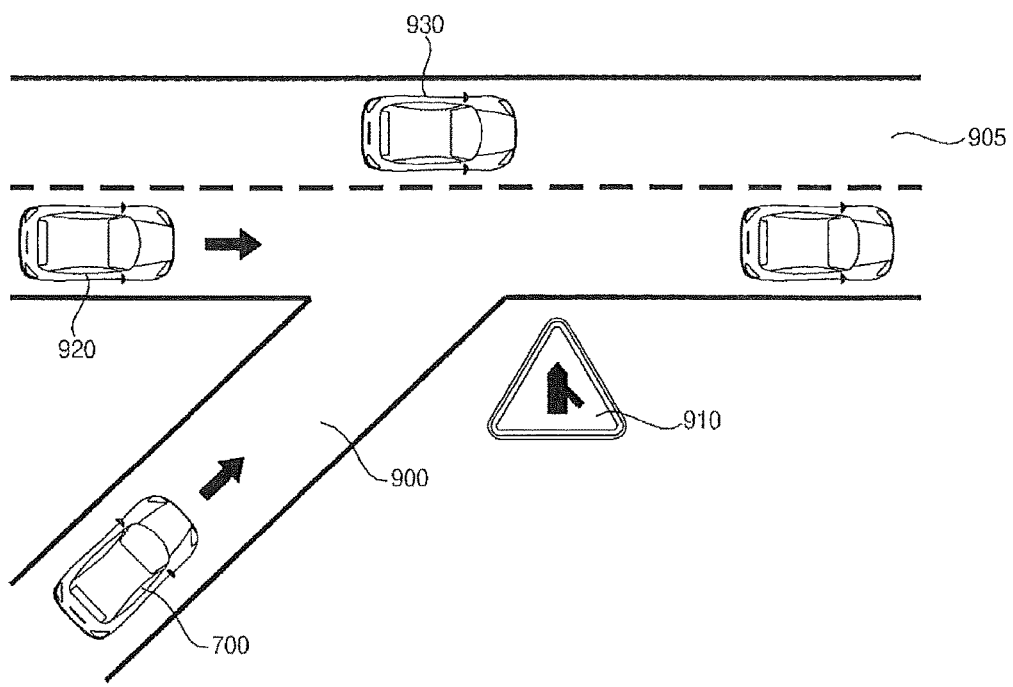
FIGS. 9A to 9C are diagrams illustrating examples of operations of a driver assistance apparatus when a vehicle joins a main road via an on-ramp according to the first implementation.
Figure 9B:
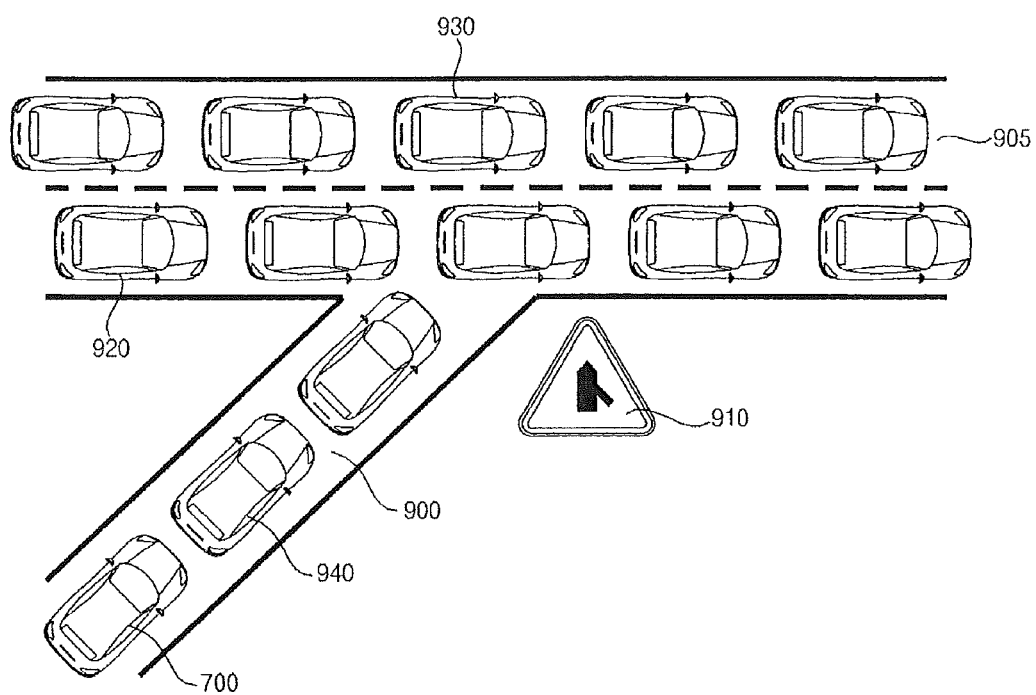
Figure 9C:
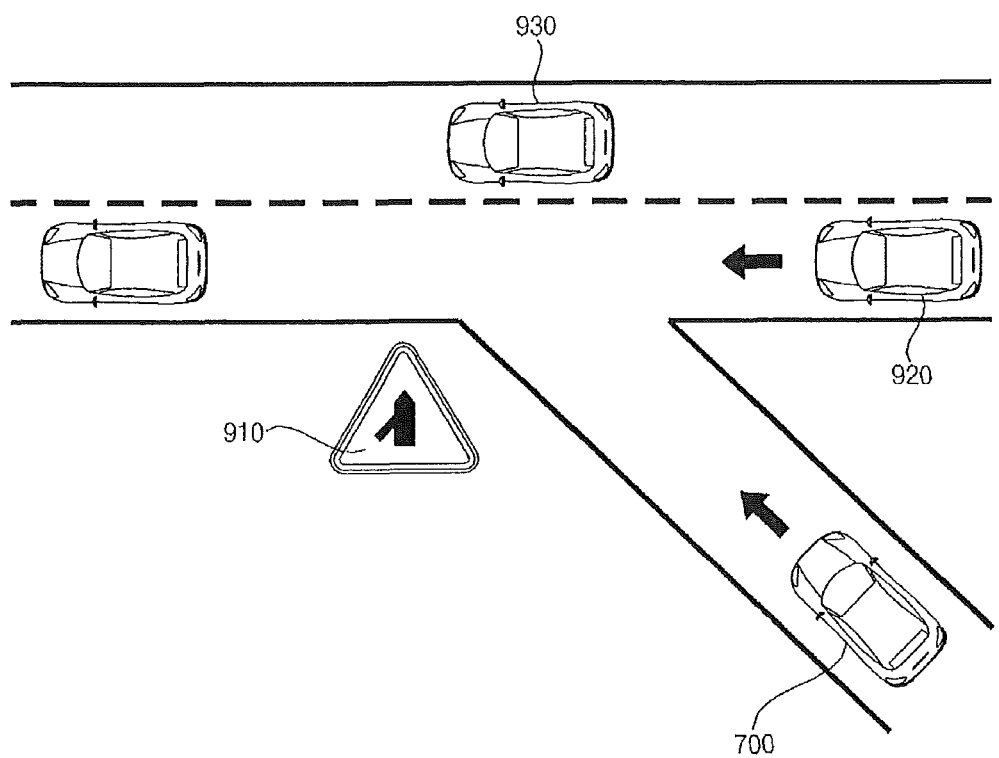

FIGS. 9A to 9C are views referenced to explain the driver assistance apparatus when the vehicle joins a main road via a ramp according to the first implementation. FIGS. 9A and 9B illustrate bird's eye views.

Referring to FIG. 9A, the vehicle 700 may join a main road 905 via a right-turn on a ramp 900.

The processor 170 acquires a forward image or an around view image of the vehicle via the camera 195.

The processor 170 detects a traffic sign 910 or a road surface from the image. The processor 170 may detect ramp information based on a symbol or text marked on the traffic sign 910 or the road surface.

The processor 170 may detect side portions of other vehicles 920 and 930 from the forward image or the around view image of the vehicle.

The processor 170 may determine whether the vehicle 700 has entered the ramp 900 based on the ramp information.

For example, when the ramp information is detected from the traffic sign 910 included in the forward image or the around view image of the vehicle, the processor 170 may determine that the vehicle 700 enters the ramp 900.

In another example, when side portions of other vehicles 920 and 930 are detected from the forward image or the around view image of the vehicle, the processor 170 may determine that the vehicle 700 enters the ramp 900 based on the detected side portions of the vehicles 920 and 930. In the case of acquiring a forward image of the vehicle 700 in a state in which the vehicle 700 is located on the ramp, side portions of other vehicles that are traveling on the main road may be detected from the image. Thus, the processor 170 may determine that the vehicle 700 enters the ramp upon detection of side portions of other vehicles.

In a further example, the processor 170 may determine whether the vehicle 700 enters the ramp based on navigation information.

The processor 170 determines whether the vehicle 700 slows down or temporarily stops once the vehicle 700 has entered the ramp.

For example, the processor 170 may determine whether the vehicle 700 slows down or temporarily stops by detecting a prescribed object from the forward image or the around view image of the vehicle and tracking the detected object.

The processor 170 may receive vehicle speed information from the sensing unit 760 or the controller 770 via the interface unit 130 and determine whether the vehicle 700 slows down or temporarily stops based on a vehicle speed.

When the vehicle slows down or temporarily stops after entering the ramp, the processor 170 generates a control signal to turn off the ISG function. The control signal may be provided to the controller 770. In this case, the ISG function is not operated. As such, operation of the power source does not stop even if an input to the brake pedal 721d is received in a state in which the vehicle 700 travels at a predetermined speed or less or stops and no input to the accelerator pedal 721c is received. For example, the power source may be continuously operated.

When the vehicle 700 slows down or temporarily stops after entering the ramp, the ISG function may not be turned on, even under an ISG function operating condition.

FIG. 9B differs from FIG. 9A in terms of detection of a preceding vehicle. The following description with reference to FIG. 9B will focus on this difference.

The processor 170 may detect a preceding vehicle 940 from a forward image or an around view image of the vehicle. When the camera 195 is a monocular camera, the processor 170 may detect a distance to the preceding vehicle 940 based on variation in the size of the preceding vehicle that is detected in a plurality of frames generated according to the lapse of time. In addition, when the camera 195 includes stereo cameras, the processor 170 may detect a distance to the preceding vehicle 940 based on binocular disparity caused by a distance between first and second cameras 195a and 195b.

The processor 170 may determine whether the preceding vehicle 940 is stationary based on vehicle speed information and information regarding a distance to the preceding vehicle. Specifically, the processor 170 may determine whether the preceding vehicle 940 is stationary based on a speed relative to the preceding vehicle 940 that is calculated based on a vehicle speed and a relative distance to the preceding vehicle 940. Alternatively, the processor 170 may determine whether the preceding vehicle 940 is stationary based on a stop lamp of the detected preceding vehicle 940.

When the preceding vehicle 940 is detected and the detected preceding vehicle 940 is determined as being stationary in a state in which the vehicle 700 slows down or temporarily stops after entering the ramp, the processor 170 generates a control signal to turn on the ISG function. In this case, the ISG function is normally operated. As such, operation of the power source stops when an input to the brake pedal 721d is received in a state in which the vehicle 700 travels at a predetermined speed or less or stops and no input to the accelerator pedal 721c is received.

When the preceding vehicle 940 is detected and the detected preceding vehicle 940 is determined as being traveling in a state in which the vehicle 700 slows down or temporarily stops after entering the ramp, the processor 170 generates a control signal to turn off the ISG function.

FIG. 9C has a difference in that the vehicle is an RHD vehicle as compared to FIG. 9A. Referring to FIG. 9C, when the vehicle 700 is an RHD vehicle, the vehicle 700 may join the main road 905 via a left-turn on the ramp 900.

Figure 10A:
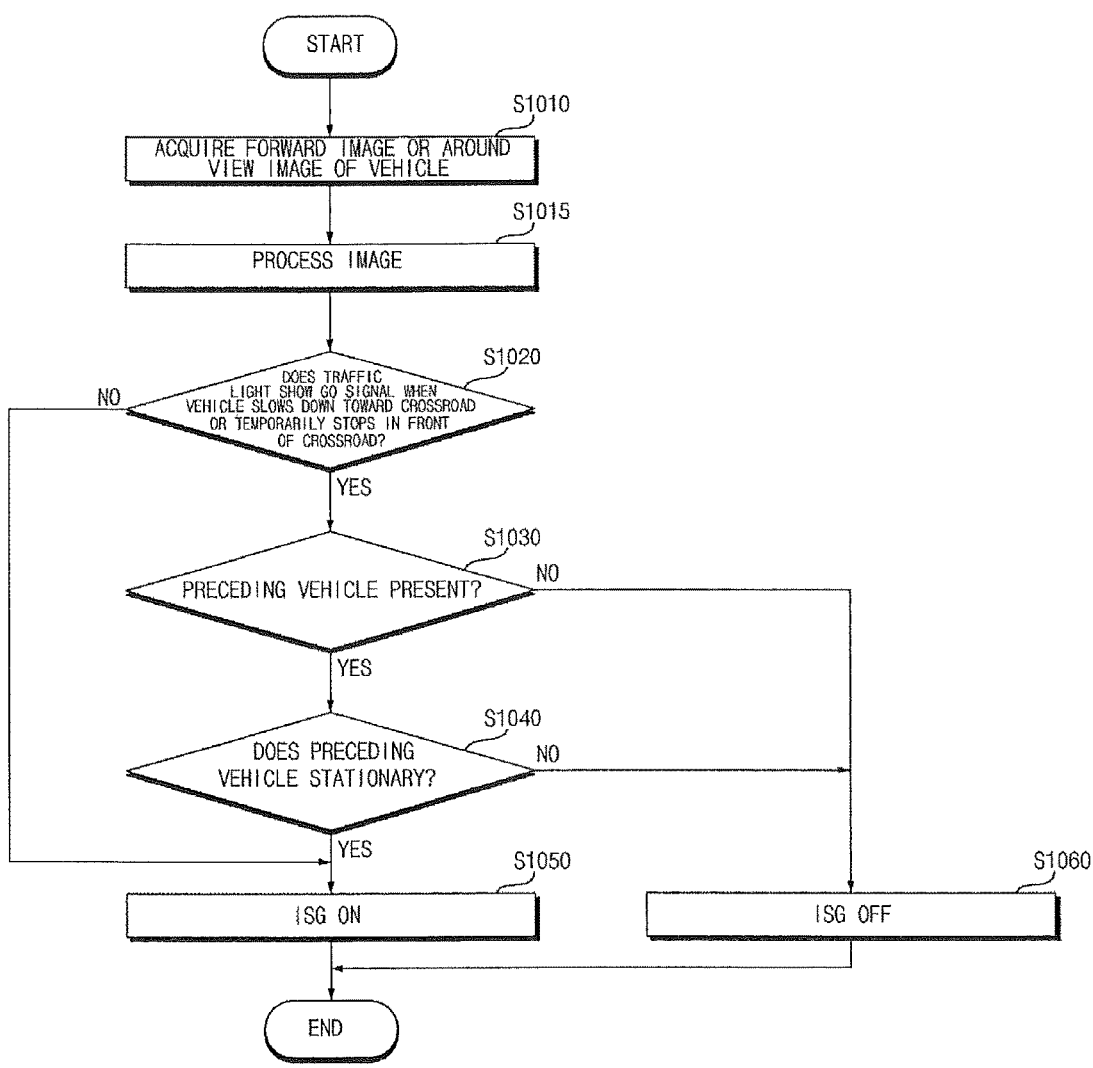
FIG. 10A is a flowchart illustrating an example of operations of a driver assistance apparatus according to a second implementation.

FIG. 10A is a flowchart referenced to explain operation of the driver assistance apparatus according to a second implementation.

Referring to FIG. 10A, the processor 170 may acquire a forward image or an around view image of the vehicle via the camera 195 (S1010). Here, the camera 195 may be the camera as described above with reference to FIGS. 2A to 3C. In some implementations, three or more cameras 195 may be provided.

The camera 195 may capture a forward image or an around view image of the vehicle under control of the processor 170. The image captured by the camera 195 may include at least one object.

The camera 195 may capture an image of at least one of a traffic light, a traffic sign, and a road surface under control of the processor 170.

Once the forward image or the around view image of the vehicle has been acquired, the processor 170 may process the acquired forward image or the acquired around view image (S1015). The processor 170 detects an object from the forward image or the around view image of the vehicle. The processor 170 may detect information from the detected object. Here, the object may be at least one of a traffic light, a traffic sign and a road surface. In addition, the object may be at least one of a lane, an adjacent vehicle, a pedestrian, a light, and a traffic signal.

The information may be vehicle travel situation information. For example, the information may be crossroad information or information regarding a signal output from a traffic light.

The processor 170 may detect an object from the image and detect crossroad information or traffic light output information from the detected object. Here, the object may be a lane, a traffic light, or a traffic sign.

For example, the processor 170 may detect information regarding a crossroad located in front of the vehicle based on the detected lanes of the road surface.

In another example, the processor 170 may detect information regarding a crossroad located in front of the vehicle based on a traffic light installed at the detected crossroad.

In a further example, the processor 170 may detect crossroad information based on a symbol or text of the detected traffic sign.

The processor 170 may detect traffic light output signal information based on the traffic light detected from the forward image or the around view image of the vehicle.

For example, the processor 170 may detect traffic light output signal information based on the color or shape of a traffic light image.

The processor 170 may verify the crossroad information or the traffic light output signal information by comparing detected information with information stored in the memory 140.

The processor 170 may detect a preceding vehicle from the forward image or the around view image of the vehicle. When the camera 195 is a monocular camera, the processor 170 may detect a distance to the preceding vehicle based on variation in the size of the preceding vehicle that is detected in a plurality of frames generated according to the lapse of time. In addition, when the camera 195 includes stereo cameras, the processor 170 may detect a distance to the preceding vehicle based on binocular disparity caused by a distance between first and second cameras 195a and 195b.

The processor 170 determines whether the vehicle 700 slows down toward or temporarily stops in front of the crossroad. In addition, the processor 170 may determine whether a signal output from the traffic light is a go signal (S1020). Here, slowing down is a condition that causes the ISG function to be turned on and may mean that the vehicle travels at a predetermined speed or less (e.g., 10 km/h or less). Here, temporary stop is a condition that causes the ISG function to be turned on and may mean that the vehicle stops during a short time (e.g., 1 second or less) and thereafter accelerates.

The processor 170 may determine whether the vehicle 700 slows down toward or temporarily stops in front of the crossroad based on the detected information.

For example, the processor 170 may determine whether the vehicle 700 slows down toward or temporarily stops in front of the crossroad by detecting a prescribed object (e.g., information regarding a traffic light installed at the crossroad, a lane, or a traffic sign) from the forward image or the around view image of the vehicle and tracking the detected object. Specifically, the processor 170 may determine whether the vehicle 700 slows down or temporarily stops based on a relative distance or a speed relative to the detected object.

In another example, the processor 170 may determine whether the vehicle 700 slows down toward or temporarily stops in front of the crossroad based on navigation information. Here, the navigation information may be received from the AVN apparatus 400, the controller 770, or a separate navigation apparatus via the interface unit 130.

When the vehicle 700 slows down toward or temporarily stops in front of the crossroad, the processor 170 determines whether a signal output from the traffic light is a go signal. Here, the traffic light is a traffic light that outputs a prescribed signal toward the vehicle 700 at the crossroad.

The processor 170 may determine whether the signal output from the traffic light is a go signal based on the detected information. Here, the go signal may be a signal that instructs the vehicle to go straight or to make a left-turn (or a right-turn in the case of an RHD vehicle) at the crossroad.

The processor 170 may determine whether the signal output from the traffic light is a go signal by detecting the color or shape of the traffic light. For example, when the detected color of the traffic light is green, the processor 170 may determine that the output signal is a straight signal. For example, when the detected shape of the traffic light is a leftward arrow, the processor 170 may determine that the output signal is a left-turn signal. In the case of an RHD vehicle, when the shape of the traffic light is a rightward arrow, the processor 170 may determine that the output signal is a right-turn signal.

Subsequently, the processor 170 may determine whether a preceding vehicle is detected from the forward image or the around view image of the vehicle and whether the detected preceding vehicle is stationary (S1030 and S1040).

The processor 170 may determine whether the preceding vehicle is stationary based on vehicle speed information and information regarding a distance to the preceding vehicle. Specifically, the processor 170 may determine whether the preceding vehicle is stationary based on a speed relative to the preceding vehicle that is calculated based on a vehicle speed and a relative distance to the preceding vehicle. Alternatively, the processor 170 may determine whether the preceding vehicle is stationary based on a stop lamp of the detected preceding vehicle. The processor 170 may determine that the preceding vehicle stationary when the detected stop lamp is in an ON state.

When the preceding vehicle is detected and the detected preceding vehicle is determined as being stationary, the processor 170 may generate a control signal to turn on the ISG function (S1050). The control signal may be transmitted to the controller 770.

When the preceding vehicle is not detected or the detected preceding vehicle is determined as being traveling, the processor 170 may generate a control signal to turn off the ISG function (S1060). The control signal may be transmitted to the controller 770.

Generally, when an input to the brake pedal 721d is received in a state in which the vehicle travels at a predetermined speed or less or stops and no input to the accelerator pedal 721c is received, the ISG function is turned on to stop operation of the power source. However, according to the second implementation, in the case where the signal output from the traffic light is a go signal when the vehicle slows down toward or temporarily stops in front of the crossroad, the ISG function is not turned on even under an ISG function operating condition. This may allow the vehicle 700 to rapidly go straight or turn to the left (or turn to the right in the case of an RHD vehicle) without delay at the crossroad. Accordingly, the driver assistance apparatus 100 has the effects of preventing travel delay caused when the ISG function is turned on during traveling at the crossroad and preventing accidents due to travel delay.

Figure 10B:
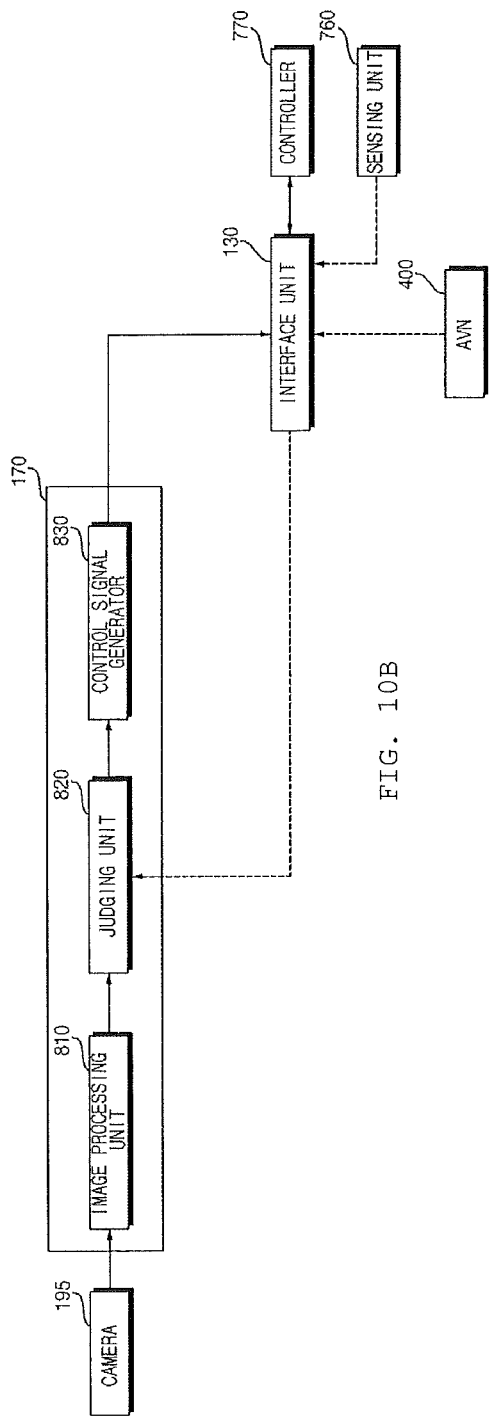
FIG. 10B is a block diagram illustrating an example of details of a processor according to the second implementation.

FIG. 10B is a detailed block diagram of the processor according to the second implementation.

Referring to FIG. 10B, the processor 170 may include the image processing unit 810, the judging unit 820, and the control signal generator 830.

The image processing unit 810 may process a forward image or an around view image of the vehicle acquired via the camera 195. The image processing unit 810 may detect an object based on the forward image or the around view image of the vehicle. The image processing unit 810 may detect information from the detected object. Here, the object may be at least one of a traffic light, a traffic sign, and a road surface. In addition, the object may be at least one of a lane, an adjacent vehicle, a pedestrian, a light, and a traffic signal.

The information may be vehicle travel situation information. For example, the information may be crossroad information or traffic light output signal information.

The image processing unit 810 may detect crossroad information based on a traffic light or a road surface included in the forward image or the around view image of the vehicle.

The image processing unit 810 may detect information regarding a crossroad located in front of the vehicle based on lanes on the detected road surface. The image processing unit 810 may detect information regarding a crossroad located in front of the vehicle based on the detected traffic light installed at the crossroad.

The image processing unit 810 may detect crossroad information based on a symbol or text of a detected traffic sign.

The image processing unit 810 may detect traffic light output signal information based on a traffic light image included in the forward image or the around view image of the vehicle.

The image processing unit 810 may verify crossroad information or traffic light output signal information by comparing detected information with information stored in the memory 140.

The image processing unit 810 may detect a preceding vehicle from the forward image or the around view image of the vehicle. When the camera 195 is a monocular camera, the image processing unit 810 may detect a distance to the preceding vehicle based on variation in the size of the preceding vehicle that is detected in a plurality of frames generated according to the lapse of time. In addition, when the camera 195 includes stereo cameras, the image processing unit 810 may detect a distance to the preceding vehicle based on binocular disparity caused by a distance between the first and second cameras 195a and 195b.

The judging unit 820 may determine whether the vehicle 700 slows down toward or temporarily stops in front of the crossroad.

For example, after detecting crossroad information, the image processing unit 810 tracks the detected crossroad information. In this case, the judging unit 820 may determine whether the vehicle 700 slows down toward or temporarily stops in front of the crossroad via tracking information. The judging unit 820 may receive vehicle speed information from the sensing unit 760 or the controller 770 via the interface unit 130 and determine whether the vehicle 700 slows down or temporarily stops based on a vehicle speed.

In another example, the judging unit 820 may determine whether the vehicle 700 slows down toward or temporarily stops in front of the crossroad based on navigation information. Here, the navigation information may be received from the AVN apparatus 400, the controller 770, or a separate navigation apparatus via the interface unit 130.

When the vehicle 700 slows down toward or temporarily stops in front of the crossroad, the judging unit 820 determines whether a signal output from a traffic light is a go signal. The judging unit 820 may determine whether the signal output from the traffic light is a go signal based on detected information. Here, the go signal may be a signal that instructs the vehicle to go straight or to make a left-turn (or a right-turn in the case of an RHD vehicle) at the crossroad.

The judging unit 820 may determine whether the signal output from the traffic light is a go signal by detecting the color or shape of the traffic light. For example, when the detected color of the traffic light is green, the judging unit 820 may determine that the output signal is a straight signal. For example, when the detected shape of the traffic light is a leftward arrow, the judging unit 820 may determine that the output signal is a left-turn signal.

The judging unit 820 may determine whether the preceding vehicle detected from the forward image or the around view image of the vehicle is stationary. The judging unit 820 may determine whether the preceding vehicle is stationary based on vehicle speed information and information regarding a distance to the preceding vehicle. Specifically, the judging unit 820 may determine whether the preceding vehicle is stationary based on a speed relative to the preceding vehicle that is calculated based on a vehicle speed and a relative distance to the preceding vehicle. Alternatively, the judging unit 820 may determine whether the preceding vehicle is stationary based on a stop lamp of the detected preceding vehicle. The judging unit 820 may determine that the preceding vehicle is stationary when the detected stop lamp is in an ON state.

The control signal generator 830 may generate a control signal to turn the ISG function on or off based on a determined result of the judging unit 820.

When the determined result of the judging unit 820 is that the vehicle 700 does not slow down toward the crossroad or does not temporarily stop in front of the crossroad, the control signal generator 830 may generate a control signal to turn on the ISG function.

When the determined result of the judging unit 820 is that the signal output from the traffic light is not a go signal in a state in which the vehicle 700 slows down toward or temporarily stops in front of the crossroad, the control signal generator 830 may generate a control signal to turn on the ISG function.

When the determined result of the judging unit 820 is that a preceding vehicle is detected and the detected preceding vehicle is stationary in a state in which the vehicle 700 slows down toward or temporarily stops in front of the crossroad and the signal output from the traffic light is a go signal, the control signal generator 830 generates a control signal to turn on the ISG function.

When the determined result of the judging unit 820 is that the vehicle 700 slows down toward or temporarily stops in front of the crossroad and the signal output from the traffic light is a go signal, the control signal generator 830 generates a control signal to turn off the ISG function.

When the determined result of the judging unit 820 is that no preceding vehicle is detected in a state in which the vehicle 700 slows down toward or temporarily stops in front of the crossroad and the signal output from the traffic light is a go signal, the control signal generator 830 generates a control signal to turn off the ISG function.

When the determined result of the judging unit 820 is that a preceding vehicle is detected and the detected preceding vehicle is traveling in a state in which the vehicle 700 slows down toward or temporarily stops in front of the crossroad and the signal output from the traffic light is a go signal, the control signal generator 830 generates a control signal to turn off the ISG function.

The control signal generated in the control signal generator 830 may be provided to the controller 770. In this case, the control signal generator 830 may output the control signal to the controller 770 via the interface unit 130.

Figure 11A:
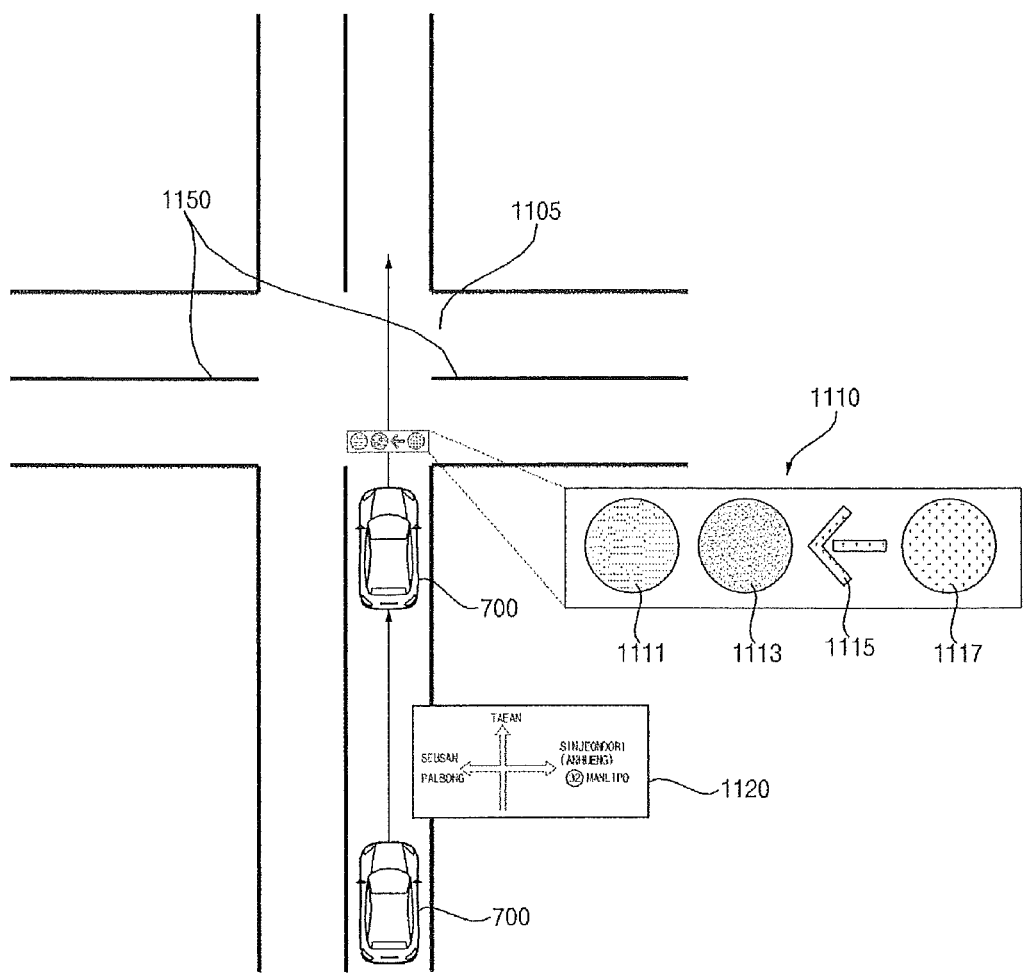
FIGS. 11A to 11C are diagrams illustrating examples of operations of a driver assistance apparatus when a vehicle travels toward or at a crossroad according to the second implementation.
Figure 11B:
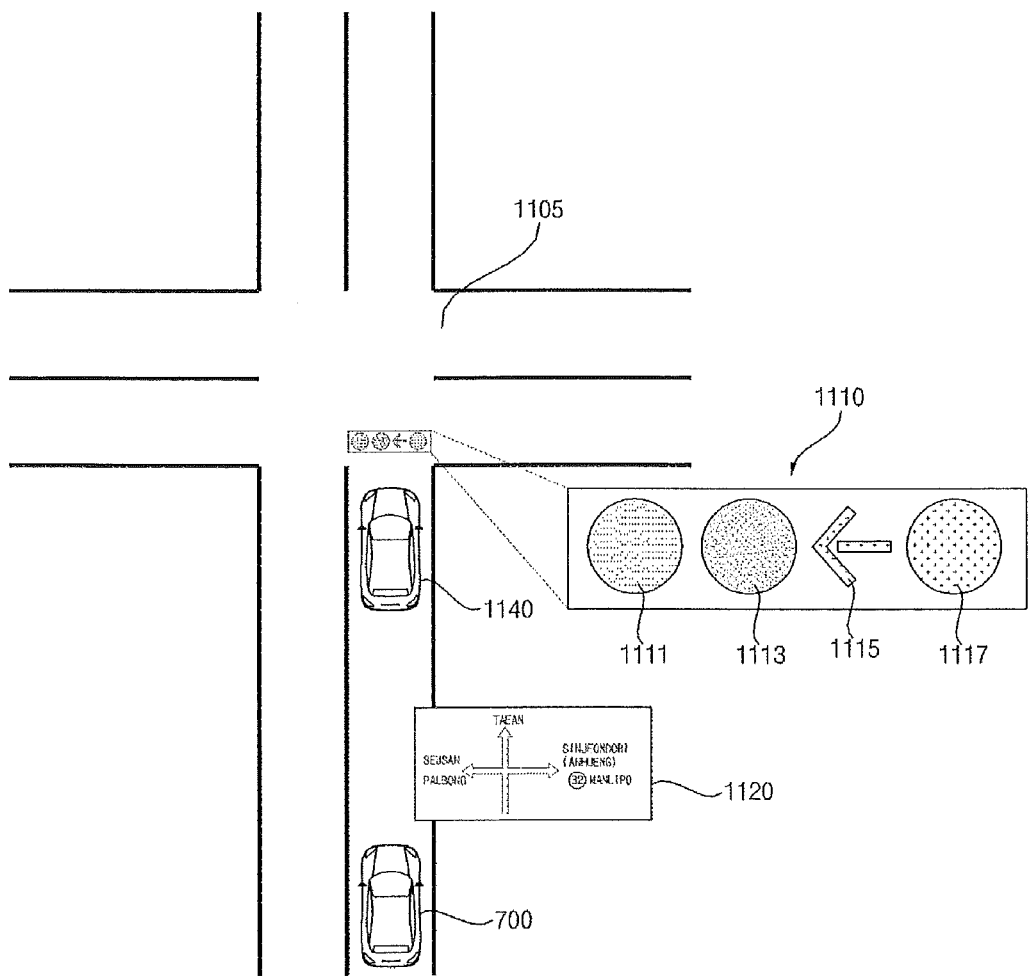
Figure 11C:
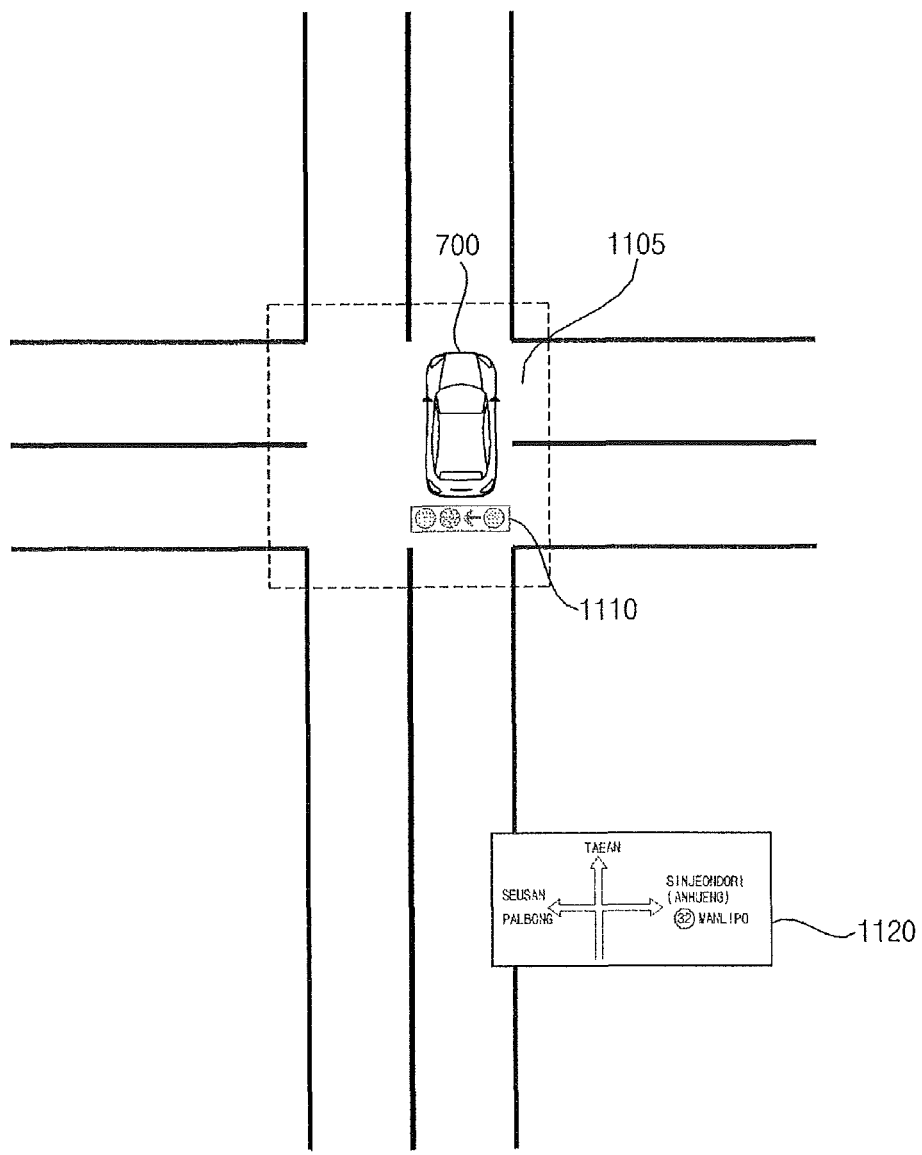

FIGS. 11A to 11C are views referenced to explain the driver assistance apparatus when the vehicle travels toward or at a crossroad according to the second implementation. FIGS. 11A to 11C illustrate bird's eye views.

Referring to FIG. 11A, the processor 170 acquires a forward image or an around view image of the vehicle via the camera 195.

The processor 170 may detect information regarding a crossroad 1105 based on a traffic light, a traffic sign 1120, or a road surface included in the forward image or the around view image of the vehicle.

For example, the processor 170 may detect information regarding a crossroad located in front of the vehicle based on a lane on a detected road surface. That is, when a lane 1150 formed in a direction different from the direction of travel of the vehicle is detected, the processor 170 may detect information regarding whether the crossroad 1105 is present.

In another example, the processor 170 may detect information regarding a crossroad located in front of the vehicle based on a traffic light 1110 installed at the detected crossroad 1105. That is, when the detected traffic light 1110 is a traffic light that outputs a stop signal 1111, a waiting signal 1113, a left-turn signal 1115, and a straight signal 1117, the processor 170 may detect information whether the crossroad 1105 is present.

In a further example, the processor 170 may detect information regarding a crossroad located in front of the vehicle based on a symbol or text of a detected traffic sign 1120. That is, the processor 170 may detect information regarding whether the crossroad is present based on a symbol of a crossroad marked on the traffic sign 1120.

The processor 170 may detect traffic light output signal information based on a traffic light image included in the forward image or the around view image of the vehicle.

For example, the processor 170 may detect traffic light output signal information based on the color or shape of a traffic light image.

The processor 170 may determine whether the vehicle 700 slows down toward or temporarily stops in front of the crossroad based on the detected information.

For example, the processor 170 may determine whether the vehicle 700 slows down toward or temporarily stops in front of the crossroad by detecting crossroad information and tracking the detected crossroad information. In such scenarios, the processor 170 may receive vehicle speed information from the sensing unit 760 or the controller 770 via the interface unit 130 and determine whether the vehicle 700 slows down or temporarily stops based on a vehicle speed.

In another example, the processor 170 may determine whether the vehicle 700 slows down toward or temporarily stops in front of the crossroad based on navigation information. Here, the navigation information may be received from the AVN apparatus 400, the controller 770, or a separate navigation apparatus via the interface unit 130.

When the vehicle 700 slows down toward or temporarily stops in front of the crossroad, the processor 170 may determine whether a signal output from a traffic light is a go signal based on detected information. Here, the go signal may be a signal that instructs the vehicle to go straight or to turn to the left (turn to the right in the case of an RHD vehicle) at the crossroad.

For example, when a green image is detected from the detected traffic light image, the processor 170 may detect a straight signal.

When the signal output from the traffic light is a straight signal in a state in which the vehicle 700 slows down toward or temporarily stops in front of the crossroad, the control signal generator 830 generates a control signal to turn off the ISG function. The control signal may be provided to the controller 770. In this case, the ISG function is not operated. As such, operation of the power source does not stop even if an input to the brake pedal 721d is received in a state in which the vehicle 700 travels at a predetermined speed or less or stops and no input to the accelerator pedal 721c is received. That is, the power source is continuously operated.

That is, in the case where the signal output from the traffic light is a go signal when the vehicle 700 slows down toward or temporarily stops in front of the crossroad, the ISG function is not turned on even under an ISG function operating condition.

FIG. 11B differs from FIG. 11A in terms of detection of a preceding vehicle. The following description with reference to FIG. 11B will focus on this difference.

The processor 170 may detect a preceding vehicle 1140 from a forward image or an around view image of the vehicle. When the camera 195 is a monocular camera, the processor 170 may detect a distance to the preceding vehicle 1140 based on variation in the size of the preceding vehicle that is detected in a plurality of frames generated according to the lapse of time. In addition, when the camera 195 includes stereo cameras, the processor 170 may detect a distance to the preceding vehicle 1140 based on binocular disparity caused by a distance between first and second cameras 195a and 195b.

The processor 170 may determine whether the preceding vehicle 1140 is stationary based on vehicle speed information and information regarding a distance to the preceding vehicle 1140. Specifically, the processor 170 may determine whether the preceding vehicle 1140 is stationary based on a speed relative to the preceding vehicle that is calculated based on a vehicle speed and a relative distance to the preceding vehicle 1140. Alternatively, the processor 170 may determine whether the preceding vehicle 1140 is stationary based on a stop lamp of the detected preceding vehicle 1140.

When the preceding vehicle 1140 is detected and the detected preceding vehicle 1140 is stationary even in the case where a signal output from a traffic light is a go signal in a state in which the vehicle 700 slows down toward or temporarily stops in front of the crossroad, the processor 170 generates a control signal to turn on the ISG function. In this case, the ISG function is normally operated to stop operation of the power source when an input to the brake pedal 721d is received in a state in which the vehicle 700 travels at a predetermined speed or less or stops and no input to the accelerator pedal 721c is received.

When the preceding vehicle 1140 is detected and the detected preceding vehicle 1140 is traveling in the case where a signal output from a traffic light is a go signal in a state in which the vehicle 700 slows down toward or temporarily stops in front of the crossroad, the control signal generator 830 generates a control signal to turn off the ISG function.

FIG. 11C is a view referenced to explain operation of the driver assistance apparatus when the vehicle 700 is traveling at a crossroad area 1105. In a situation of FIG. 11C, the vehicle 700 may go straight or make a left-turn (or a right-turn in the case of an RHD vehicle) after passing through the crossroad area 1105.

The processor 170 may determine that the vehicle 700 is traveling at the crossroad area 1105 based on a forward image or an around view image of the vehicle acquired by the camera 195 or navigation information.

For example, the processor 170 may determine that the vehicle 700 is traveling at the crossroad area 1105 by detecting crossroad information and tracking the detected crossroad information.

In another example, the processor 170 receives navigation information from the controller 770, the AVN apparatus 400, or a separate navigation apparatus via the interface unit 130. The processor 170 may verify information regarding a road on which the vehicle 700 is traveling and current location information of the vehicle 700 based on the received navigation information. The processor 170 may determine that the vehicle 700 is traveling at the crossroad area 1105 based on the travel road and vehicle location information.

While the vehicle 700 is traveling at the crossroad area 1105, the processor 170 generates a control signal to turn off the ISG function.

When the ISG function is turned on as ISG conditions are satisfied while the vehicle 700 is traveling at the crossroad region 1105, there is a risk of accidents. Specifically, when the user removes their foot from a brake pedal and steps on an accelerator pedal in a state in which the ISG function is in an ON state while the vehicle 700 is traveling at the crossroad area 1105, a delay for a prescribed time may occur. This is because a given time is required until the power source is again operated. Thus, in this case, there is a risk of an accident by another vehicle that is traveling in a direction different from the direction of travel of the vehicle 700.

However, by turning off the ISG function when the vehicle 700 is traveling at the crossroad area 1105, it is possible to reduce the risk of an accident.

Figure 12A:
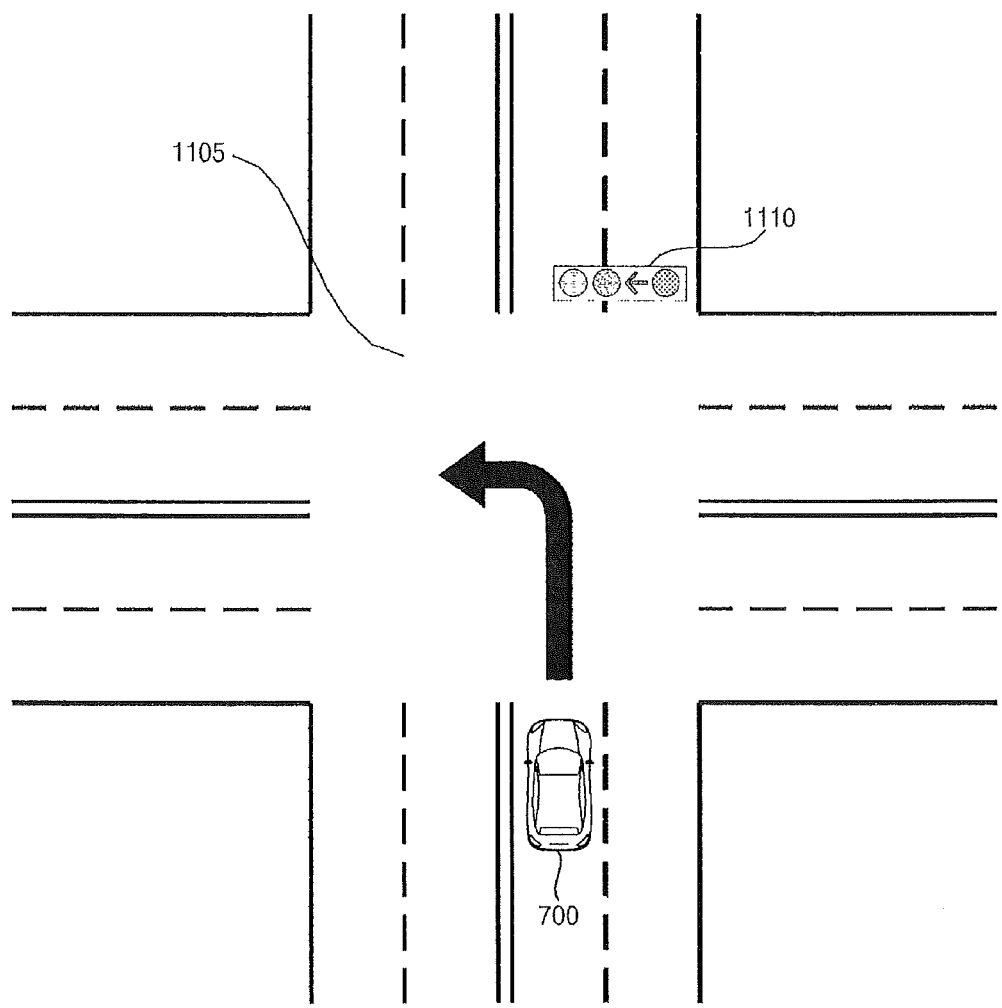
FIGS. 12A and 12B are diagrams illustrating examples of operations of a driver assistance apparatus when a vehicle waits for left-turn (or right-turn in the case of a right-hand drive (RHD) vehicle) or makes a left-turn at a crossroad according to the second implementation.
Figure 12B:
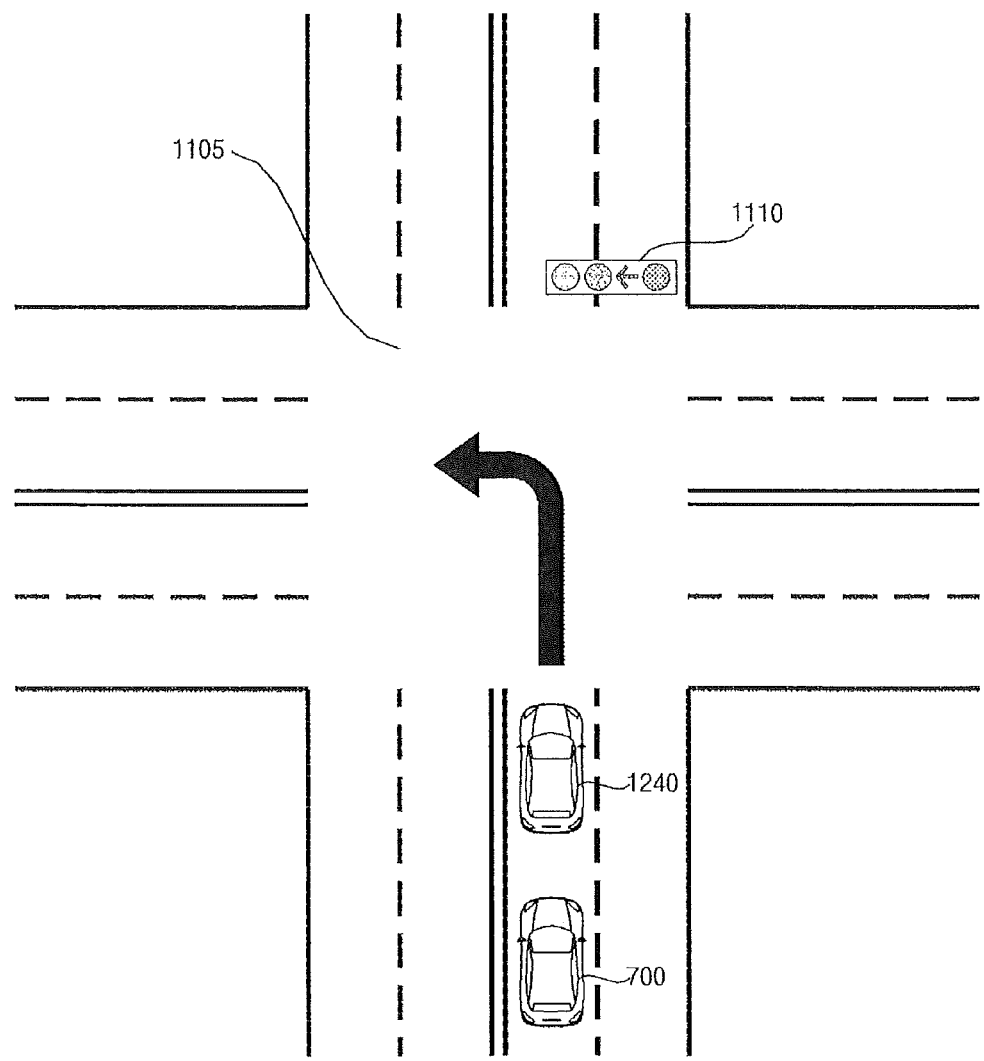

FIGS. 12A and 12B are views referenced to explain the driver assistance apparatus when the vehicle waits to turn to the left (or turn to the right in the case of an RHD vehicle) or makes a left-turn at the crossroad according to the second implementation. FIGS. 12A and 12B illustrate bird's eye views.

FIG. 12A illustrates a left-turn situation of the vehicle 700 differently from FIG. 11A in which the vehicle 700 goes straight. The following description will focus on this difference.

The processor 170 may detect information regarding the crossroad 1105 and information regarding a signal output from a traffic light as described above with reference to FIG. 11A.

When the vehicle 700 slows down toward or temporarily stops in front of the crossroad, the processor 170 may determine whether the signal output from the traffic light is a go signal based on the detected information. Here, the go signal may be a straight signal or a left-turn signal (or a right-turn signal in the case of an RHD vehicle) at the crossroad.

For example, in the case of an LHD vehicle, the processor 170 may detect a left-turn signal when a leftward arrow image is detected from a detected traffic light image.

In another example, in the case of an RHD vehicle, the processor 170 may detect a right-turn signal when a rightward arrow image is detected from a detected traffic light image.

When the signal output from the traffic light is a left-turn signal (or a right-turn signal in the case of an RHD vehicle) in a state in which the vehicle 700 slows down toward or temporarily stops in front of the crossroad, the control signal generator 830 generates a control signal to turn off the ISG function. The control signal may be provided to the controller 770. In this case, the ISG function is not operated. As such, operation of the power source does not stop even if an input to the brake pedal 721*d* is received in a state in which the vehicle 700 travels at a predetermined speed or less or stops and no input to the accelerator pedal 721*c* is received. For example, the power source is continuously operated.

FIG. 12B differs from FIG. 12A in terms of detection of a preceding vehicle. The following description with reference to FIG. 12B will focus on this difference.

The processor 170 may detect a preceding vehicle 1240 from a forward image or an around view image of the vehicle. When the camera 195 is a monocular camera, the processor 170 may detect a distance to the preceding vehicle 1240 based on variation in the size of the preceding vehicle that is detected in a plurality of frames generated according to the lapse of time. In addition, when the camera 195 includes stereo cameras, the processor 170 may detect a distance to the preceding vehicle 1240 based on binocular disparity caused by a distance between first and second cameras 195*a* and 195*b*.

The processor 170 may determine whether the preceding vehicle 1240 is stationary based on vehicle speed information and information regarding a distance to the preceding vehicle. Specifically, the processor 170 may determine whether the preceding vehicle 1240 is stationary based on a speed relative to the preceding vehicle that is calculated based on a vehicle speed and a relative distance to the preceding vehicle. Alternatively, the processor 170 may determine whether the preceding vehicle 1240 is stationary based on a stop lamp of the detected preceding vehicle 1240.

When the preceding vehicle 1140 is detected and the detected preceding vehicle 1140 is determined as being stationary when a signal output from a traffic light is a left-turn signal (or a right-turn signal in the case of an RHD vehicle) in a state in which the vehicle 700 slows down toward or temporarily stops in front of the crossroad, the processor 170 generates a control signal to turn on the ISG function. In this case, the ISG function is normally operated. As such, operation of the power source stops when an input to the brake pedal 721*d* is received in a state in which the vehicle 700 travels at a predetermined speed or less or stops and no input to the accelerator pedal 721*c* is received.

When the preceding vehicle 1140 is detected and the detected preceding vehicle 1140 is determined as being traveling when a signal output from a traffic light is a left-turn signal (or a right-turn signal in the case of an RHD vehicle) in a state in which the vehicle 700 slows down toward or temporarily stops at the crossroad, the processor 170 generates a control signal to turn off the ISG function.

Figure 13A:
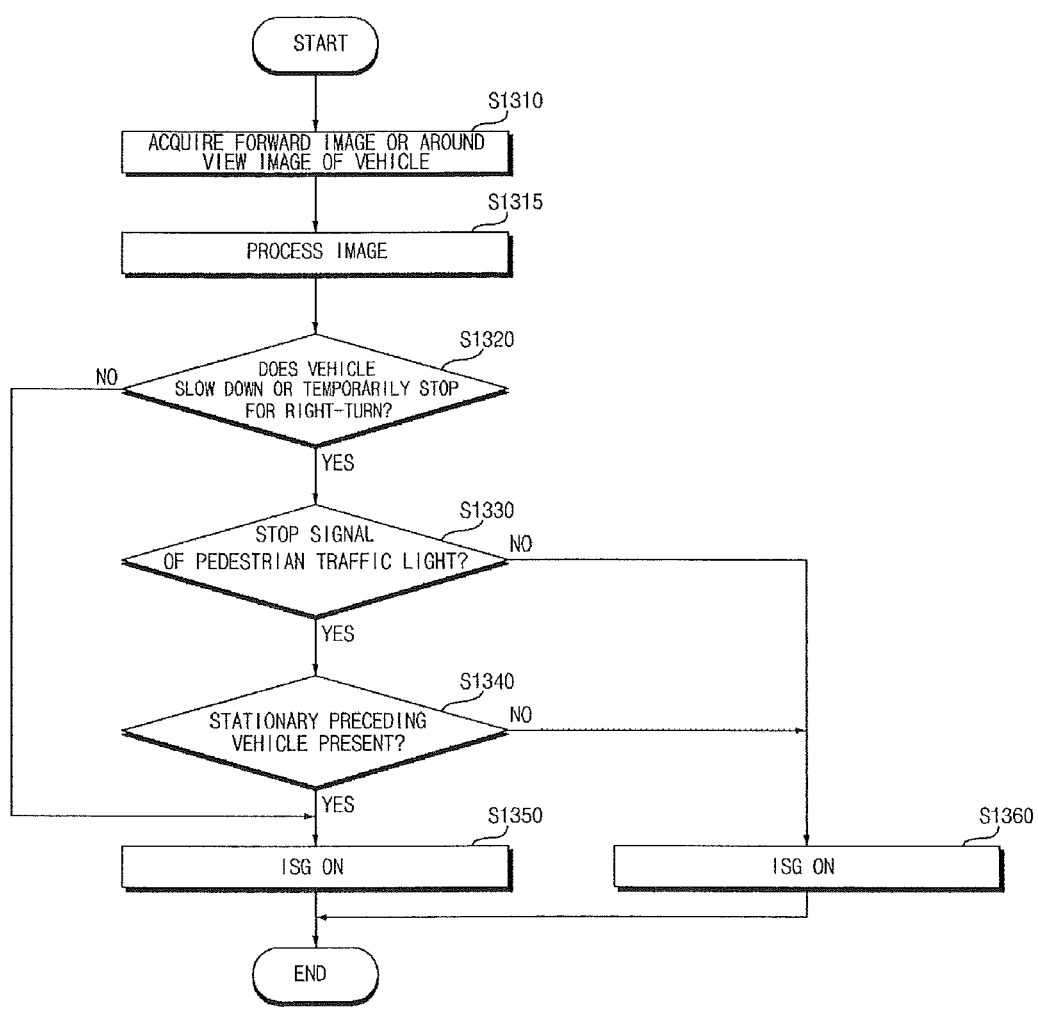
FIG. 13A is a flowchart illustrating an example of operations of a driver assistance apparatus according to a third implementation.

FIG. 13A is a flowchart referenced to explain operation of the driver assistance apparatus according to a third implementation.

Referring to FIG. 13A, the processor 170 may acquire a forward image or an around view image of the vehicle via the camera 195 (S1310). Here, the camera 195 may be the camera as described above with reference to FIGS. 2A to 3C. In some implementations, three or more cameras 195 may be provided.

The camera 195 may capture a forward image or an around view image of the vehicle under control of the processor 170. The image captured by the camera 195 may include at least one object.

The camera 195 may capture an image of at least one of a traffic light, a traffic sign, and a road surface under control of the processor 170.

Once the forward image or the around view image of the vehicle has been acquired, the processor 170 may process the acquired forward image or the acquired around view image (S1315). The processor 170 detects an object from the forward image or the around view image of the vehicle. The processor 170 may detect information from the detected object. Here, the object may be at least one of a traffic light, a traffic sign, and a road surface.

The information may be vehicle travel situation information. For example, the information may be crossroad information or traffic light output signal information. The traffic light may be a vehicle traffic light or a pedestrian traffic light.

The processor 170 may detect crossroad information based on a traffic light, a traffic sign, or a road surface included in the forward image or the around view image of the vehicle. The processor 170 may detect crossroad information in the same manner as the above description with reference to FIGS. 10A to 12B.

The processor 170 may detect traffic light output signal information based on a traffic light image included in the forward image or the around view image of the vehicle. The processor 170 may detect traffic light output signal information based on the color or shape of the traffic light image. The processor 170 may verify the traffic light output signal information by comparing the detected information with information stored in the memory 140.

The processor 170 may detect a preceding vehicle from the forward image or the around view image of the vehicle. When the camera 195 is a monocular camera, the processor 170 may detect a distance to the preceding vehicle based on variation in the size of the preceding vehicle that is detected in a plurality of frames generated according to the lapse of time. In addition, when the camera 195 includes stereo cameras, the processor 170 may detect a distance to the preceding vehicle based on binocular disparity caused by a distance between first and second cameras 195*a* and 195*b*.

The processor 170 may determine whether the vehicle 700 slows down or temporarily stops for right-turn (S1320). Here, slowing down is a condition that causes the ISG function to be turned on and may mean that the vehicle travels at a predetermined speed or less (e.g., 10 km/h or less). Here, temporary stop is a condition that causes the ISG function to be turned on and may mean that the vehicle stops during a short time (e.g., 1 second or less) and thereafter accelerates.

The processor 170 may determine a right-turn situation based on navigation information or turn signal information.

For example, the processor 170 may determine a right-turn situation based on navigation information. Here, the processor 170 may receive navigation information from the AVN apparatus 400, the controller 770, or a separate navigation apparatus via the interface unit 130. The navigation information includes routing information from a current vehicle location to a destination. The processor 170 may determine a right-turn situation at a current vehicle location based on the routing information.

In another example, the processor 170 may determine a right-turn situation based on turn signal information. Here, the processor 170 may receive turn signal information from the controller 770 via the interface unit 130. The turn signal information may be a turn-on signal of a turn signal for left-turn or right-turn input by the user. When an input to turn on a left or right turn signal is input via the user input unit (724 of FIG. 7) of the vehicle, the processor 170 may receive turn signal information via the interface unit 130. The processor 170 may determine a right-turn situation upon receiving turn signal information for right-turn at a location close to the crossroad.

The processor 170 may determine whether the vehicle 700 slows down or temporarily stops.

For example, the processor 170 may determine whether the vehicle 700 slows down toward or temporarily stops in front of the crossroad by detecting a prescribed object (e.g., crossroad information) from the forward image or the around view image of the vehicle and tracking the detected object. Specifically, the processor 170 may determine whether the vehicle 700 slows down or temporarily stops based on a relative distance or a speed relative to the detected object.

For example, the processor 170 may receive vehicle speed information from the sensing unit 760 or the controller 770 via the interface unit 130 and determine whether the vehicle 700 slows down or temporarily stops based on a vehicle speed.

Once that the vehicle 700 slows down or temporarily stops for right-turn has been determined, the processor 170 may determine whether a signal output from a detected pedestrian traffic light is pedestrian stop information (S1330).

The processor 170 may determine whether a signal output from a pedestrian traffic light is pedestrian stop information based on detected information.

The processor 170 may determine whether the signal output from the pedestrian traffic light is pedestrian stop information by detecting the color or shape of the pedestrian traffic light. For example, when the detected color of the pedestrian traffic light is red, the processor 170 may determine that the output signal is a pedestrian stop signal. For example, when the shape of the detected pedestrian traffic light is a standing person shape, the processor 170 may determine that the output signal is a pedestrian stop signal.

Subsequently, the processor 170 may determine whether a preceding vehicle is detected from the forward image or the around view image of the vehicle and whether the detected preceding vehicle is stationary (S1340).

The processor 170 may determine whether a preceding vehicle is stationary based on vehicle speed information and information regarding a distance to the preceding vehicle. Specifically, the processor 170 may determine whether the preceding vehicle is stationary based on a speed relative to the preceding vehicle that is calculated based on a vehicle speed and a relative distance to the preceding vehicle. Alternatively, the processor 170 may determine whether the preceding vehicle is stationary based on a stop lamp of the detected preceding vehicle. The processor 170 may determine that the preceding vehicle is stationary when the detected stop lamp is in an ON state.

When the preceding vehicle is detected and the detected preceding vehicle is determined as being stationary, the processor 170 may generate a control signal to turn on the ISG function (S1350). The control signal may be transmitted to the controller 770.

When the preceding vehicle is not detected or the detected preceding vehicle is determined as being traveling, the processor 170 may generate a control signal to turn off the ISG function (S1360). The control signal may be transmitted to the controller 770.

Generally, when an input to the brake pedal 721d is received in a state in which the vehicle travels at a predetermined speed or less or stops and no input to the accelerator pedal 721c is received, the ISG function is turned on to stop operation of the power source. However, according to the third implementation, when the vehicle 700 slows down or temporarily stops for right-turn, the ISG function is not turned on even under an ISG function operating condition. This has the effect of preventing travel delay caused when the ISG function is unintentionally turned on.

Figure 13B:
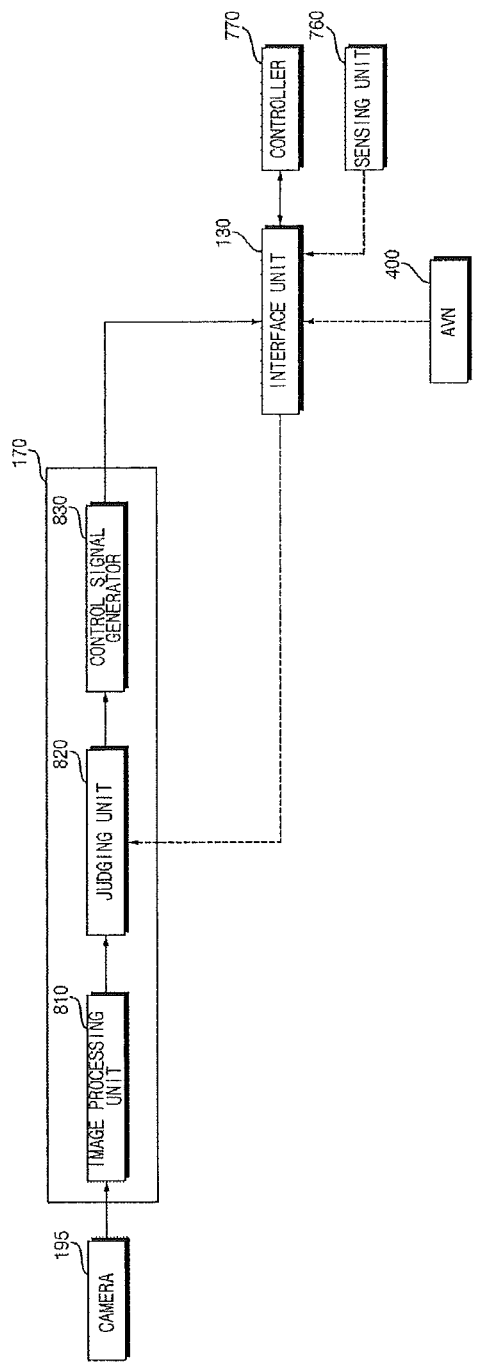
FIG. 13B is a block diagram illustrating an example of details of a processor according to the third implementation.

FIG. 13B is a detailed block diagram of the processor according to the third implementation.

Referring to FIG. 13B, the processor 170 may include the image processing unit 810, the judging unit 820, and the control signal generator 830.

The image processing unit 810 may process a forward image or an around view image of the vehicle acquired via the camera 195. The image processing unit 810 may detect an object based on the forward image or the around view image of the vehicle. The image processing unit 810 may detect information from the detected object. Here, the object may be at least one of a traffic light, a traffic sign, and a road surface.

The information may be vehicle travel situation information. For example, the information may be crossroad information or traffic light output signal information. The traffic light may be a vehicle traffic light or a pedestrian traffic light.

The image processing unit 810 may detect crossroad information based on a traffic light, a traffic sign, or a road surface included in the forward image or the around view image of the vehicle. The image processing unit 810 may detect crossroad information in the same manner as the above description with reference to FIGS. 10A to 12B.

The image processing unit 810 may detect traffic light output signal information based on a traffic light image included in the forward image or the around view image of the vehicle. The image processing unit 810 may detect traffic light output signal information based on the color or shape of the traffic light image.

The image processing unit 810 may verify crossroad information or traffic light output signal information by comparing the detected information with information stored in the memory 140.

The image processing unit 810 may detect a preceding vehicle from the forward image or the around view image of the vehicle. When the camera 195 is a monocular camera, the image processing unit 810 may detect a distance to the preceding vehicle based on variation in the size of the preceding vehicle that is detected in a plurality of frames generated according to the lapse of time. In addition, when the camera 195 includes stereo cameras, the image processing unit 810 may detect a distance to the preceding vehicle based on binocular disparity caused by a distance between first and second cameras 195*a* and 195*b*.

The judging unit 820 may determine whether the vehicle 700 slows down or temporarily stops for right-turn.

The judging unit 820 may determine a right-turn situation based on navigation information or turn signal information.

For example, the judging unit 820 may determine a right-turn situation based on navigation information. Here, the judging unit 820 may receive navigation information from the AVN apparatus 400, the controller 770, or a separate navigation apparatus via the interface unit 130. The navigation information includes routing information from a current vehicle location to a destination. The judging unit 820 may determine a right-turn situation at a current vehicle location based on the routing information.

In another example, the judging unit 820 may determine a right-turn situation based on turn signal information. Here, the judging unit 820 may receive turn signal information from the controller 770 via the interface unit 130. The judging unit 820 may determine a right-turn situation upon receiving turn signal information for right-turn at a location close to the crossroad.

The judging unit 820 may determine whether the vehicle 700 slows down or temporarily stops.

For example, the image processing unit 810 detects an object and tracks the detected object. In this case, the judging unit 820 may determine whether the vehicle 700 slows down toward or temporarily stops in front of the crossroad via tracking information. Specifically, the judging unit 820 may determine whether the vehicle 700 slows down or temporarily stops based whether a relative distance or a speed relative to the detected object decreases.

For example, the judging unit 820 may receive vehicle speed information from the sensing unit 760 or the controller 770 via the interface unit 130 and determine whether the vehicle 700 slows down or temporarily stops based on a vehicle speed.

The judging unit 820 determines whether a signal output from a detected pedestrian traffic light is pedestrian stop information. The judging unit 820 may determine whether the signal output from the pedestrian traffic light is pedestrian stop information based on the detected information.

The image processing unit 810 may detect the color or shape of the pedestrian traffic light and the judging unit 820 may determine whether the signal output from the pedestrian traffic light is a pedestrian stop signal based on the color or shape. For example, when the detected color of the pedestrian traffic light is red, the judging unit 820 may determine that the output signal is a pedestrian stop signal. For example, when the shape of the detected pedestrian traffic light is a standing person shape, the judging unit 820 may determine that the output signal is a pedestrian stop signal.

The judging unit 820 may determine whether the preceding vehicle detected from the forward image or the around view image of the vehicle is stationary. The judging unit 820 may determine whether the preceding vehicle is stationary based on vehicle speed information and information regarding a distance to the preceding vehicle. Specifically, the judging unit 820 may determine whether the preceding vehicle is stationary based on a speed relative to the preceding vehicle that is calculated based on a vehicle speed and a relative distance to the preceding vehicle. Alternatively, the judging unit 820 may determine whether the preceding vehicle is stationary based on a stop lamp of the detected preceding vehicle. The judging unit 820 may determine that the preceding vehicle is stationary when the detected stop lamp is in an ON state.

The control signal generator 830 may generate a control signal to turn the ISG function on or off based on a determined result of the judging unit 820.

When the determined result of the judging unit 820 is that the vehicle 700 does not slow down for right-turn or does not temporarily stop for right-turn, the control signal generator 830 generates a control signal to turn on the ISG function.

When the determined result of the judging unit 820 is that the signal output from the pedestrian traffic light is a pedestrian go signal in a state in which the vehicle 700 slows down or temporarily stops for right-turn, the control signal generator 830 generates a control signal to turn on the ISG function.

When the determined result of the judging unit 820 is that a preceding vehicle is detected and the detected preceding vehicle is stationary in a state in which the vehicle 700 slows down or temporarily stops for right-turn, the control signal generator 830 generates a control signal to turn on the ISG function.

When the determined result of the judging unit 820 is that the vehicle 700 slows down or temporarily stops for right-turn, the control signal generator 830 generates a control signal to turn off the ISG function.

When the determined result of the judging unit 820 is that the signal output from the pedestrian traffic light is a pedestrian stop signal in a state in which the vehicle 700 slows down or temporarily stops for right-turn, the control signal generator 830 generates a control signal to turn off the ISG function.

When the determined result of the judging unit 820 is that a preceding vehicle is detected and the detected preceding vehicle is traveling in a state in which the vehicle 700 slows down or temporarily stops for right-turn, the control signal generator 830 generates a control signal to turn off the ISG function.

The control signal generated in the control signal generator 830 may be provided to the controller 770. In this case, the control signal generator 830 may output the control signal to the controller 770 via the interface unit 130.

Figure 14A:
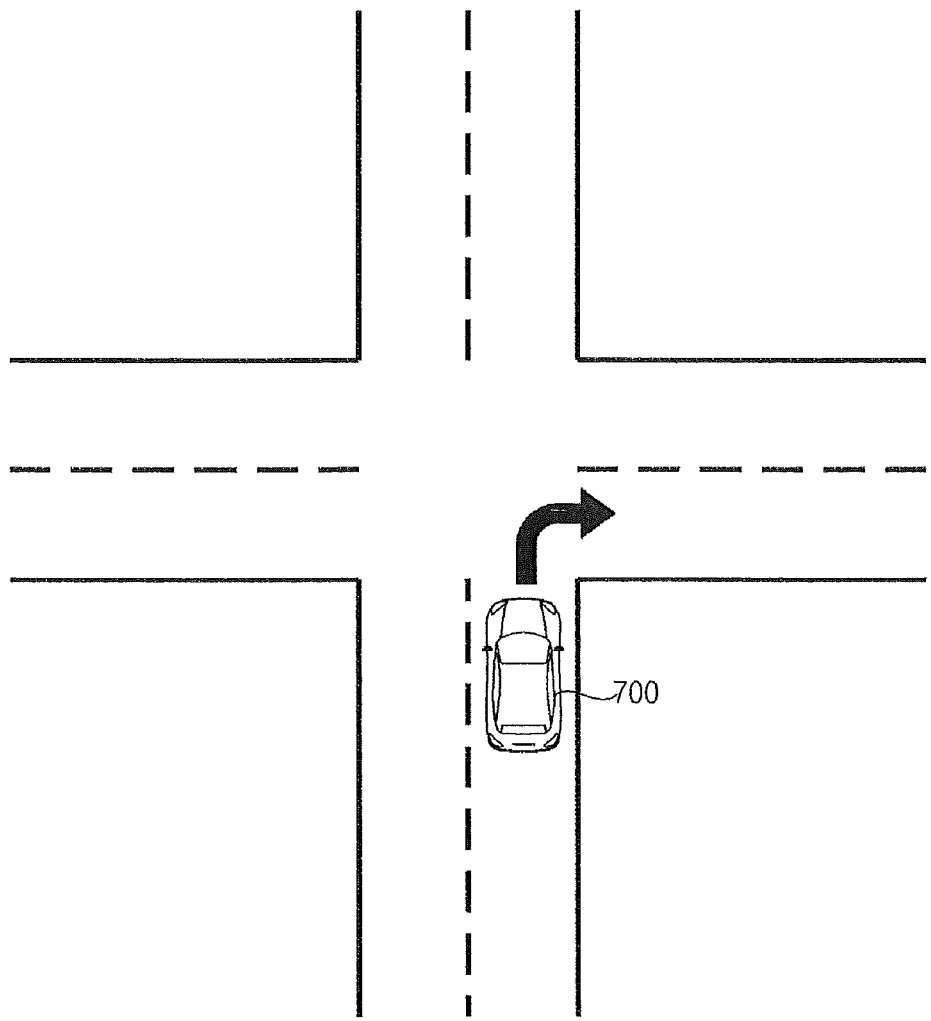
FIGS. 14A to 14D are diagrams illustrating examples of operations of a driver assistance apparatus when a vehicle slows down or temporarily stops for right-turn according to the third implementation.
Figure 14B:
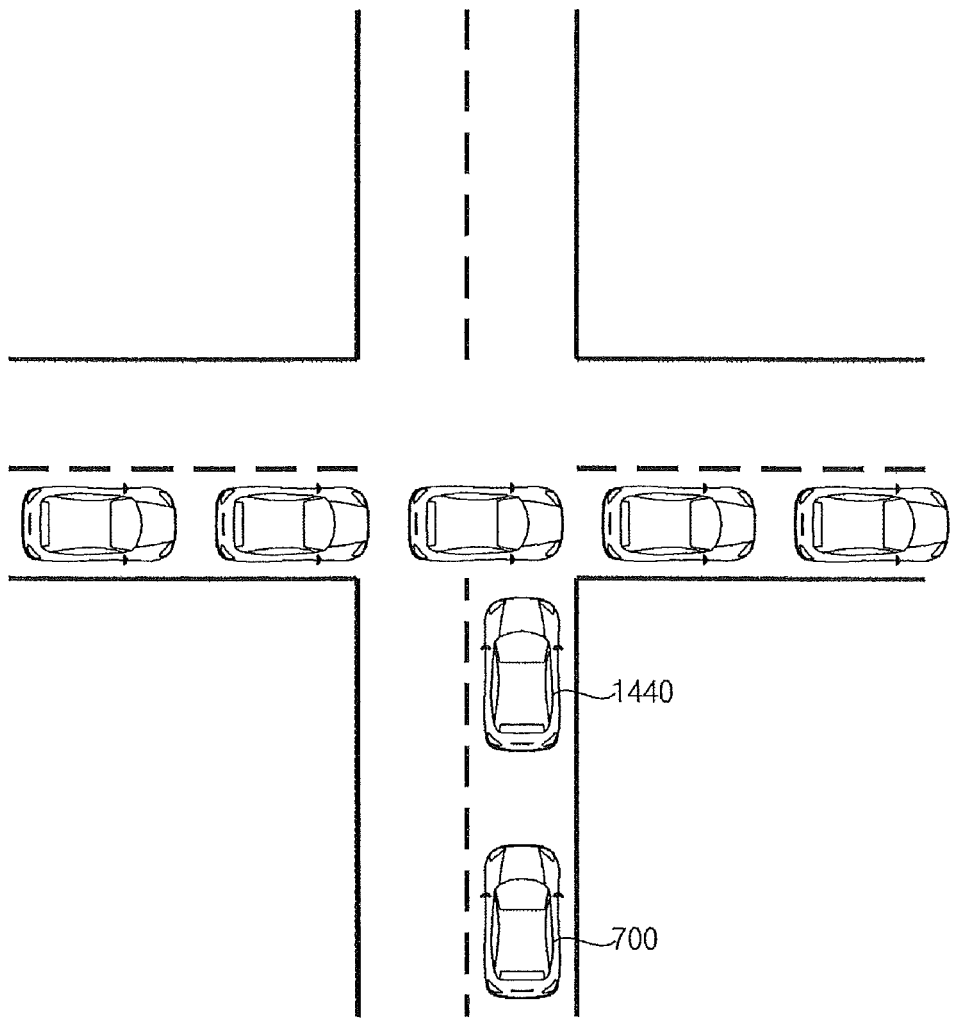
Figure 14C:
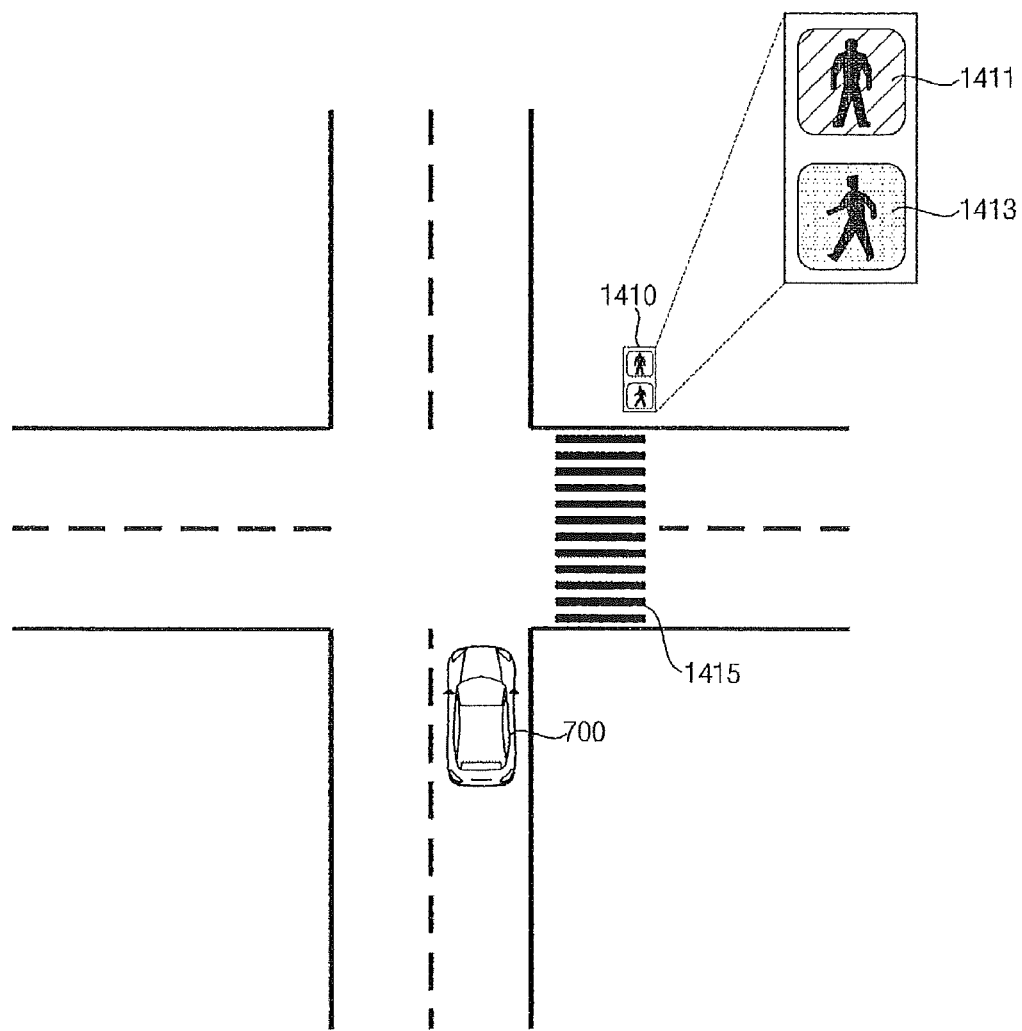
Figure 14D:
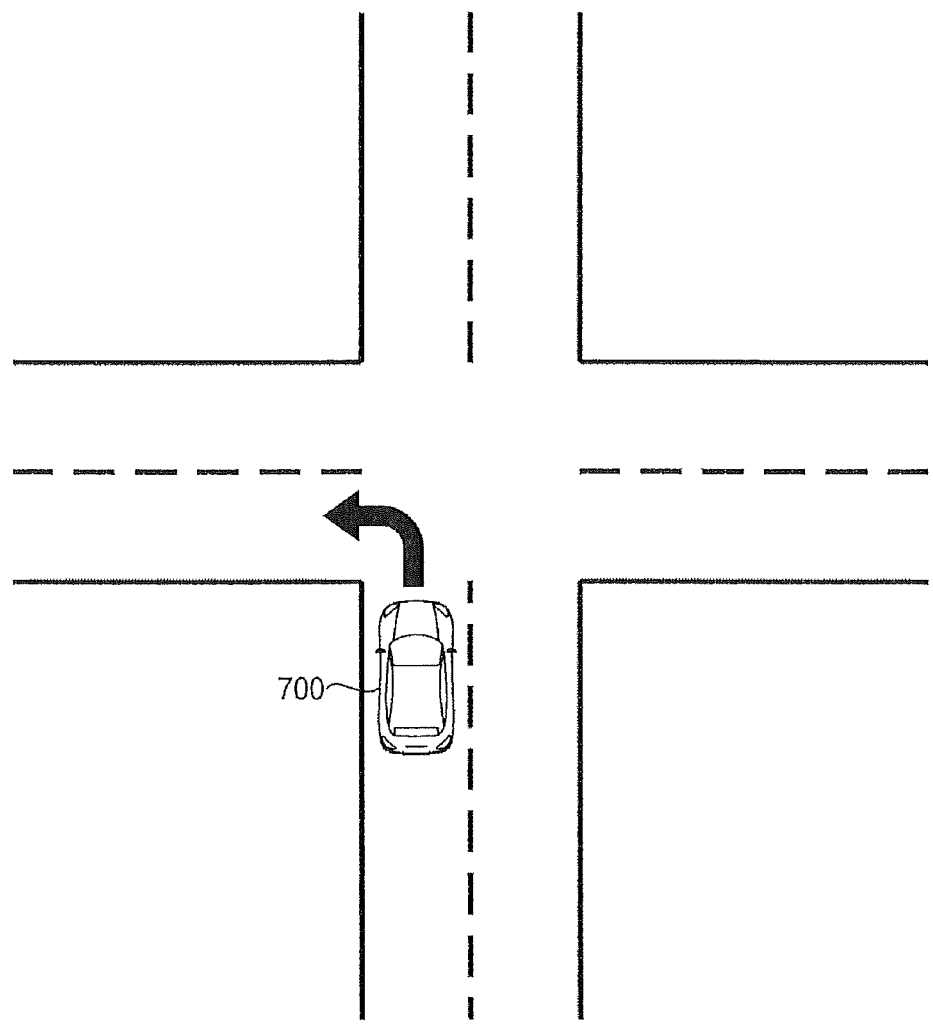

FIGS. 14A to 14D are views referenced to explain the driver assistance apparatus when the vehicle slows down or temporarily stops for right-turn according to the third implementation. FIGS. 14A and 14D illustrate bird's eye views.

Referring to FIG. 14A, the processor 170 acquires a forward image or an around view image of the vehicle via the camera 195.

The processor 170 detects a traffic light, a traffic sign or a road surface from the forward image or the around view image of the vehicle. The processor 170 may detect crossroad information based on the detected traffic light, traffic sign, or road surface.

The processor 170 determines whether the vehicle 700 slows down or temporarily stops for right-turn.

For example, the processor 170 may determine a right-turn situation of the vehicle 700 based on navigation information. Here, the processor 170 may receive navigation information from the AVN apparatus 400, the controller 770, or a separate navigation apparatus via the interface unit 130. The navigation information includes routing information from a current vehicle location to a destination. The processor 170 may determine a right-turn situation at a current vehicle location based on the routing information.

In another example, the processor 170 may determine a right-turn situation based on turn signal information. Here, the processor 170 may receive turn signal information from the controller 770 via the interface unit 130. The processor 170 may determine a right-turn situation upon receiving turn signal information for right-turn at a location close to the crossroad.

The processor 170 may determine whether the vehicle 700 slows down or temporarily stops.

For example, the processor 170 may determine whether the vehicle 700 slows down toward or temporarily stops in front of the crossroad by detecting a prescribed object (e.g., crossroad information) from the forward image or the around view image of the vehicle and tracking the detected object.

For example, the processor 170 may receive vehicle speed information from the sensing unit 760 or the controller 770 via the interface unit 130 and determine whether the vehicle 700 slows down or temporarily stops based on a vehicle speed.

Upon judging that the vehicle slows down or temporarily stops for right-turn, the processor 170 generates a control signal to turn off the ISG function. The control signal may be provided to the controller 770. In this case, the ISG function is not operated. As such operation of the power source does not stop even if an input to the brake pedal 721*d* is received in a state in which the vehicle 700 travels at a predetermined speed or less or stops and no input to the accelerator pedal 721*c* is received. For example, the power source may be continuously operated.

That is, when the vehicle 700 slows down or temporarily stops for right-turn, the ISG function is not turned on even under an ISG function operating condition.

FIG. 14B differs from FIG. 14A in terms of detection of a preceding vehicle. The following description with reference to FIG. 14B will focus on this difference.

The processor 170 may detect a preceding vehicle 1440 from a forward image or an around view image of the vehicle. When the camera 195 is a monocular camera, the processor 170 may detect a distance to the preceding vehicle 1440 based on variation in the size of the preceding vehicle that is detected in a plurality of frames generated according to the lapse of time. In addition, when the camera 195 includes stereo cameras, the processor 170 may detect a distance to the preceding vehicle 1440 based on binocular disparity caused by a distance between first and second cameras 195*a* and 195*b*.

The processor 170 may determine whether the preceding vehicle 1440 is stationary based on vehicle speed information and information regarding a distance to the preceding vehicle. Specifically, the processor 170 may determine whether the preceding vehicle 1440 is stationary based on a speed relative to the preceding vehicle that is calculated based on a vehicle speed and a relative distance to the preceding vehicle. Alternatively, the processor 170 may determine whether the preceding vehicle 1440 is stationary based on a stop lamp of the detected preceding vehicle 1440.

The processor 170 detects the preceding vehicle 1440 in a state in which the vehicle 700 slows down or temporarily stops for right-turn and determines whether the preceding vehicle 1440 is stationary. The processor 170 may determine whether the preceding vehicle 1440 is stationary based on vehicle speed information and information regarding a distance to the preceding vehicle. Specifically, the processor 170 may determine whether the preceding vehicle 1440 is stationary based on a speed relative to the preceding vehicle that is calculated based on a vehicle speed and a relative distance to the preceding vehicle. Alternatively, the processor 170 may determine whether the preceding vehicle 1440 is stationary based on a stop lamp of the detected preceding vehicle.

When the preceding vehicle 1440 is detected and the detected preceding vehicle 1440 is determined as being stationary in a state in which the vehicle 700 slows down or temporarily stops for right-turn, the processor 170 generates a control signal to turn on the ISG function. In this case, the ISG function is normally operated. As such, operation of the power source stops when an input to the brake pedal 721*d* is received in a state in which the vehicle 700 travels at a predetermined speed or less or stops and no input to the accelerator pedal 721*c* is received.

When the preceding vehicle 1440 is detected and the detected preceding vehicle 1440 is determined as being traveling in a state in which the vehicle 700 slows down or temporarily stops for right-turn, the processor 170 generates a control signal to turn off the ISG function.

FIG. 14C differs from FIG. 14A in terms of detection of a pedestrian traffic light. The following description with reference to FIG. 14C will focus on this difference.

The processor 170 may detect traffic light output signal information based on a traffic light 1410 detected from the forward image or the around view image of the vehicle. The processor 170 may detect traffic light output signal information based on the color or shape of a traffic light image. The processor 170 may verify the traffic light output signal information by comparing the detected information with information stored in the memory 140. Here, the traffic light may be a vehicle traffic light or a pedestrian traffic light.

The processor 170 may detect and determine a pedestrian go signal 1413 or a pedestrian stop signal 1411 from the pedestrian traffic light 1410.

For example, when the detected color of the pedestrian traffic light is red, the processor 170 may determine that the signal output from the pedestrian traffic light 1410 is a pedestrian stop signal. For example, when the shape of the detected pedestrian traffic light is a standing person shape, the processor 170 may determine that the signal output from the pedestrian traffic light 1410 is a pedestrian stop signal.

For example, when the detected color of the pedestrian traffic light is green, the processor 170 may determine that the signal output from the pedestrian traffic light 1410 is a pedestrian go signal. For example, when the shape of the detected pedestrian traffic light is a walking person shape, the processor 170 may determine that the signal output from the pedestrian traffic light 1410 is a pedestrian go signal.

When the signal output from the pedestrian traffic light 1410 is a pedestrian go signal 1413 in a state in which the vehicle 700 slows down or temporarily stops for right-turn, the processor 170 generates a control signal to turn on the ISG function.

When the signal output from the pedestrian traffic light 1410 is a pedestrian stop signal 1411 in a state in which the vehicle 700 slows down or temporarily stops for right-turn, the processor 170 generates a control signal to turn off the ISG function.

FIG. 14D has a difference in that the vehicle is an RHD vehicle as compared to FIG. 14A. The following description with reference to FIG. 14D will focus on this difference.

The processor 170 determines whether the RHD vehicle 700 slows down or temporarily stops for left-turn.

Upon judging that the RHD vehicle 700 slows down or temporarily stops for left-turn, the processor 170 generates a control signal to turn off the ISG function. The control signal may be provided to the controller 770.

The RHD vehicle differs from the LHD vehicle as to whether the vehicle keeps to the left or the right on a road and performs, for example, image processing, judgment, and control signal generation in the same manner as the LHD vehicle.

Figure 15A:
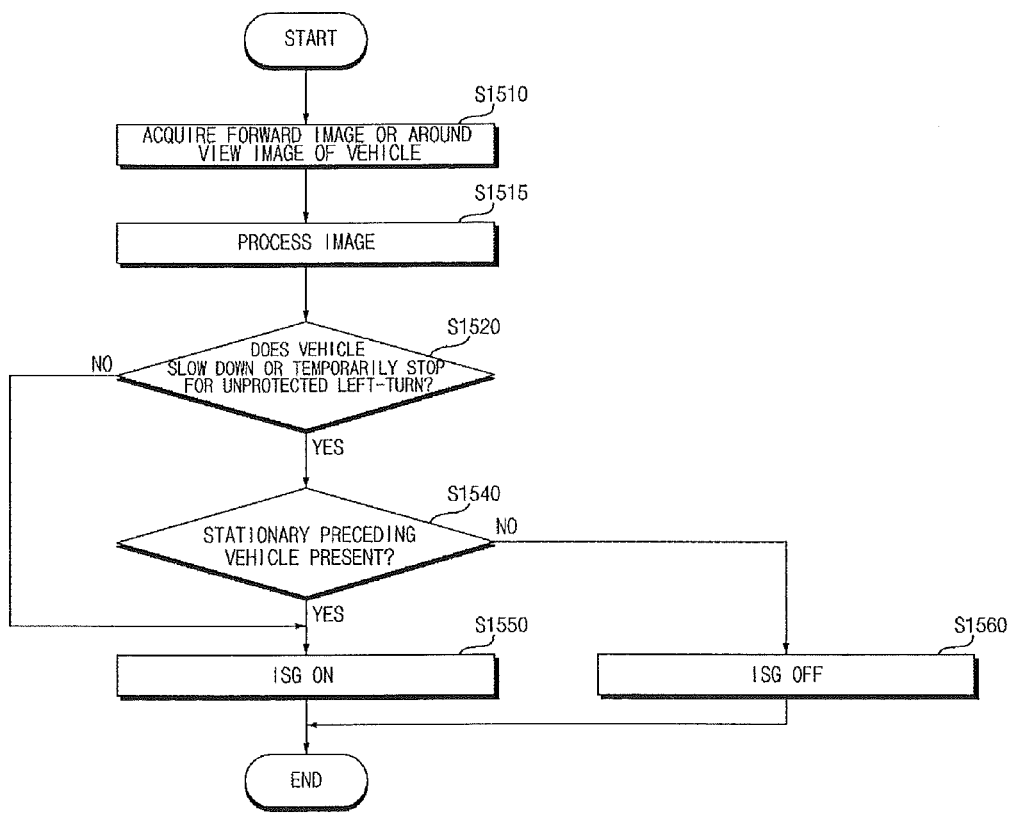
FIG. 15A is a flowchart illustrating an example of operations of a driver assistance apparatus according to a fourth implementation.

FIG. 15A is a flowchart referenced to explain operation of the driver assistance apparatus according to a fourth implementation.

Referring to FIG. 15A, the processor 170 may acquire a forward image or an around view image of the vehicle via the camera 195 (S1510). Here, the camera 195 may be the camera as described above with reference to FIGS. 2A to 3C. In some implementations, three or more cameras 195 may be provided.

The camera 195 may capture a forward image or an around view image of the vehicle under control of the processor 170. The image captured by the camera 195 may include at least one object.

The camera 195 may capture an image of at least one of a traffic light, a traffic sign, and a road surface under control of the processor 170.

Once the forward image or the around view image of the vehicle has been acquired, the processor 170 may process the acquired forward image or the acquired around view image (S1515). The processor 170 detects an object from the forward image or the around view image of the vehicle. The processor 170 may detect information from the detected object. Here, the object may be at least one of a traffic light, a traffic sign and a road surface. In addition, the object may be at least one of a lane, an adjacent vehicle, a pedestrian, a light, and a traffic signal.

The information may be vehicle travel situation information. For example, the information may be unprotected left-turn information. The unprotected left-turn information may include unprotected left-turn situation or unprotected left-turn lane information.

The processor 170 may detect a traffic light, a traffic sign, or a road surface from the image and then detect unprotected left-turn information from the detected traffic light, traffic sign, or road surface.

For example, the processor 170 detects a symbol or text from a traffic sign detected from the forward image or the around view image of the vehicle. The processor 170 may detect unprotected left-turn information based on the detected symbol or text.

In another example, the processor 170 detects a symbol or text from a road surface detected from the forward image or the around view image of the vehicle. The processor 170 may detect unprotected left-turn information based on the detected symbol or text.

The processor 170 detects a symbol or text from a road surface detected from the forward image or the around view image of the vehicle. When a symbol or text indicating unprotected left-turn is detected, a lane including the symbol or text may be an unprotected left-turn lane.

The processor 170 may verify unprotected left-turn information by comparing the detected information with information stored in the memory 140.

The processor 170 may detect a preceding vehicle from the forward image or the around view image of the vehicle. When the camera 195 is a monocular camera, the processor 170 may detect a distance to a preceding vehicle based on variation in the size of the preceding vehicle that is detected in a plurality of frames generated according to the lapse of time. In addition, when the camera 195 includes stereo cameras, the processor 170 may detect a distance to a preceding vehicle based on binocular disparity caused by a distance between first and second cameras 195*a* and 195*b*.

The processor 170 may determine whether the vehicle 700 slows down or temporarily stops for unprotected left-turn (S1520). Here, slowing down is a condition that causes the ISG function to be turned on and may mean that the vehicle travels at a predetermined speed or less (e.g., 10 km/h or less). Here, temporary stop is a condition that causes the ISG function to be turned on and may mean that the vehicle stops during a short time (e.g., 1 second or less) and thereafter accelerates.

The processor 170 may determine an unprotected left-turn situation based on navigation information or turn signal information.

For example, the processor 170 may determine an unprotected left-turn situation based on navigation information. Here, the processor 170 may receive navigation information from the AVN apparatus 400, the controller 770, or a separate navigation apparatus via the interface unit 130. Here, the processor 170 may receive turn signal information from the controller 770 via the interface unit 130. The navigation information includes routing information from a current vehicle location to a destination. The processor 170 may determine an unprotected left-turn situation at a current vehicle location based on the routing information.

In another example, the processor 170 may determine an unprotected left-turn situation based on turn signal information. The turn signal information may be a turn-on signal of a turn signal for left-turn or right-turn input by the user. When an input to turn on a left or right turn signal is received through the user input unit (724 of FIG. 7) of the vehicle, the processor 170 may receive turn signal information via the interface unit 130. The processor 170 may determine an unprotected left-turn situation upon receiving turn signal information for left-turn in an unprotected left-turn lane.

The processor 170 may determine whether the vehicle 700 is located in an unprotected left-turn lane based on a lane marked on the detected road surface and a detected symbol or text indicating an unprotected left-turn lane.

The processor 170 may determine whether the vehicle 700 slows down or temporarily stops.

For example, the processor 170 may determine whether the vehicle 700 slows down or temporarily stops by detecting a prescribed object (e.g., a lane) from the forward image or the around view image of the vehicle and tracking the detected object. Specifically, the processor 170 may determine whether the vehicle 700 slows down or temporarily stops based on a relative distance or a speed relative to the detected object.

For example, the processor 170 may receive vehicle speed information from the sensing unit 760 or the controller 770 via the interface unit 130 and determine whether the vehicle 700 slows down or temporarily stops based on a vehicle speed.

Subsequently, the processor 170 may determine whether a preceding vehicle is detected from the forward image or the around view image of the vehicle and whether the detected preceding vehicle is stationary (S1540). The processor 170 may determine whether the preceding vehicle is stationary based on vehicle speed information and information regarding a distance to the preceding vehicle. Specifically, the processor 170 may determine whether the preceding vehicle is stationary based on a speed relative to the preceding vehicle that is calculated based on a vehicle speed and a relative distance to the preceding vehicle. Alternatively, the processor 170 may determine whether the preceding vehicle is stationary based on a stop lamp of the detected preceding vehicle. The processor 170 may determine that the preceding vehicle is stationary when the detected stop lamp is in an ON state.

When the preceding vehicle is detected and the detected preceding vehicle is determined as being stationary, the processor 170 may generate a control signal to turn on the ISG function (S1550). The control signal may be transmitted to the controller 770.

When the preceding vehicle is not detected or the detected preceding vehicle is determined as being traveling, the processor 170 may generate a control signal to turn off the ISG function (S1560). The control signal may be transmitted to the controller 770.

Generally, when an input to the brake pedal 721*d* is received in a state in which the vehicle travels at a predetermined speed or less or stops and no input to the accelerator pedal 721*c* is received, the ISG function is turned on to stop operation of the power source. However, according to the fourth implementation, when the vehicle 700 slows down or temporarily stops for unprotected left-turn, the ISG function is not turned on even under an ISG function operating condition. This has the effect of preventing travel delay caused when the ISG function is unintentionally turned on.

Figure 15B:
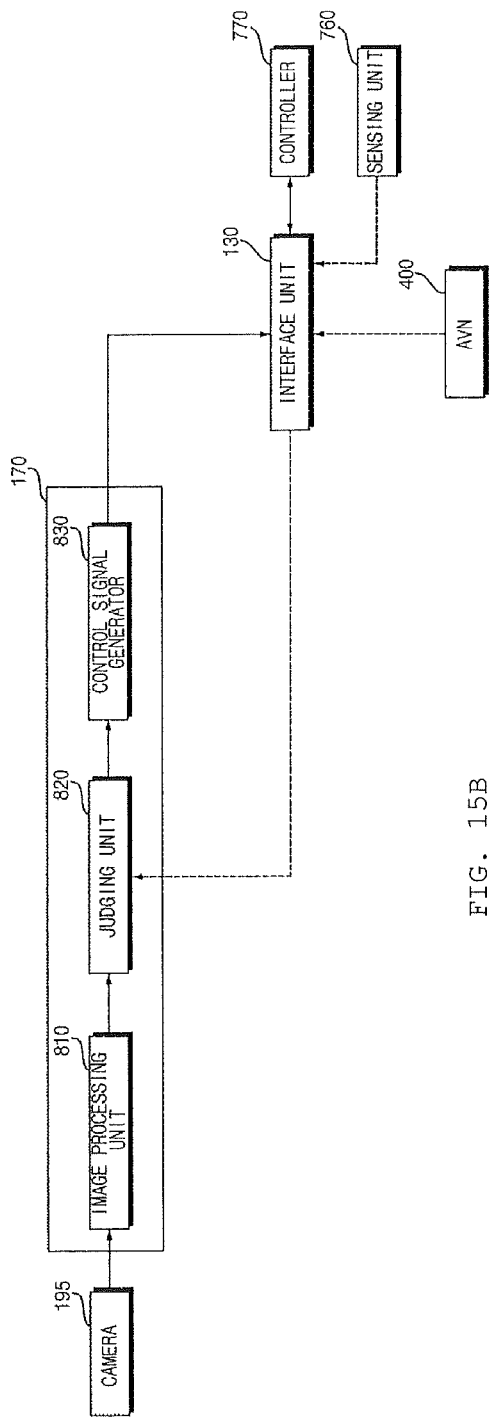
FIG. 15B is a block diagram illustrating examples of details of a processor according to the fourth implementation.

FIG. 15B is a detailed block diagram of the processor according to the fourth implementation.

Referring to FIG. 15B, the processor 170 may include the image processing unit 810, the judging unit 820, and the control signal generator 830.

The image processing unit 810 may process a forward image or an around view image of the vehicle acquired via the camera 195. The image processing unit 810 may detect an object based on the forward image or the around view image of the vehicle. The image processing unit 810 may detect information from the detected object. Here, the object may be at least one of a traffic light, a traffic sign, and a road surface. In addition, the object may be at least one of a lane, an adjacent vehicle, a pedestrian, a light, and a traffic signal.

The information may be vehicle travel situation information. For example, the information may be unprotected left-turn information.

The image processing unit 810 may detect unprotected left-turn information based on a traffic light, a traffic sign, or a road surface included in the forward image or the around view image of the vehicle. The unprotected left-turn information may include unprotected left-turn situation or unprotected left-turn lane information.

For example, the image processing unit 810 may detect a symbol or text from a traffic sign or a road surface detected from the forward image or the around view image of the vehicle. The image processing unit 810 may detect unprotected left-turn information based on the detected symbol or text. The image processing unit 810 may verify unprotected left-turn information by comparing detected information with information stored in the memory 140.

The image processing unit 810 may detect unprotected left-turn lane information from a road surface detected from the forward image or the around view image of the vehicle.

The image processing unit 810 may detect a preceding vehicle from the forward image or the around view image of the vehicle. When the camera 195 is a monocular camera, the image processing unit 810 may detect a distance to the preceding vehicle based on variation in the size of the preceding vehicle that is detected in a plurality of frames generated according to the lapse of time. In addition, when the camera 195 includes stereo cameras, the image processing unit 810 may detect a distance to the preceding vehicle based on binocular disparity caused by a distance between first and second cameras 195*a* and 195*b*.

The judging unit 820 may determine whether the vehicle 700 slows down or temporarily stops for unprotected left-turn.

The judging unit 820 may determine an unprotected left-turn situation based on the unprotected left-turn information detected from the image processing unit 810.

The judging unit 820 may determine whether the vehicle 700 is located in an unprotected left-turn lane based on the unprotected left-turn lane information.

For example, the judging unit 820 may determine an unprotected left-turn situation based on navigation information. The navigation information includes routing information from a current vehicle location to a destination. The judging unit 820 may determine an unprotected left-turn situation at a current vehicle location based on the routing information.

In another example, the judging unit 820 may determine an unprotected left-turn situation based on turn signal information. Here, the judging unit 820 may receive an unprotected left-turn situation upon receiving turn signal information for left-turn in a state in which the vehicle 700 is located in an unprotected left-turn lane.

The judging unit 820 may determine whether the vehicle 700 is located in an unprotected left-turn lane based on a lane marked on a detected road surface and a detected symbol or text indicating unprotected left-turn.

The judging unit 820 may determine whether the vehicle 700 slows down or temporarily stops.

For example, the image processing unit 810 detects an object and tracks the detected object. In this case, the judging unit 820 may determine whether the vehicle 700 slows down or temporarily stops via tracking information. Specifically, the judging unit 820 may determine whether the vehicle 700 slows down or temporarily stops based on a relative distance or a speed relative to the detected object.

For example, the judging unit 820 may receive vehicle speed information from the sensing unit 760 or the controller 770 via the interface unit 130 and determine whether the vehicle 700 slows down or temporarily stops based on a vehicle speed.

The control signal generator 830 may generate a control signal to turn the ISG function on or off based on a determined result of the judging unit 820.

When the determined result of the judging unit 820 is that the vehicle 700 does not slow down for unprotected left-turn or does not temporarily stop for unprotected left-turn, the control signal generator 830 generates a control signal to turn on the ISG function.

When the determined result of the judging unit 820 is that a preceding vehicle is detected and the detected preceding vehicle is stationary in a state in which the vehicle 700 slows down or temporarily stops for unprotected left-turn, the control signal generator 830 generates a control signal to turn on the ISG function.

When the determined result of the judging unit 820 is that the vehicle 700 slows down or temporarily stops for unprotected left-turn, the control signal generator 830 generates a control signal to turn off the ISG function.

When the determined result of the judging unit 820 is that a preceding vehicle is detected and the detected preceding vehicle is traveling in a state in which the vehicle 700 slows down or temporarily stops for unprotected left-turn, the control signal generator 830 generates a control signal to turn off the ISG function.

The control signal generated in the control signal generator 830 may be provided to the controller 770. In this case, the control signal generator 830 may output the control signal to the controller 770 via the interface unit 130.

Figure 16A:
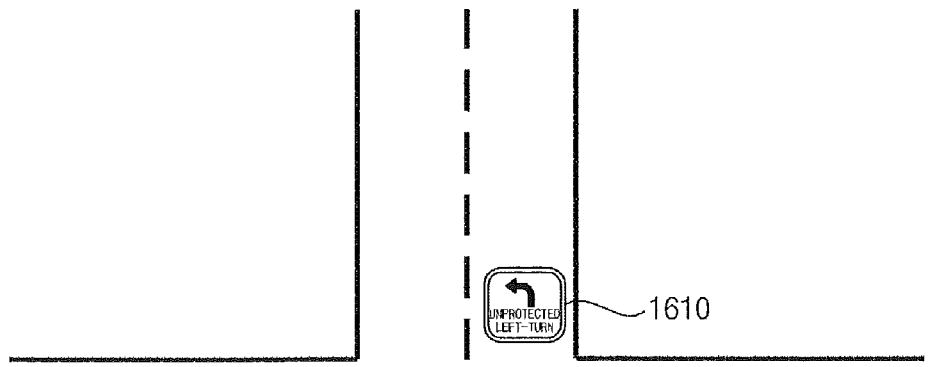
FIGS. 16A to 16C are diagrams illustrating examples of operations of a driver assistance apparatus when a vehicle slows down or temporarily stops for unprotected left-turn (unprotected right-turn in the case of an RHD vehicle) according to the fourth implementation.
Figure 16A:
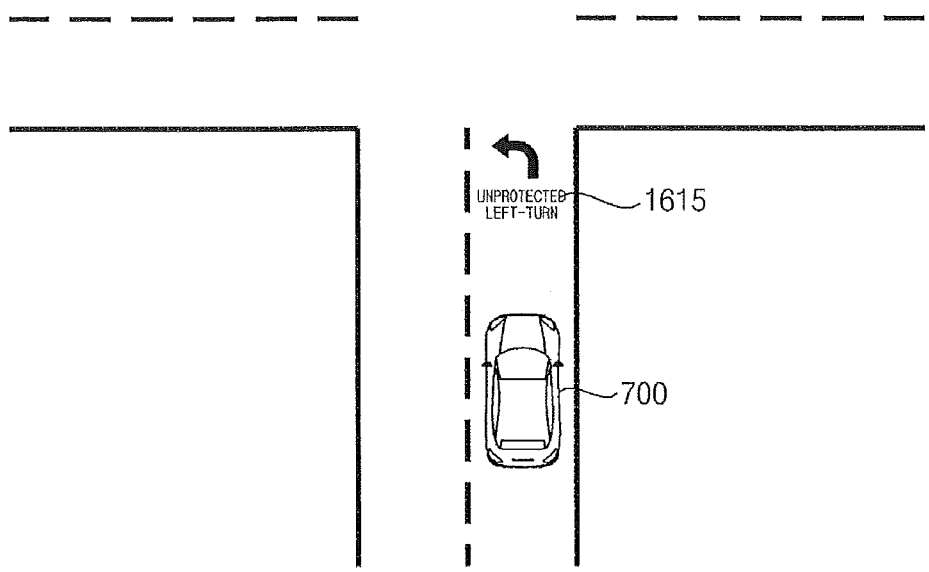

FIGS. 16A to 16D are views referenced to explain the driver assistance apparatus when the vehicle slows down or temporarily stops for unprotected left-turn (right-turn in the case of an RHD vehicle) according to the fourth implementation. FIGS. 16A and 16D illustrate bird's eye views.

Referring to FIG. 16A, the processor 170 acquires a forward image or an around view image of the vehicle via the camera 195.

The processor 170 detects a traffic sign 1610 or a road surface from the forward image or the around view image of the vehicle. The processor 170 may detect unprotected left-turn information based on a symbol or text marked on the detected traffic sign 1610 or road surface.

For example, the processor 170 detects a symbol of a leftwardly bent arrow and text "Unprotected" from a traffic sign image included in the forward image or the around view image of the vehicle. The processor 170 may detect unprotected left-turn information based on the detected symbol or text.

In another example, the processor 170 detects a picture of a leftwardly bent arrow and text "Unprotected" 1615 from a road surface image included in the forward image or the around view image of the vehicle. The processor 170 may detect unprotected left-turn information based on the detected symbol or text.

The processor 170 determines whether the vehicle 700 slows down or temporarily stops for unprotected left-turn.

For example, the processor 170 may determine an unprotected left-turn situation based on navigation information. The navigation information includes routing information from a current vehicle location to a destination. The processor 170 may determine an unprotected left-turn situation at a current vehicle location based on the routing information.

In another example, the processor 170 may determine an unprotected left-turn situation based on turn signal information. The processor 170 may determine an unprotected left-turn situation upon receiving turn signal information for left-turn in an unprotected left-turn lane.

The processor 170 may determine whether the vehicle 700 slows down or temporarily stops.

For example, the processor 170 may determine whether the vehicle 700 slows down or temporarily stops by detecting a prescribed object (e.g., a lane or a traffic sign) from the forward image or the around view image of the vehicle and tracking information regarding the detected object.

For example, the processor 170 may receive vehicle speed information from the sensing unit 760 or the controller 770 via the interface unit 130 and determine whether the vehicle 700 slows down or temporarily stops based on a vehicle speed.

Upon judging that the vehicle slows down or temporarily stops for unprotected left-turn, the processor 170 generates a control signal to turn off the ISG function. The control signal may be provided to the controller 770. In this case, the ISG function is not operated. As such, operation of the power source does not stop even if an input to the brake pedal 721d is received in a state in which the vehicle 700 travels at a predetermined speed or less or stops and no input to the accelerator pedal 721c is received. For example, the power source may be continuously operated.

That is, when the vehicle 700 slows down or temporarily stops for unprotected left-turn, the ISG function may not be turned on, even under an ISG function operating condition.

Figure 16B:
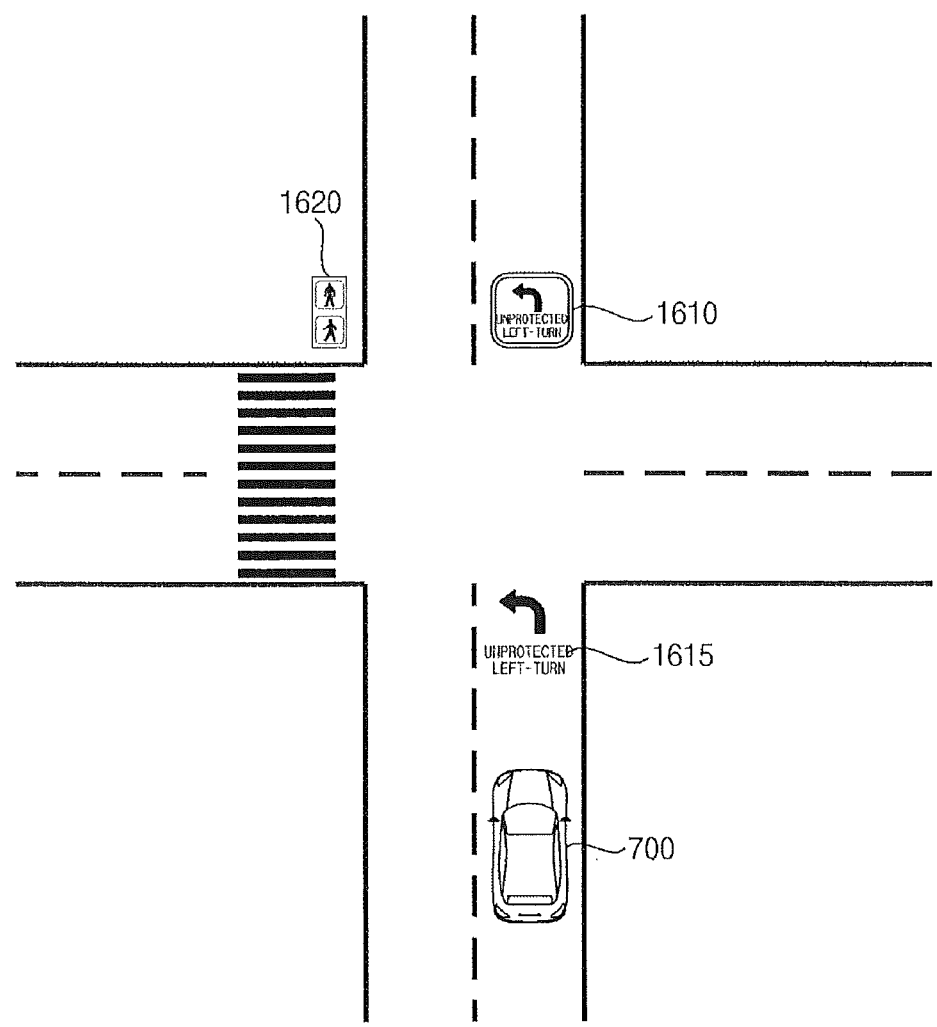

FIG. 16B has a difference in that the vehicle 700 detects an approaching pedestrian traffic light when making an unprotected left-turn (unprotected right-turn in the case of an RHD vehicle) as compared to FIG. 16A. The following description with reference to FIG. 16B will focus on this difference.

The processor 170 may detect an approaching pedestrian traffic light 1620 from the forward image or the around view image of the vehicle when making an unprotected left-turn.

The processor 170 determines whether a signal output from the detected pedestrian traffic light is pedestrian stop information. The processor 170 may determine whether a signal output from the detected pedestrian traffic light is a pedestrian stop signal by detecting the color or shape of the pedestrian traffic light. For example, when the detected color of the pedestrian traffic light is green, the processor 170 may determine that the output signal is a pedestrian go signal. For example, when the shape of the detected pedestrian traffic light is a walking person shape, the processor 170 may determine that the output signal is a pedestrian go signal.

In the case where a pedestrian go signal is detected from an image including the pedestrian traffic light when the vehicle 700 makes an unprotected left-turn (unprotected right-turn in the case of the RHD vehicle), the processor 170 generates a control signal to turn off the ISG function.

In this case, the vehicle 700 may rapidly travel when a pedestrian stop signal is output from the pedestrian traffic light 1620.

Figure 16C:
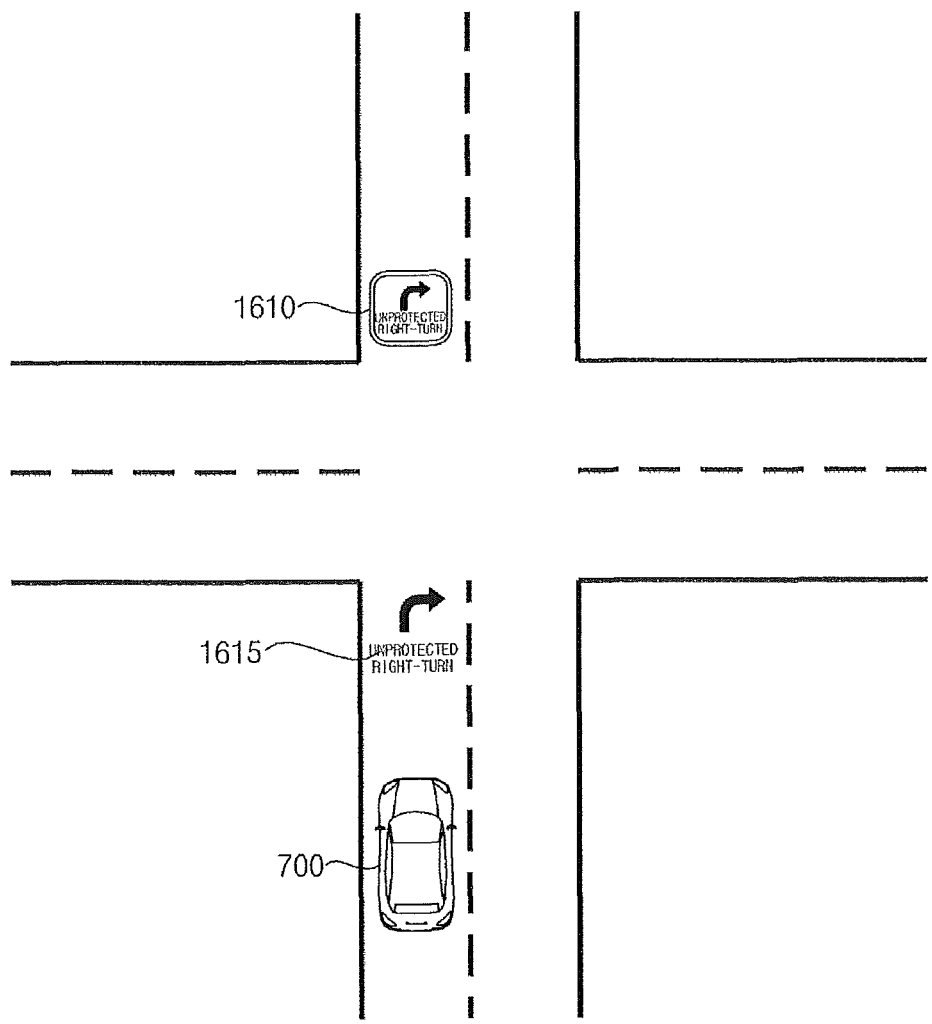

FIG. 16C has a difference in that the vehicle is an RHD vehicle as compared to FIG. 16A. The following description with reference to FIG. 16C will focus on this difference.

The processor 170 determines whether the RHD vehicle 700 slows down or temporarily stops for unprotected right-turn.

Upon judging that the RHD vehicle 700 slows down or temporarily stops for unprotected right-turn, the processor 170 generates a control signal to turn off the ISG function. The control signal may be provided to the controller 770.

The RHD vehicle differs from the LHD vehicle as to whether the vehicle keeps to the left or the right on a road and performs, for example, image processing, judgment, and control signal generation in the same manner as the LHD vehicle.

Figure 17A:
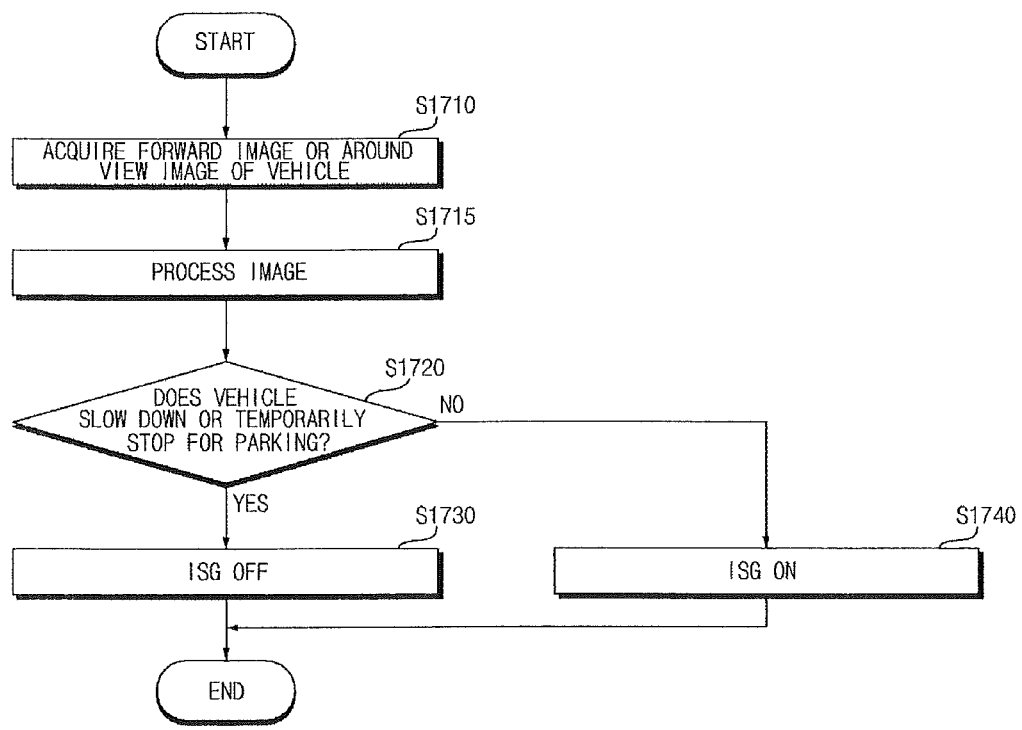
FIG. 17A is a flowchart illustrating an example of operations of a driver assistance apparatus according to a fifth implementation.

FIG. 17A is a flowchart referenced to explain operation of the driver assistance apparatus according to a fifth implementation.

Referring to FIG. 17A, the processor 170 may acquire a forward image or an around view image of the vehicle via the camera 195 (S1710). Here, the camera 195 may be the camera as described above with reference to FIGS. 2A to 3C. In some implementations, three or more cameras 195 may be provided.

The camera 195 may capture a forward image or an around view image of the vehicle under control of the processor 170. The image captured by the camera 195 may include at least one object.

The camera 195 may capture an image of at least one of a traffic light, a traffic sign, and a road surface under control of the processor 170.

Once the forward image or the around view image of the vehicle has been acquired, the processor 170 may process the acquired forward image or the acquired around view image of the vehicle (S1715). The processor 170 detects an object from the forward image or the around view image of the vehicle. The processor 170 may detect information from the detected object. Here, the object may be at least one of a traffic light, a traffic sign and a road surface. In addition, the object may be at least one of a lane, an adjacent vehicle, a pedestrian, a light, and a traffic signal.

The information may be vehicle travel situation information. For example, the information may be parking information. Here, the parking information may be information notifying that the vehicle 700 is in a parking lot.

The processor 170 may detect parking information based on a traffic light, a traffic sign, or a road surface detected from the forward image or the around view image of the vehicle.

For example, the processor 170 detects a symbol or text from a traffic sign detected from the forward image or the around view image of the vehicle. The processor 170 may detect parking information based on the detected symbol or text.

In another example, the processor 170 detects a symbol or text from a road surface detected from the forward image or the around view image of the vehicle. The processor 170 may detect parking information based on the detected symbol or text.

In a further example, the processor 170 detects other previously parked vehicles from the forward image or the around view image of the vehicle. The processor 170 may detect parking information based on the detected other vehicles.

The processor 170 may verify parking information by comparing the detected information with information stored in the memory 140.

The processor 170 may determine whether the vehicle 700 slows down or temporarily stops for parking (S1720). Here, slowing down is a condition that causes the ISG function to be turned on and may mean that the vehicle travels at a predetermined speed or less (e.g., 10 km/h or less). Here, temporary stop is a condition that causes the ISG function to be turned on and may mean that the vehicle stops during a short time (e.g., 1 second or less) and thereafter accelerates.

The processor 170 may determine a parking situation.

The processor 170 may detect parking lot information from a traffic sign or a road surface detected from the forward image or the around view image of the vehicle. The processor 170 may determine a parking situation based on the detected parking lot information. The processor 170 may detect a parking space from the detected road surface. The processor 170 may detect parking lot information based on the detected parking space.

For example, the processor 170 may determine a parking situation upon detecting a symbol of a vehicle or text "Parking" that indicates parking from a traffic sign image.

For example, the processor 170 may determine a parking situation upon detecting at least one parking space from a road surface image. Here, the parking space may be any one of a perpendicular parking space, a parallel parking space, and a diagonal parking space.

For example, the processor 170 may determine a parking situation when the number of previously parked other vehicles detected from the forward image or the around view image of the vehicle.

The processor 170 may determine a parking situation based on navigation information. Specifically, the processor 170 may determine a parking situation based on whether the vehicle 700 is located in a parking lot among the navigation information.

For example, the processor 170 may determine a parking situation upon verifying, based on navigation information, that the vehicle 700 enters a parking lot.

The processor 170 may determine whether a parking operation is performed based on vehicle speed information, steering wheel rotation angle information, or gearshift information. The processor 170 may determine a parking situation based on whether implementation of the parking operation is detected.

For example, the processor 170 may receive vehicle speed information, steering wheel rotation angle information, or gearshift information from the sensing unit 760 or the controller 770 via the interface unit 130. When the leftward or rightward rotation angle of a steering wheel is a reference angle or more in a state in which the vehicle 700 slows down or stops, the processor 170 may determine that a current situation is a parking situation. When the steering wheel is rotated leftward or rightward predetermined times or more in a state in which the vehicle 700 slows down or stops, the processor 170 may determine that a current situation is a parking situation. When shifting between Drive and Reverse gears is repeated along with rotation of the steering wheel in a state in which the vehicle 700 slows down or stops, the processor 170 may determine that a current situation is a parking situation.

The processor 170 may determine a parking situation based on user input.

For example, the processor 170 may receive user input to begin an automated parking mode, which is received from the user input unit 724 of the vehicle 700 via the interface unit 130. The processor 170 may determine a parking situation upon receiving the user input to begin the automated parking mode.

The processor 170 may determine whether the vehicle 700 slows down or temporarily stops.

For example, the processor 170 may determine whether the vehicle 700 slows down or temporarily stops by detecting a prescribed object (e.g., a parking space) from the forward image or the around view image of the vehicle and tracking the detected object. Specifically, the processor 170 may determine whether the vehicle 700 slows down or temporarily stops based on a relative distance or a speed relative to the detected object.

For example, the processor 170 may receive vehicle speed information from the sensing unit 760 or the controller 770 via the interface unit 130 and determine whether the vehicle 700 slows down or temporarily stops based on a vehicle speed.

The processor 170 may generate a control signal to turn off the ISG function upon judging that the vehicle 700 slows down or temporarily stops for parking (S1730). The control signal may be provided to the controller 770.

The processor 170 may generate a control signal to turn on the ISG function upon judging that the vehicle 700 does not slow down or temporarily stop for parking (S1740). The control signal may be provided to the controller 770.

Generally, when an input to the brake pedal 721*d* is received in a state in which the vehicle travels at a predetermined speed or less or stops and no input to the accelerator pedal 721*c* is received, the ISG function is turned on to stop operation of the power source. However, according to the fifth implementation, when the vehicle 700 slows down or temporarily stops for parking, the ISG function is not turned on even under an ISG function operating condition. This has the effect of preventing travel delay caused when the ISG function is unintentionally turned on.

Figure 17B:
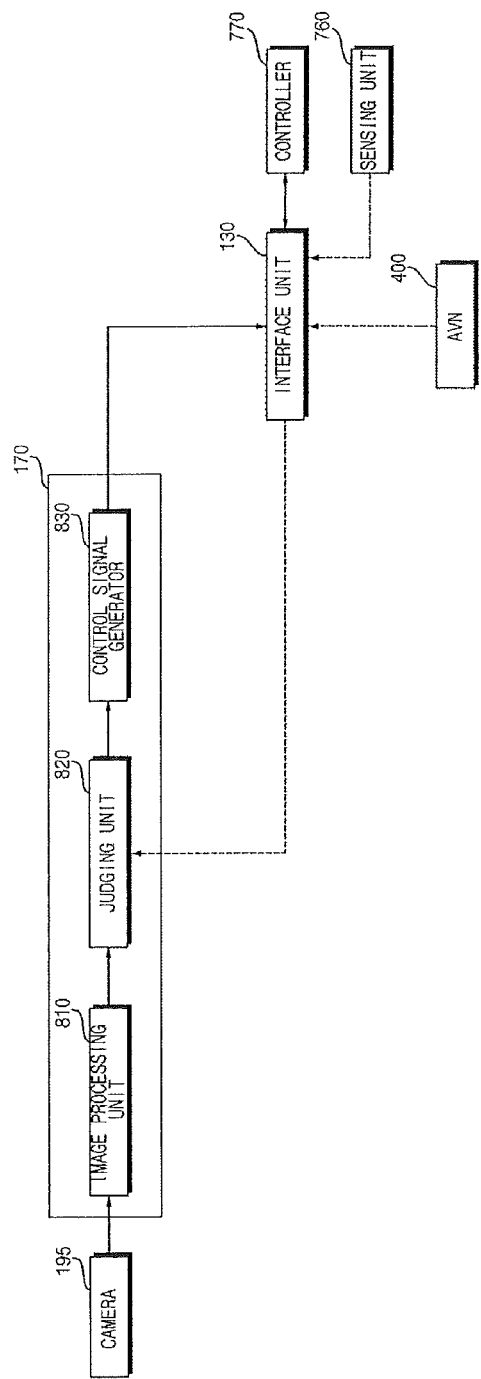
FIG. 17B is a block diagram illustrating an example of details of a processor according to the fifth implementation.

FIG. 17B is a detailed block diagram of the processor according to the fifth implementation.

Referring to FIG. 17B, the processor 170 may include the image processing unit 810, the judging unit 820, and the control signal generator 830.

The image processing unit 810 may process a forward image or an around view image of the vehicle acquired via the camera 195. The image processing unit 810 may detect an object based on the forward image or the around view image of the vehicle. The image processing unit 810 may detect information from the detected object. Here, the object may be at least one of a traffic light, a traffic sign, and a road surface. In addition, the object may be at least one of a lane, an adjacent vehicle, a pedestrian, a light, and a traffic signal.

The information may be vehicle travel situation information. For example, the information may be parking information. Here, the parking information may be information notifying that the vehicle 700 is located in a parking lot.

The image processing unit 810 may detect parking information based on a traffic light, a traffic sign, or a road surface detected from the forward image or the around view image of the vehicle.

For example, the image processing unit 810 detects a symbol or text from a traffic sign image included in the forward image or the around view image of the vehicle. The image processing unit 810 may detect parking information based on the detected symbol or text.

In another example, the image processing unit 810 detects a symbol or text from a road surface image included in the forward image or the around view image of the vehicle. The image processing unit 810 may detect parking information based on the detected symbol or text.

In a further example, the image processing unit 810 detects previously parked other vehicles from the forward image or the around view image of the vehicle. The image processing unit 810 may detect parking information based on the detected other vehicles.

The judging unit 820 may determine whether the vehicle 700 slows down or temporarily stops for parking.

The judging unit 820 may determine a parking situation.

For example, the image processing unit 810 may detect parking lot information from a traffic sign or a road surface detected from the forward image or the around view image of the vehicle. The judging unit 820 may determine a parking situation based on the detected parking lot information.

For example, the image processing unit 810 may detect text "Parking" from a traffic sign or a road surface detected from the forward image or the around view image of the vehicle. The judging unit 820 may determine a parking situation upon detecting the text "Parking".

For example, the image processing unit 810 may detect a parking space from a road surface detected from the forward image or the around view image of the vehicle. The image processing unit 810 may detect parking lot information based on the detected at least one parking space. The judging unit 820 may determine a parking situation based on the detected parking lot information.

For example, the judging unit 820 may determine a parking situation based on navigation information. Specifically, the judging unit 820 may determine a parking situation based on whether the vehicle 700 is located in a parking lot among the navigation information. Upon verifying, based on navigation information, that the vehicle 700 enters a parking lot, the judging unit 820 may determine that a current situation is a parking situation.

For example, when the number of previously parked other vehicles detected from the forward image or the around view image of the vehicle is a prescribed number or more, the judging unit 820 may determine that a current situation is a parking situation.

For example, the judging unit 820 may determine a parking situation based on vehicle speed information, steering wheel rotation angle information, or gearshift information.

For example, the judging unit 820 may determine a parking situation based on user input.

The judging unit 820 may determine whether the vehicle 700 slows down or temporarily stops.

For example, the image processing unit 810 may detect an object (e.g., a parking space) and track the detected object. In this case, the judging unit 820 may determine whether the vehicle 700 slows down or temporarily stops via tracking information. Specifically, the judging unit 820 may determine whether the vehicle 700 slows down or temporarily stops based on whether a relative distance or a speed relative to the detected object is reduced.

For example, the judging unit 820 may receive vehicle speed information from the sensing unit 760 or the controller 770 via the interface unit 130 and determine whether the vehicle 700 slows down or temporarily stops based on a vehicle speed.

The control signal generator 830 may generate a control signal to turn the ISG function on or off based on a determined result of the judging unit 820.

When the determined result of the judging unit 820 is that the vehicle 700 slows down or temporarily stops for parking, the control signal generator 830 may generate a control signal to turn off the ISG function.

When the determined result of the judging unit 820 is that the vehicle 700 slows down or temporarily stops for parking, the control signal generator 830 may generate a control signal to turn on the ISG function.

The control signal generated in the control signal generator 830 may be provided to the controller 770. In this case, the control signal generator 830 may output the control signal to the controller 770 via the interface unit 130.

FIGS. 18A to 18D are views referenced to explain the driver assistance apparatus when the vehicle slows down or temporarily stops for parking according to the fifth implementation. FIGS. 18A to 18D illustrate bird's eye views.

Figure 18A:
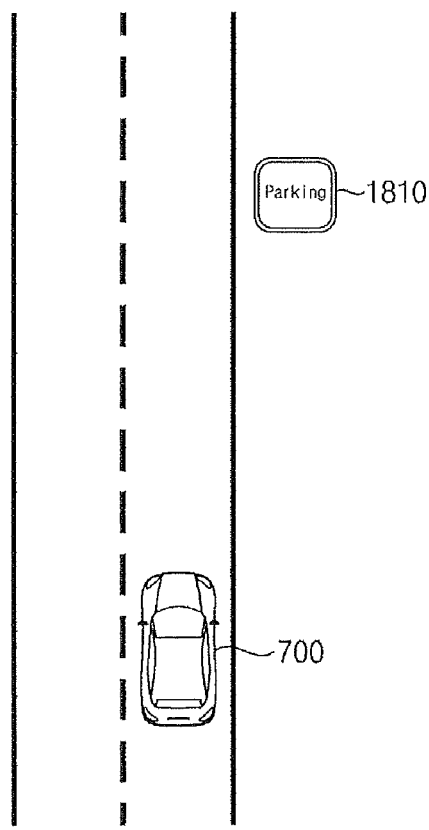
FIGS. 18A to 18D are diagrams illustrating examples of operations of a driver assistance apparatus when a vehicle slows down or temporarily stops for parking according to the fifth implementation.

Referring to FIG. 18A, the processor 170 acquires a forward image or an around view image of the vehicle via the camera 195.

The processor 170 may detect parking lot information based on a traffic sign 1810 included in the forward image or the around view image of the vehicle. The processor 170 may determine a parking situation based on the parking lot information.

The processor 170 detects a symbol or text based on a traffic sign detected from the forward image or the around view image of the vehicle. The processor 170 may detect parking lot information based on the detected symbol or text.

The processor 170 may determine a parking situation upon detecting a symbol of a vehicle or text "Parking" that indicates parking from a traffic sign image.

The processor 170 may determine whether the vehicle 700 slows down or temporarily stops.

For example, the processor 170 may determine whether the vehicle 700 slows down or temporarily stops by detecting a prescribed object (e.g., a parking space) from the forward image or the around view image of the vehicle and tracking the detected object.

For example, the processor 170 may receive vehicle speed information from the sensing unit 760 or the controller 770 via the interface unit 130 and determine whether the vehicle 700 slows down or temporarily stops based on a vehicle speed.

When the vehicle 700 slows down or temporarily stops for parking, the processor 170 generates a control signal to turn off the ISG function. The control signal may be provided to the controller 770. In this case, the ISG function is not operated. As such, operation of the power source does not stop even if an input to the brake pedal 721*d* is received in a state in which the vehicle 700 travels at a predetermined speed or less or stops and no input to the accelerator pedal 721*c* is received. For example, the power source may be continuously operated.

That is, when the vehicle 700 slows down or temporarily stops, the ISG function may not be turned on, even under an ISG function operating condition.

Figure 18B:
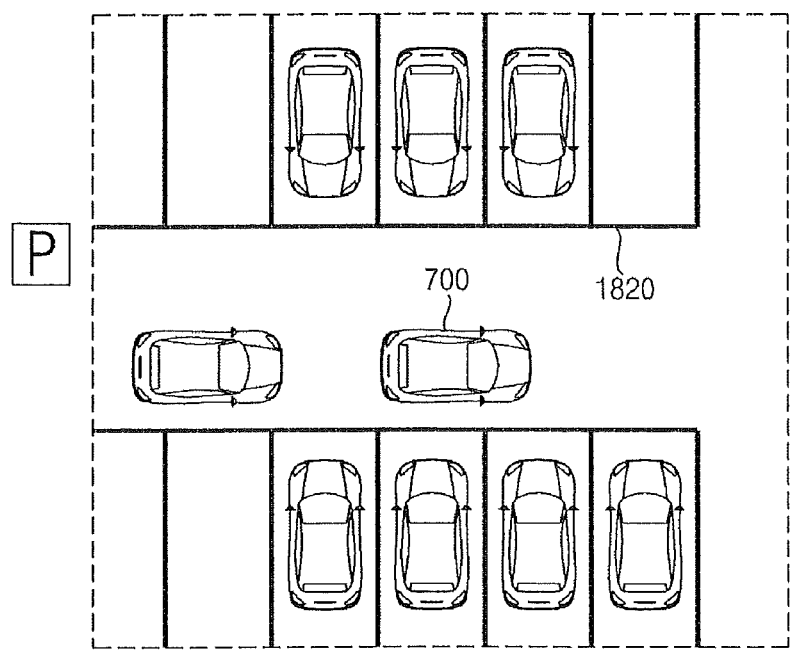
Figure 18C:
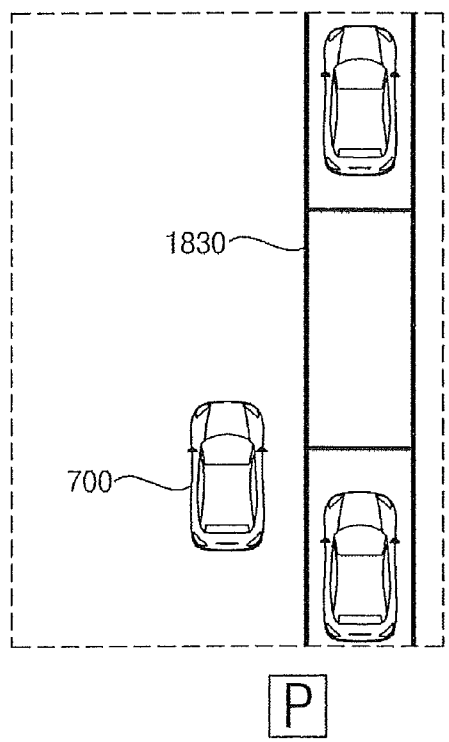
Figure 18D:
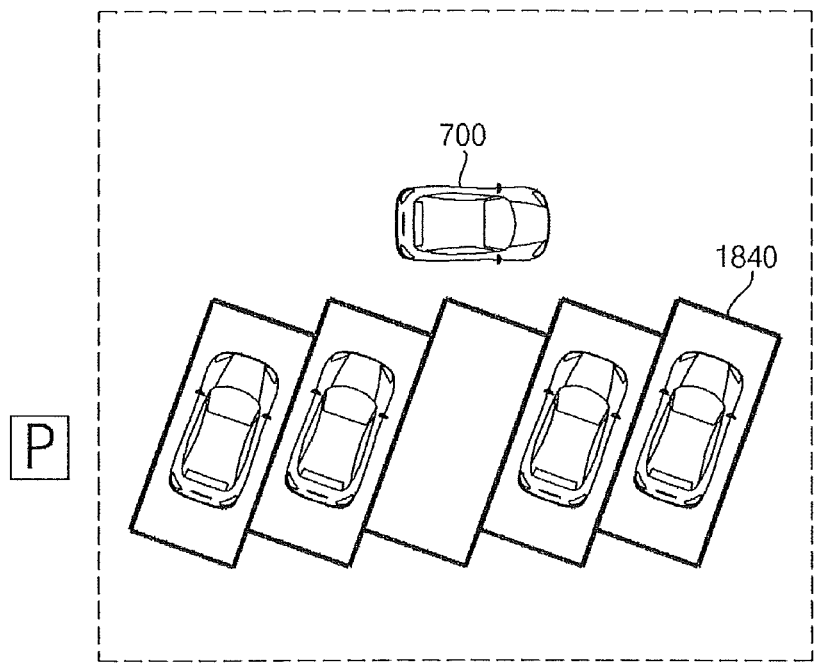

FIGS. 18B to 18D have a difference in that parking information is detected based on a road surface image as compared to FIG. 18A. The following description with reference to FIGS. 18B to 18D will focus on this difference.

The processor 170 detects a symbol or text from a road surface image included in the forward image or the around view image of the vehicle. The processor 170 may detect parking information based on the detected symbol or text.

The processor 170 may determine a parking situation upon detecting at least one parking space from the road surface image. Here, the parking space may be any one of a perpendicular parking space 1820 illustrated in FIG. 18B, a parallel parking space 1830 illustrated in FIG. 18C, and a diagonal parking space 1840 illustrated in FIG. 18D.

Figure 19A:
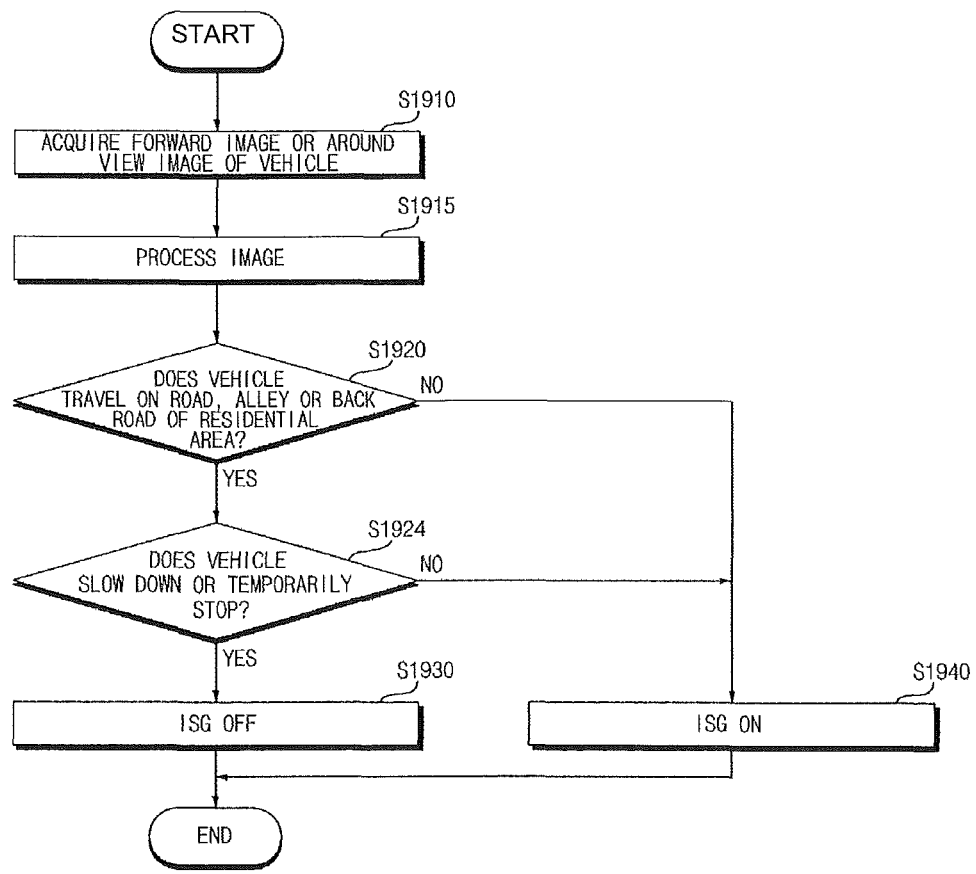
FIGS. 19A and 19B are flowcharts illustrating examples of operations of a driver assistance apparatus according to a sixth implementation.
Figure 19B:
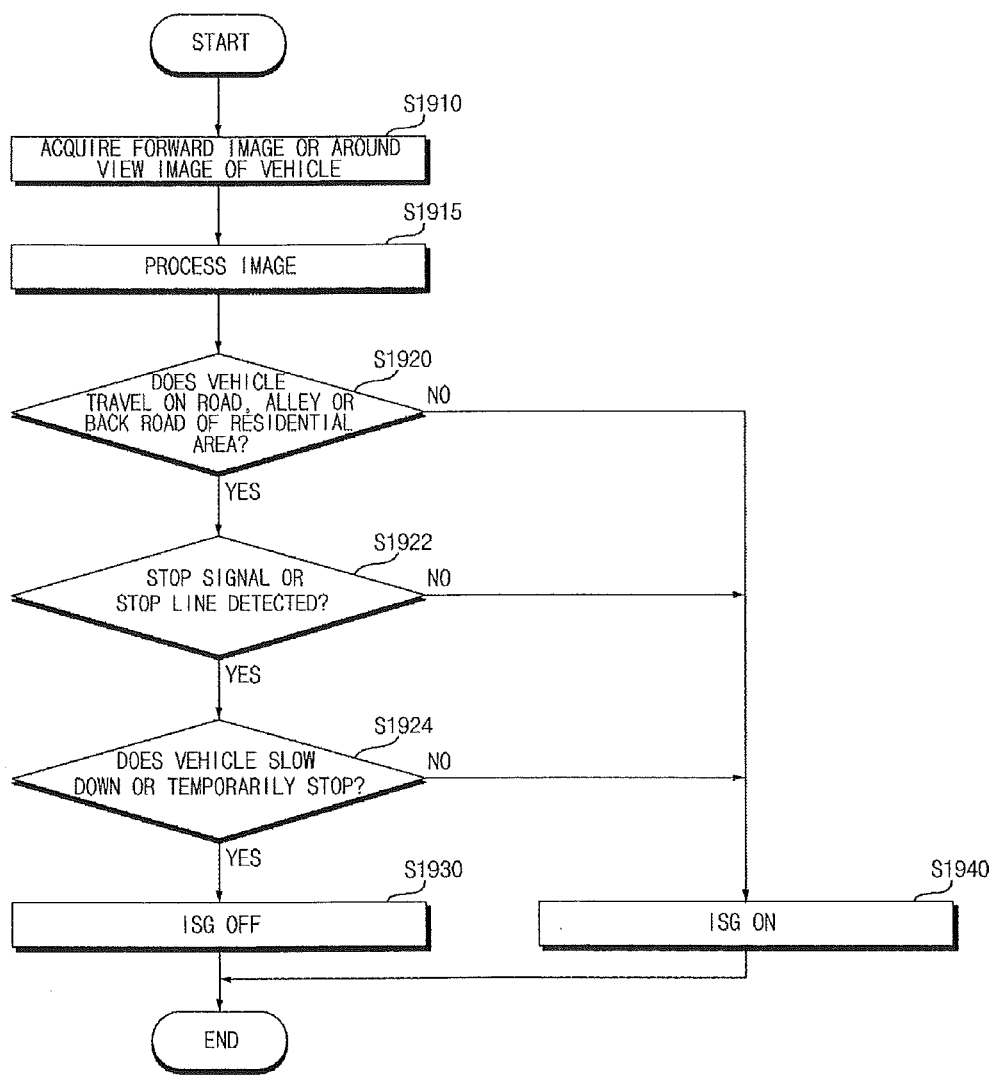

FIGS. 19A and 19B are flowcharts referenced to explain operation of the driver assistance apparatus according to a sixth implementation.

Referring to FIG. 19A, the processor 170 may acquire a forward image or an around view image of the vehicle via the camera 195 (S1910). Here, the camera 195 may be the camera as described above with reference to FIGS. 2A to 3C. In some implementations, three or more cameras 195 may be provided.

The camera 195 may capture a forward image or an around view image of the vehicle under control of the processor 170. The image captured by the camera 195 may include at least one object.

The camera 195 may capture an image of at least one of a traffic light, a traffic sign, and a road surface under control of the processor 170.

Once the forward image or the around view image of the vehicle has been acquired, the processor 170 may process the acquired forward image or the acquired around view image of the vehicle (S1915). The processor 170 detects an object from the forward image or the around view image of the vehicle. The processor 170 may detect information from the detected object. Here, the object may be at least one of a traffic light, a traffic sign and a road surface. In addition, the object may be at least one of a lane, an adjacent vehicle, a pedestrian, a light, and a traffic signal.

The information may be vehicle travel situation information. For example, the information may be information regarding a local-access road, such as a neighborhood road, an alley, or a back road of a residential area. In addition, the information may be stop signal or stop line information.

The processor 170 may detect information regarding a road, an alley, or a back road of a residential area based on a traffic light, a traffic sign, or a road surface detected from the forward image or the around view image of the vehicle.

In addition, the processor 170 may detect stop signal or stop line information based on a traffic light, a traffic sign, or a road surface detected from the forward image or the around view image of the vehicle.

For example, the processor 170 may calculate the width of a road from a road surface image. The processor 170 may detect information regarding a road, an alley, or a back road of a residential area based on the calculated road width.

For example, the processor 170 may detect whether lanes are present in a road surface image. The processor 170 may detect information regarding a road, an alley, or a back road of a residential area based on whether lanes are detected.

The processor 170 may detect a stop signal based on a detected traffic sign. Here, the stop signal may be a signal for temporarily stop of the vehicle. The processor 170 may detect a stop line based on a detected road surface. Here, the stop line may be a line for temporarily stop of the vehicle.

The processor 170 may determine whether the vehicle 700 is traveling on a road, an alley, or a back road of a residential area (S1920).

The processor 170 may determine whether the vehicle 700 is traveling on a road, an alley, or a back road of a residential area based on detected parking information or navigation information. Here, the processor 170 may receive navigation information from the AVN apparatus 400, the controller 770 or a separate navigation apparatus via the interface unit 130.

For example, the processor 170 may detect a stop signal for temporary stop from a detected traffic sign while the vehicle 700 travels on a road around a crossroad provided with no traffic light. In this case, the processor 170 may determine that the vehicle 700 travels on a road of a residential area.

For example, the processor 170 may detect a stop line for temporary stop from a detected road surface while the vehicle 700 travels on a road around a crossroad provided with no traffic light. In this case, the processor 170 may determine that the vehicle 700 travels on a road of a residential area.

For example, the processor 170 may determine a travel situation on a road, an alley, or a back road of a residential area when the calculated width of the road is a reference value or less.

For example, the processor 170 may determine a travel situation on a road, an alley, or a back road of a residential area when the no lane is detected from a road surface image.

The navigation information may include, for example, vehicle location information, traveling road information, and surrounding building information. The processor 170 may determine a travel situation on a road, an alley, or a back road of a residential area based on at least one of vehicle location information, traveling road information, and surrounding building information.

In a state in which the vehicle 700 travels on a road, an alley, or a back road of a residential area, the processor 170 may determine whether the vehicle 700 slows down or temporarily stops (S1924). Here, slowing down is a condition that causes the ISG function to be turned on and may mean that the vehicle travels at a predetermined speed or less (e.g., 10 km/h or less). Here, temporary stop is a condition that causes the ISG function to be turned on and may mean that the vehicle stops during a short time (e.g., 1 second or less) and thereafter accelerates.

For example, the processor 170 may determine whether the vehicle 700 slows down or temporarily stops by detecting a prescribed object from the forward image or the around view image of the vehicle and tracking the detected object.

Specifically, the processor 170 may determine whether the vehicle 700 slows down or temporarily stops based on a relative distance or a speed relative to the detected object.

For example, the processor 170 may receive vehicle speed information from the sensing unit 760 or the controller 770 via the interface unit 130 and determine whether the vehicle 700 slows down or temporarily stops based on a vehicle speed.

Upon judging that the vehicle 700 slows down or temporarily stops on a road, an alley, or a back road of a residential area, the processor 170 may generate a control signal to turn off the ISG function (S1930). The control signal may be provided to the controller 770.

Upon judging that the vehicle 700 does not travel on a road, an alley, or a back road of a residential area, the processor 170 may generate a control signal to turn on the ISG function (S1940). The control signal may be provided to the controller 770.

Upon judging that the vehicle 700 travels on a road, an alley, or a back road of a residential area, but does not slow down or temporarily stop, the processor 170 may generate a control signal to turn on the ISG function (S1940). The control signal may be provided to the controller 770.

Generally, when an input to the brake pedal 721*d* is received in a state in which the vehicle travels at a predetermined speed or less or stops and no input to the accelerator pedal 721*c* is received, the ISG function is turned on to stop operation of the power source. However, according to the sixth implementation, when the vehicle 700 slows down or temporarily stops on a road, an alley, or a back road of a residential area, the ISG function is not turned on even under an ISG function operating condition. This has the effect of preventing travel delay caused when the ISG function is unintentionally turned on.

FIG. 19B further illustrates a step of judging whether a stop signal or a stop line is detected (S1922) between Step S1920 and Step S1924 as compared to FIG. 19A.

In a state in which the vehicle travels on a road, an alley, or a back road of a residential area, the processor 170 may detect a stop signal or a stop line from the forward image or the around view image of the vehicle (S1922). The processor 170 may determine detection of a vehicle stop signal upon detecting text "Stop" from a traffic sign image or a road surface image. The processor 170 may determine that a stop line is detected upon detecting a line close to a direction perpendicular to the direction of travel of the vehicle from a road surface image.

Traffic signs, marked with stop signals, are present everywhere on roads of a residential area in the USA. In addition, stop lines are marked on road surfaces. In the USA, that the vehicle stops for several seconds in front of a traffic sign marked with a stop signal or a stop line and then restarts is laid down in the statute. As the ISG function is operated in this situation, a course in which the power source stops operation when the vehicle stops and then operates when the vehicle restarts may be repeated. This stop/operation repetition of the power source, however, may make the driver uncomfortable.

Once the stop signal or the stop line has been detected, the processor 170 may determine whether the vehicle 700 slows down or temporarily stops (S1924).

Upon judging that the vehicle 700 slows down or temporarily stops on a road, an alley, or a back road of a residential area, the processor 170 may generate a control signal to turn off the ISG function (S1930). The control signal may be provided to the controller 770.

Upon judging that the vehicle 700 does not travel on a road, an alley, or a back road of a residential area, the processor 170 may generate a control signal to turn on the ISG function (S1940). The control signal may be provided to the controller 770.

Upon judging that the vehicle 700 travels on a road, an alley, or a back road of a residential area, but does not slow down or temporarily stop even if a stop signal or a stop line is detected, the processor 170 may generate a control signal to turn on the ISG function (S1940). The control signal may be provided to the controller 770.

Figure 19C:
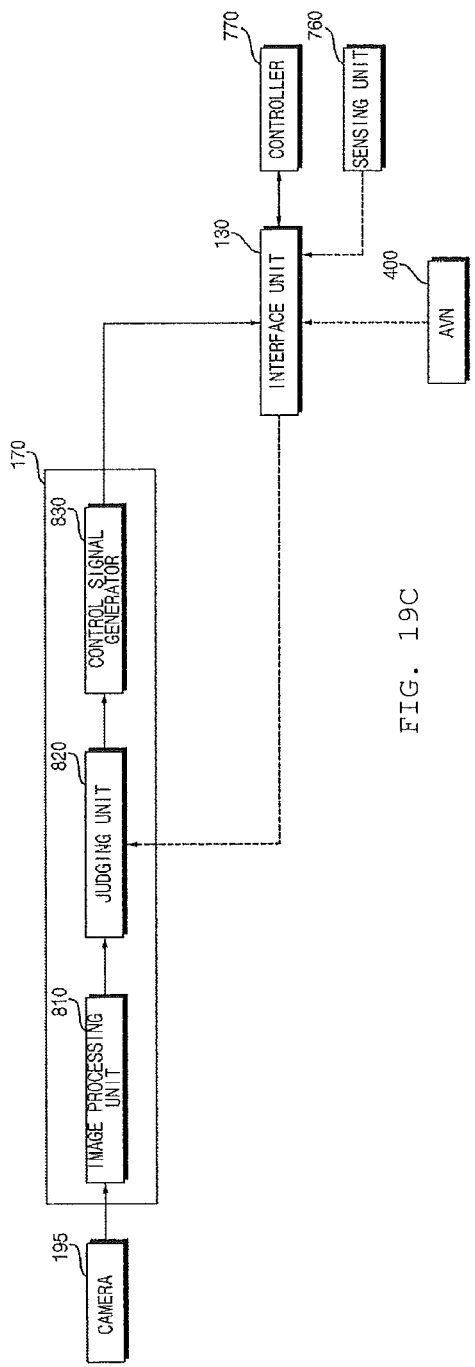
FIG. 19C is a block diagram illustrating an example of details of a processor according to the sixth implementation.

FIG. 19C is a detailed block diagram of the processor according to the sixth implementation.

Referring to FIG. 19C, the processor 170 may include the image processing unit 810, the judging unit 820, and the control signal generator 830.

The image processing unit 810 may process a forward image or an around view image of the vehicle acquired via the camera 195. The image processing unit 810 may detect an object based on the forward image or the around view image of the vehicle. The image processing unit 810 may detect information from the detected object. Here, the object may be at least one of a traffic light, a traffic sign, and a road surface. Here, the information may be information regarding a road, an alley, or a back road of a residential area. In addition, the object may be at least one of a lane, an adjacent vehicle, a pedestrian, a light, and a traffic signal.

The information may be vehicle travel situation information. For example, the information may be stop signal or stop line information.

The image processing unit 810 may detect information regarding a road, an alley, or a back road of a residential area based on a traffic sign or a road surface detected from the forward image or the around view image of the vehicle. In addition, the image processing unit 810 may detect stop signal or stop line information based on a traffic sign or a road surface detected from the forward image or the around view image of the vehicle.

For example, the image processing unit 810 may detect whether a lane is present from a road surface image. The image processing unit 810 may detect information regarding a road, an alley, or a back road of a residential area based on whether there is present the detected lane.

For example, the image processing unit 810 may detect a stop signal from a traffic sign image.

For example, the image processing unit 810 may detect a stop line from a road surface image.

The judging unit 820 may determine whether the vehicle is traveling on a road, an alley, or a back road of a residential area.

The judging unit 820 may determine a travel situation on a road, an alley, or a backroad of a residential area based on detected parking information or navigation information.

For example, the judging unit 820 may determine that the vehicle travels on a road, an alley, or a back road of a residential area when the calculated width of a road is a reference value or less.

For example, the judging unit 820 may determine that the vehicle travels on a road, an alley, or a back road of a residential area when no lane is detected from a road surface image.

For example, the judging unit 820 may determine whether the vehicle travels on a road, an alley, or a back road of a residential area based on at least one of vehicle location information, travel road information, and surrounding building information included in navigation information.

The judging unit 820 may detect whether a stop signal or a stop line is detected from the forward image or the around view image of the vehicle. The judging unit 820 may determine detection of a vehicle stop signal upon detecting text "Stop" from a traffic sign image or a road surface image. The judging unit 820 may determine detection of a stop line upon detecting a line close to a direction perpendicular to the direction of travel of the vehicle from a road surface image.

The judging unit 820 may determine whether the vehicle 700 slows down or temporarily stops.

For example, the image processing unit 810 detects an object and tracks the detected object. In this case, the judging unit 820 may determine whether the vehicle 700 slows down or temporarily stops via tracking information. Specifically, the judging unit 820 may determine whether the vehicle 700 slows down or temporarily stops based on whether a relative distance or a speed relative to the detected object decreases.

For example, the judging unit 820 may receive vehicle speed information from the sensing unit 760 or the controller 770 via the interface unit 130 and determine whether the vehicle 700 slows down or temporarily stops based on a vehicle speed.

The control signal generator 830 may generate a control signal to turn the ISG function on or off based on a determined result of the judging unit 820.

When the determined result of the judging unit 820 is that the vehicle 700 slows down or temporarily stops on a road, an alley, or a back road of a residential area, the judging unit 820 generates a control signal to turn off the ISG function.

When the determined result of the judging unit 820 is that a stop signal or a stop line is detected on a road, an alley, or a back road of a residential area and the vehicle 700 slows down or temporarily stops, the control signal generator 830 generates a control signal to turn off the ISG function.

When the determined result of the judging unit 820 is that the vehicle 700 does not travel on a road, an alley, or a back road of a residential area, the control signal generator 830 may generate a control signal to turn on the ISG function.

When the determined result of the judging unit 820 is that the vehicle 700 travels on a road, an alley, or a back road of a residential area, but does not slow down or temporarily stop, the control signal generator 830 may generate a control signal to turn on the ISG function.

When the determined result of the judging unit 820 is that the vehicle 700 travels on a road, an alley, or a back road of a residential area and does not slow down or temporarily stop even if a stop signal or a stop line is detected, the control signal generator 830 generates a control signal to turn on the ISG function.

The control signal generated in the control signal generator 830 may be provided to the controller 770. In this case, the control signal generator 830 may output the control signal to the controller 770 via the interface unit 130.

Figure 20A:
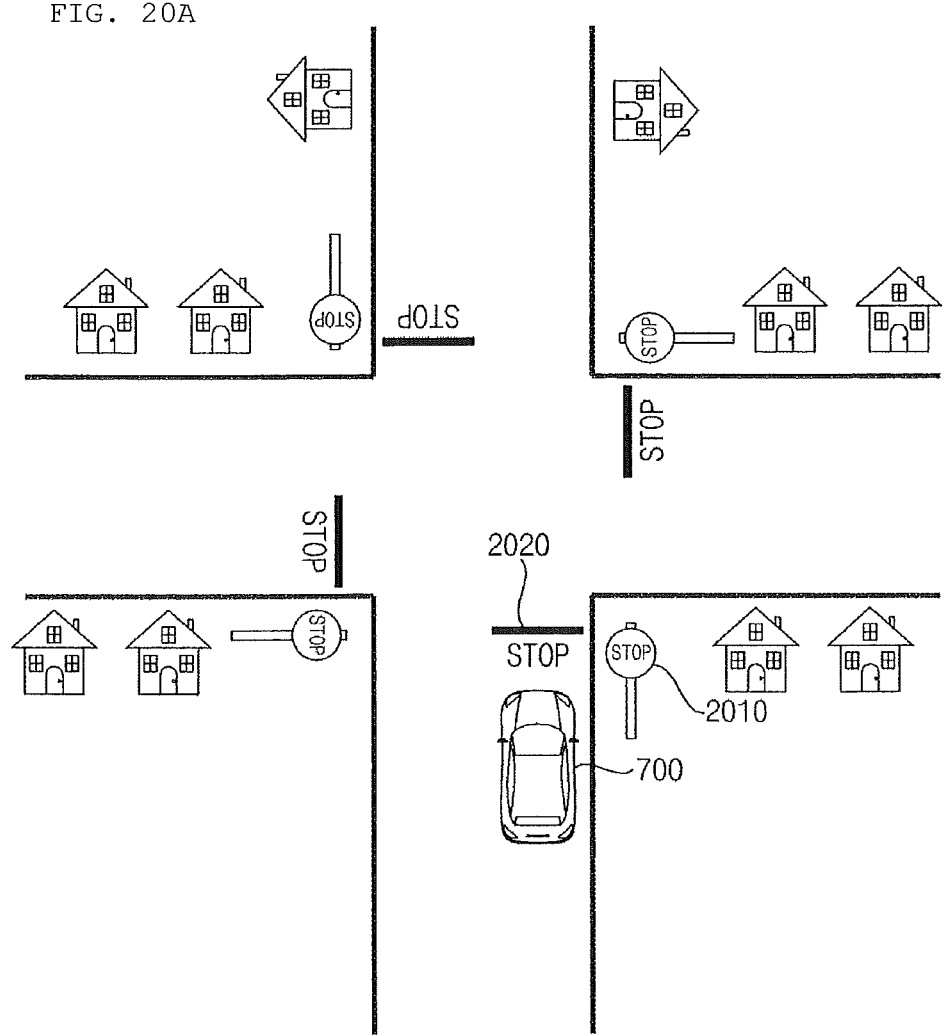
FIGS. 20A and 20B are diagrams illustrating examples of operations of a driver assistance apparatus when a vehicle slows down or temporarily stops in a road, alley, or backside road of a residential area according to the sixth implementation.
Figure 20B:
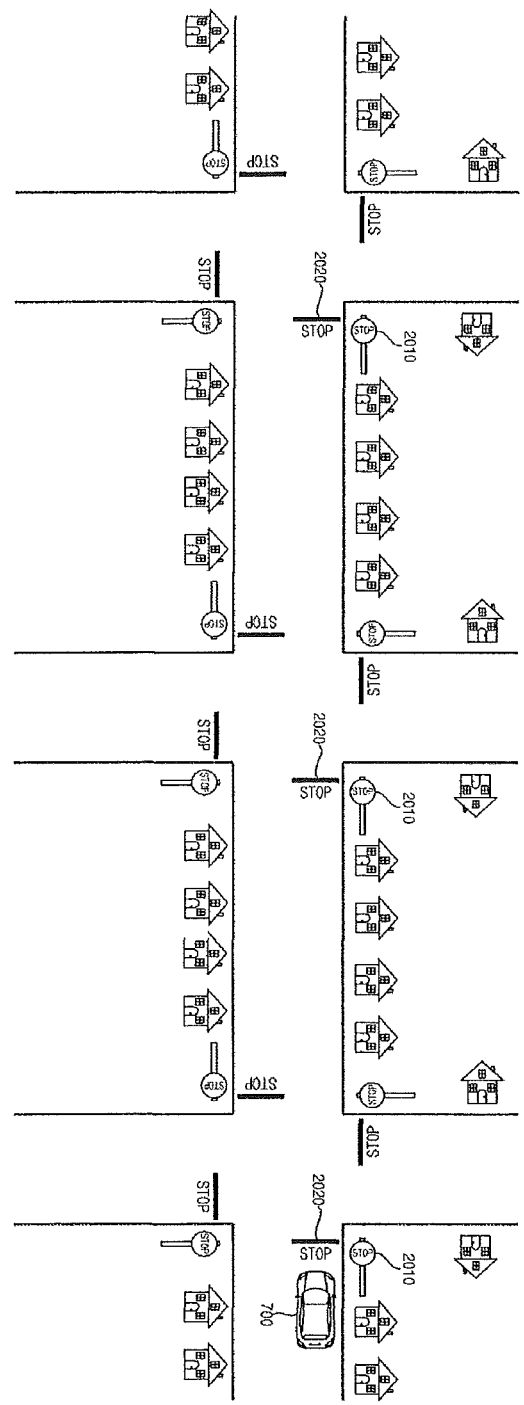

FIGS. 20A and 20B are views referenced to explain the driver assistance apparatus when the vehicle slows down or temporarily stops on a road, an alley, or a back road of a residential area according to the fifth implementation. FIGS. 20A and 20B illustrate bird's eye views.

Referring to FIG. 20A, the processor 170 acquires a forward image or an around view image of the vehicle via the camera 195.

The processor 170 may detect information regarding a road, an alley, or a back road of a residential area based on a traffic light, a traffic sign 2010, or a road surface detected from the forward image or the around view image of the vehicle. In addition, the processor 170 may detect stop signal or stop line information based on the traffic light, the traffic sign 2010, or the road surface detected from the forward image or the around view image of the vehicle.

For example, the processor 170 may calculate the width of a road from a road surface image. The processor 170 may detect information regarding a road, an alley, or a back road of a residential area based on the calculated road width.

For example, the processor 170 may detect whether lanes are present in a road surface image. The processor 170 may detect information regarding a road, an alley, or a back road of a residential area based on whether the presence of lanes is detected.

The processor 170 may detect a stop signal based on an image of the traffic sign 2010. The processor 170 may detect a stop line 2020 from a road surface image.

The processor 170 may determine whether the vehicle 700 slows down or temporarily stops while traveling on a road, an alley, or a back road of a residential area.

For example, the processor 170 may determine whether the vehicle 700 slows down or temporarily stops by detecting a prescribed object from the forward image or the around view image of the vehicle and tracking the detected object.

For example, the processor 170 may receive vehicle speed information from the sensing unit 760 or the controller 770 via the interface unit 130 and determine whether the vehicle 700 slows down or temporarily stops based on a vehicle speed.

The processor 170 may determine that a vehicle stop signal is detected upon detecting text "Stop" from a traffic sign image or a road surface image. The processor 170 may determine that a stop line is detected upon detecting a line close to a direction perpendicular to the direction of travel of the vehicle from a road surface image.

Upon judging that the vehicle 700 slows down or temporarily stops on a road, an alley, or a back road of a residential area, the processor 170 may generate a control signal to turn off the ISG function. The control signal may be provided to the controller 770.

Upon judging that a stop signal or a stop line is detected on a road, an alley, or a back road of a residential area and the vehicle 700 slows down or temporarily stops, the processor 170 may generate a control signal to turn off the ISG function. The control signal may be provided to the controller 770.

In this case, even if an input to the brake pedal 721*d* is received in a state in which the vehicle travels at a predetermined speed or less or stops and no input to the accelerator pedal 721*c* is received, the ISG function is not turned on and operation of the power source does not stop. For example, the power source may be continuously operated.

That is, when the vehicle 700 slows down or temporarily stops on a road, an alley, or a back road of a residential area, the ISG function may not be turned on, even under an ISG function operating condition.

FIG. 20B is a view referenced to explain operation of the driver assistance apparatus when stop information or stop lines are detected several times.

When the vehicle 700 travels on a road of a residential area, a traffic sign 2010 marked with a stop signal or a stop line 2020 marked on a road surface may be detected plural times.

The processor 170 counts the detection number of the stop signal or the stop line.

Upon judging that the vehicle 700 detects a stop signal or a stop line on a road of a residential area predetermined times or more and the vehicle 700 slows down or temporarily stops, the processor 170 generates a control signal to turn off the ISG function. The control signal may be provided to the controller 770.

When a stop signal or a stop line is detected predetermined times or more, the processor 170 may determine that the vehicle 700 travels on a road of a residential area. In this case, the processor 170 has the effect of more accurately performing judgment about the road of the residential area.

Figure 21A:
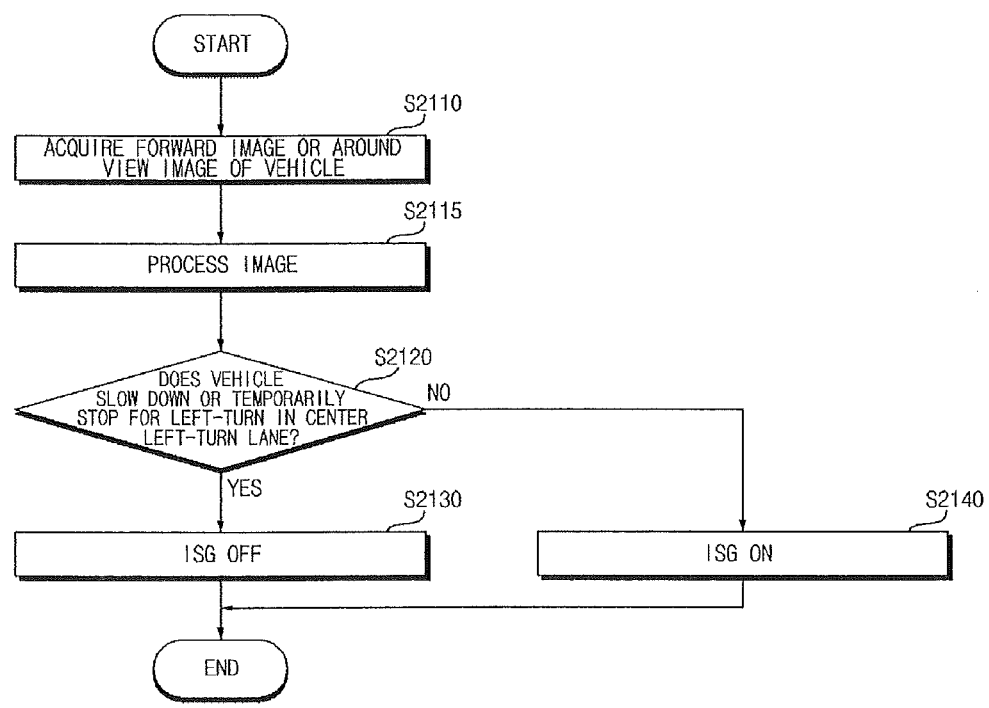
FIGS. 21A and 21B are flowcharts illustrating examples of operations of a driver assistance apparatus according to a seventh implementation.
Figure 21B:
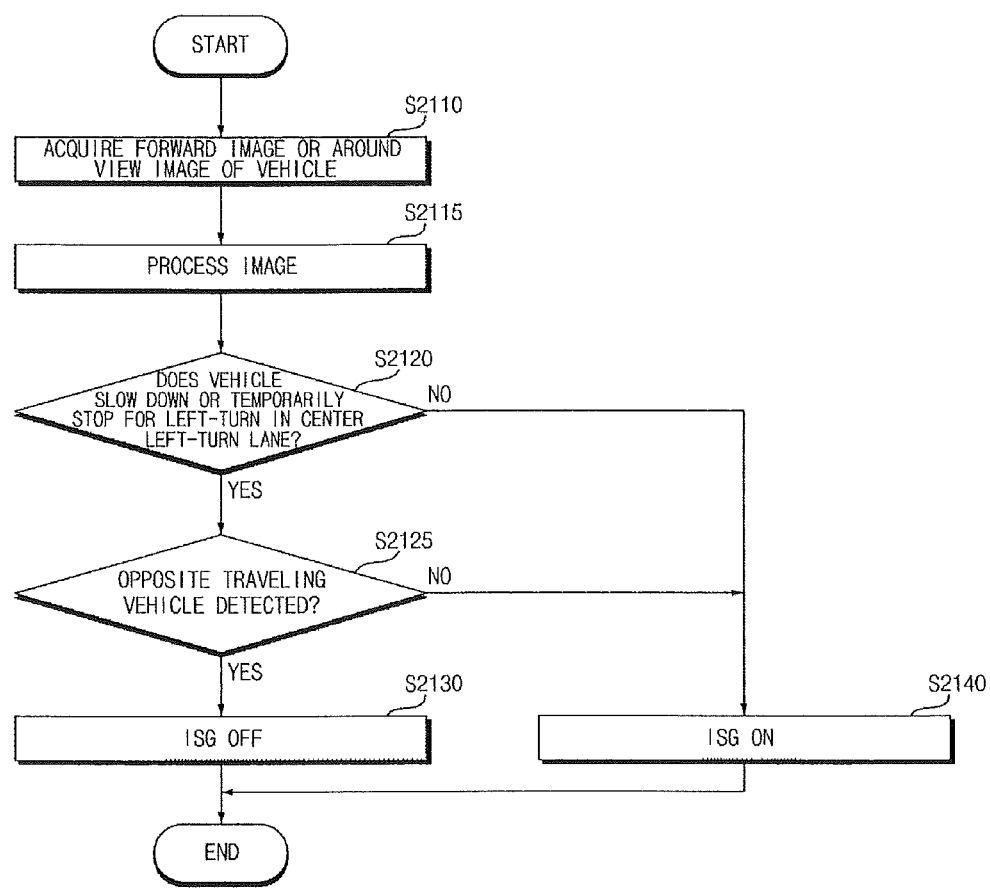

FIGS. 21A and 21B are flowcharts referenced to explain operation of the driver assistance apparatus according to a seventh implementation.

Referring to FIG. 21A, the processor 170 may acquire a forward image or an around view image of the vehicle via the camera 195 (S2110). Here, the camera 195 may be the camera as described above with reference to FIGS. 2A to 3C. In some implementations, three or more cameras 195 may be provided.

The camera 195 may capture a forward image or an around view image of the vehicle under control of the processor 170. The image captured by the camera 195 may include at least one object.

The camera 195 may capture an image of at least one of a traffic light, a traffic sign, and a road surface under control of the processor 170.

Once the forward image or the around view image of the vehicle has been acquired, the processor 170 may process the acquired forward image or the acquired around view image of the vehicle (S2115). The processor 170 detects an object from the forward image or the around view image of the vehicle. The processor 170 may detect information from the detected object. Here, the object may be at least one of a traffic light, a traffic sign and a road surface. In addition, the object may be at least one of a lane, an adjacent vehicle, a pedestrian, a light, and a traffic signal.

Information may be information regarding a vehicle travel situation. For example, information may be center left-turn lane information.

The processor 170 may detect a lane from a road surface image. The processor 170 may detect a center left-turn lane based on the detected lane.

Road traffic systems and regulations differ from country to country. In the case of the USA, a waiting lane for the left-turn of the vehicle is located at the center of a road. A vehicle that is waiting in the left-turn waiting lane may turn to the left even if there is no traffic light when no vehicle is traveling in the opposite side.

The processor 170 may verify center left-turn information by comparing detected information with information stored in the memory 140.

The processor 170 may determine whether the vehicle 700 slows down or temporarily stops for left-turn in the center left-turn lane (S2120).

The processor 170 may determine whether the vehicle 700 is located in the center left-turn lane.

For example, the processor 170 may detect a center left-turn lane based on the color of lanes. A general travel lane may be white and the center left-turn lane may be yellow. In such cases, when lines located at the left and right sides of the vehicle 700 are detected as yellow, the processor 170 may detect the left and right lines as the center left-turn lane.

In a state in which the vehicle 700 is located in the center left-turn lane, the processor 170 may determine whether the vehicle slows down or temporarily stops for left-turn.

The processor 170 determines a left-turn situation based on navigation information or turn signal information.

For example, the processor 170 may determine a left-turn situation based on a travel routing to an input destination included in navigation information. Here, the processor 170 may receive navigation information from the AVN apparatus 400, the controller 770 or a separate navigation apparatus via the interface unit 130.

For example, the processor 170 may determine a left-turn situation based on turn-signal information input in a state in which the vehicle 700 is located in a center left-turn lane. Here, the processor 170 may receive turn-signal information from the controller 770 via the interface unit 130. The turn-signal information may be a turn-on signal of a turn signal for left-turn or right-turn input by the user. Upon receiving an input to turn on a left or right turn signal via a user input unit (724 in FIG. 7) of the vehicle 700, the processor 170 may receive turn-signal information via the interface unit 130.

The processor 170 may determine whether the vehicle 700 slows down or temporarily stops. Here, slowing down is a condition that causes the ISG function to be turned on and may mean that the vehicle travels at a predetermined speed or less (e.g., 10 km/h or less). Here, temporary stop is a condition that causes the ISG function to be turned on and may mean that the vehicle stops during a short time (e.g., 1 second or less) and thereafter accelerates.

For example, the processor 170 may determine whether the vehicle 700 slows down or temporarily stops by detecting a prescribed object from the forward image or the around view image of the vehicle and tracking the detected object. Specifically, the processor 170 may determine whether the vehicle 700 slows down or temporarily stops based on whether a relative distance or a speed relative to the detected object.

For example, the processor 170 may receive vehicle speed information from the sensing unit 760 or the controller 770 via the interface unit 130 and determine whether the vehicle slows down or temporarily stops based on a vehicle speed.

Upon judging that the vehicle 700 slows down or temporarily stops for left-turn in a center left-turn lane, the processor 170 may generate a control signal to turn off the ISG function (S2130). The control signal may be provided to the controller 770.

Upon judging that the vehicle 700 is not located in a center left-turn lane, the processor 170 may generate a control signal to turn on the ISG function (S2140). The control signal may be provided to the controller 770.

Upon judging that the vehicle 700 does not slow down or temporarily stop for left-turn even if the vehicle 700 is located in a center left-turn lane, the processor 170 may generate a control signal to turn on the ISG function (S2140). The control signal may be provided to the controller 770.

Generally, when an input to the brake pedal 721*d* is received in a state in which the vehicle travels at a predetermined speed or less or stops and no input to the accelerator pedal 721*c* is received, the ISG function is turned on to stop operation of the power source. However, according to the seventh implementation, when the vehicle 700 slows down or temporarily stops for left-turn in a center left-turn lane, the ISG function is not turned on even under ISG operating conditions. This has the effect of preventing travel delay caused when the ISG function is unintentionally turned on, thereby preventing a collision accident with a vehicle in an opposite lane.

FIG. 21B further illustrates a step of detecting an opposite traveling vehicle (S2125) between Step S2120 and S2130 or S2140 as compared to FIG. 21A.

In a state in which the vehicle 700 slows down or temporarily stops for left-turn in a center left-turn lane, the processor 170 may detect an opposite traveling vehicle from a forward image of the vehicle (S2125). The processor 170 may detect the opposite traveling vehicle, a relative distance or a speed relative to the vehicle 700 of which decreases, from the forward image of the vehicle.

Upon detecting the opposite traveling vehicle, the processor 170 may generate a control signal to turn on the ISG function (S2140). It is necessary to turn on the ISG function so as to stop operation of the power source upon detection of the opposite traveling vehicle because making a left-turn in an OFF state of the ISG function despite the presence of the opposite traveling vehicle may cause accidents.

When no opposite traveling vehicle is detected, the processor 170 may generate a control signal to turn off the ISG function (S2130).

Figure 21C:
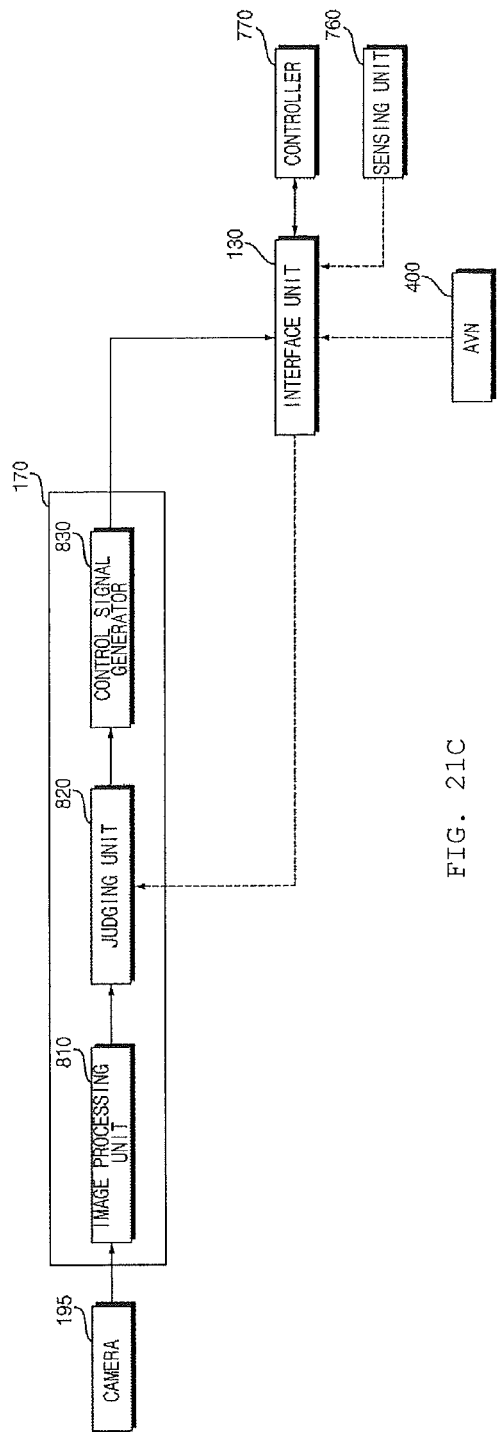
FIG. 21C is a block diagram illustrating an example of details of a processor according to the seventh implementation.

FIG. 21C is a detailed block diagram of the processor according to the seventh implementation.

Referring to FIG. 21C, the processor 170 may include the image processing unit 810, the judging unit 820, and the control signal generator 830.

The image processing unit 810 may process a forward image or an around view image of the vehicle acquired via the camera 195. The image processing unit 810 may detect an object based on the forward image or the around view image of the vehicle. The image processing unit 810 may detect information from the detected object. Here, the object may be at least one of a traffic light, a traffic sign, and a road surface. In addition, the object may be at least one of a lane, an adjacent vehicle, a pedestrian, a light, and a traffic signal.

The information may be vehicle travel situation information. For example, the information may be center left-turn lane information.

The image processing unit 810 may detect center left-turn lane information based on a road surface image included in the forward image or the around view image of the vehicle.

The judging unit 820 may determine whether the vehicle 700 is located in a center left-turn lane.

For example, the judging unit 820 may detect a center left-turn lane based on the color of lanes. A general travel lane may be white and the center left-turn lane may be yellow. In such cases, when lines located at the left and right sides of the vehicle 700 are detected as yellow, the judging unit 820 may detect the left and right lines as the center left-turn lane.

The judging unit 820 may determine whether the vehicle 700 slows down or temporarily stops for left-turn.

For example, the judging unit 820 may determine a left-turn situation based on a travel routing to an input destination included in navigation information.

For example, the judging unit 820 may determine a left-turn situation based on input turn signal information in a state in which the vehicle 700 is located in a center left-turn lane.

The judging unit 820 may determine whether the vehicle 700 slows down or temporarily stops.

For example, the judging unit 820 may determine whether the vehicle 700 slows down or temporarily stops by detecting a prescribed object from a forward image or an around view image of the vehicle and tracking the detected object. Specifically, the judging unit 820 may determine whether the vehicle 700 slows down or temporarily stops based on whether a relative distance or a speed relative to the detected object decreases.

For example, the judging unit 820 may receive vehicle speed information from the sensing unit 760 or the controller 770 via the interface unit 130 and determine whether the vehicle 700 slows down or temporarily stops based on a vehicle speed.

The judging unit 820 may determine whether an opposite traveling vehicle is detected.

For example, the judging unit 820 may detect an opposite traveling vehicle from the forward image based on whether a distance or a speed of the opposite traveling vehicle relative to the vehicle 700 decreases.

The control signal generator 830 may generate a control signal to turn the ISG function on or off based on a determined result of the judging unit 820.

When the determined result of the judging unit 820 is that the vehicle 700 slows down or temporarily stops for left-turn in a center left-turn lane, the control signal generator 830 generates a control signal to turn off the ISG function.

When the determined result of the judging unit 820 is that the vehicle 700 is not located in a center left-turn lane, the control signal generator 830 generates a control signal to turn on the ISG function.

When the determined result of the judging unit 820 is that the vehicle 700 does not slow down or temporarily stop although it is located in a center left-turn lane, the control signal generator 830 generates a control signal to turn on the ISG function.

When the determined result of the judging unit 820 is that an opposite traveling vehicle is detected even if the vehicle 700 slows down or temporarily stops for left-turn in a center left-turn lane, the control signal generator 830 generates a control signal to turn on the ISG function.

The control signal generated in the control signal generator 830 may be provided to the controller 770. In this case, the control signal generator 830 may output the control signal to the controller 770 via the interface unit 130.

Figure 22A:
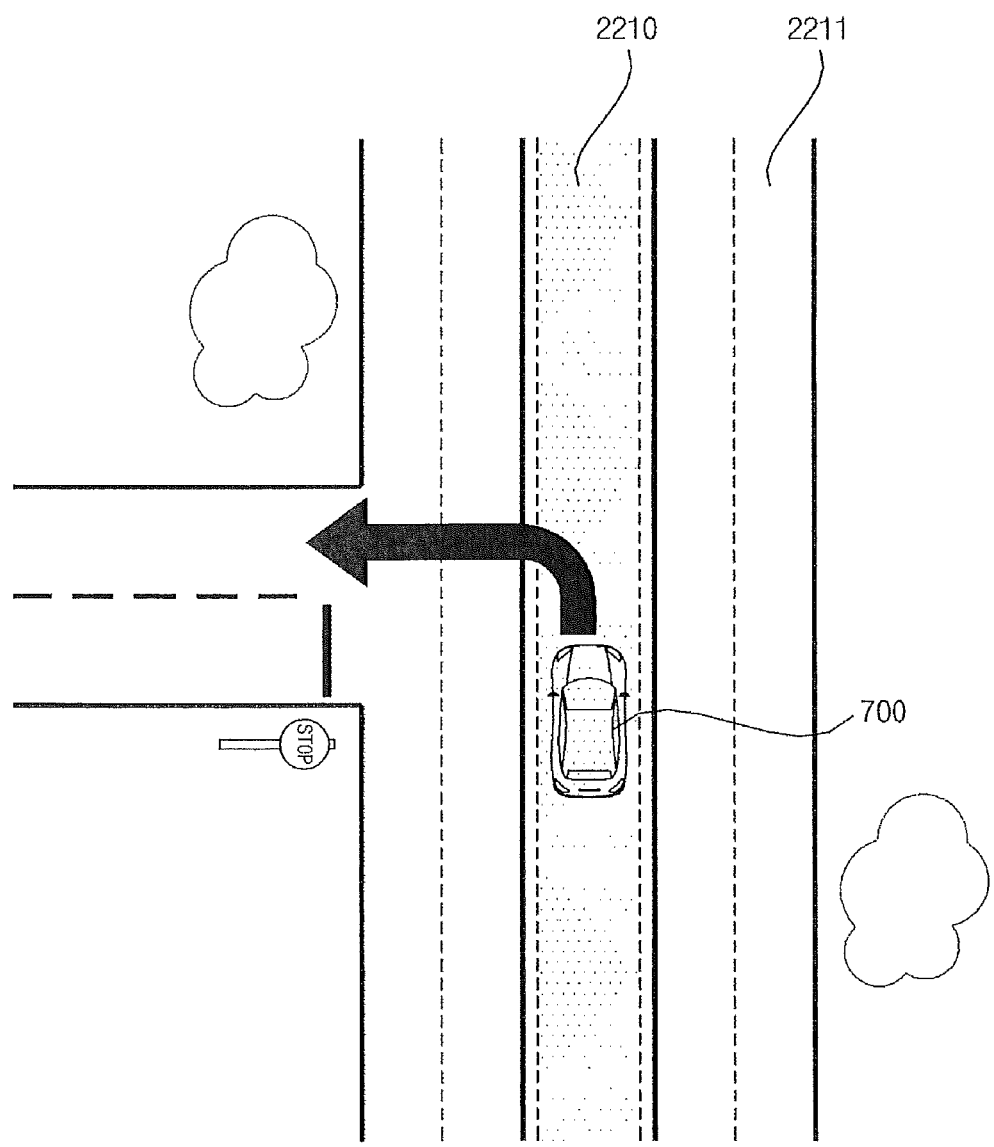
FIGS. 22A and 22B are diagrams illustrating examples of operations of a driver assistance apparatus when a vehicle slows down or temporarily stops for left-turn in a center left-turn lane according to the seventh implementation.
Figure 22B:
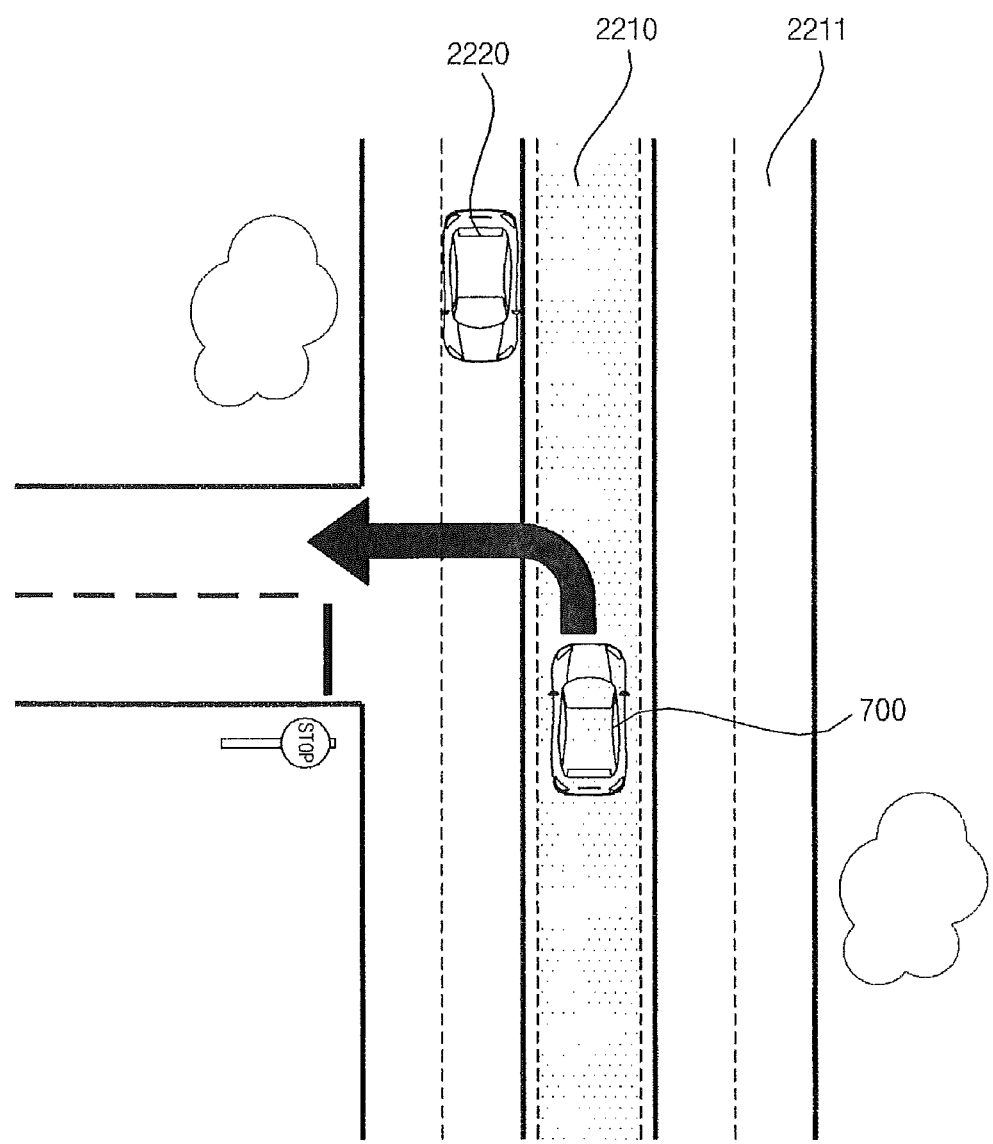

FIGS. 22A to 22B are views referenced to explain the driver assistance apparatus when the vehicle slows down or temporarily stops for left-turn in a center left-turn lane according to the seventh implementation. FIGS. 22A and 22B illustrate bird's eye views.

Referring to FIG. 22A, the processor 170 acquires a forward image or an around view image of the vehicle via the camera 195.

The processor 170 may detect center left-turn lane information based on a traffic light, a traffic sign, or a road surface included in the forward image or the around view image of the vehicle.

For example, the processor 170 may detect a lane from a road surface image. The processor 170 may detect a center left-turn lane 2210 based on the detected lane.

The processor 170 may determine whether the vehicle 700 is located in the center left-turn lane 2210.

For example, the processor 170 may detect the center left-turn lane 2210 based on the color of the lane. A general travel lane 2211 may be white and the center left-turn lane 2210 may be yellow. In such cases, when lines located at the left and right sides of the vehicle 700 are detected as yellow, the processor 170 may detect the left and right lines as the center left-turn lane 2210.

In a state in which the vehicle 700 is located in the center left-turn lane 2210, the processor 170 may determine whether the vehicle 700 slows down or temporarily stops for left-turn.

For example, the processor 170 may determine a left-turn situation based on a travel routing to an input destination included in navigation information.

For example, the processor 170 may determine a left-turn situation based on input turn signal information in a state in which the vehicle 700 is located in a center left-turn lane.

The processor 170 may determine whether the vehicle 700 slows down or temporarily stops.

For example, the processor 170 may determine whether the vehicle 700 slows down or temporarily stops by detecting a prescribed object from the forward image or the around view image of the vehicle and tracking the detected object.

For example, the processor 170 may receive vehicle speed information from the sensing unit 760 or the controller 770 via the interface unit 130 and determine whether the vehicle 700 slows down or temporarily stops based on a vehicle speed.

Upon judging that the vehicle 700 slows down or temporarily stops for left-turn in a center left-turn lane, the processor 170 generates a control signal to turn off the ISG function.

In this case, the ISG function is not operated and operation of the power source does not stop even if an input to the brake pedal 721*d* is received in a state in which the vehicle 700 travels at a predetermined speed or less or stops and no input to the accelerator pedal 721*c* is received. For example, the power source may be continuously operated.

That is, when the vehicle 700 slows down or temporarily stops for left-turn in a center left-turn lane, the ISG function may not be turned on, even under an ISG function operating condition.

FIG. 22B differs from FIG. 22A as to detection of an opposite traveling vehicle 2220. The following description with reference to FIG. 22B will focus on this difference.

The processor 170 may detect an opposite traveling vehicle 2220 from a forward image in a state in which the vehicle 700 slows down or temporarily stops for left-turn in a center left-turn lane.

The processor 170 may detect an opposite traveling vehicle, a relative distance or speed relative to the vehicle 700 of which decreases, from the forward image of the vehicle.

Upon detection of the opposite traveling vehicle, the processor 170 generates a control signal to turn on the ISG function.

Figure 23A:
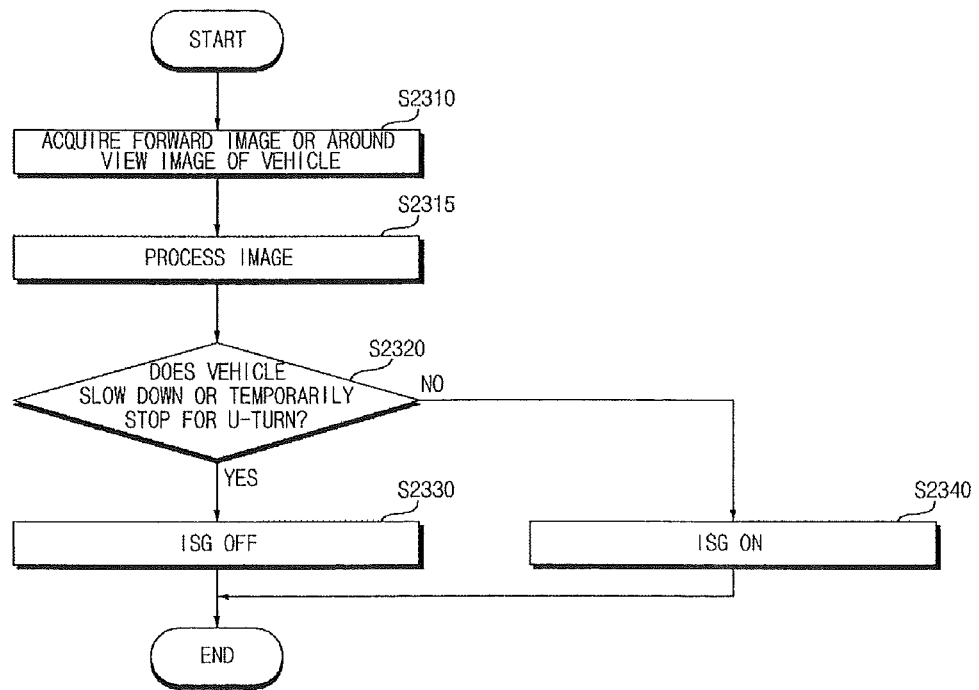
FIGS. 23A and 23B are flowcharts illustrating examples of operations of a driver assistance apparatus according to an eighth implementation.

FIG. 23A is a flowchart referenced to explain operation of the driver assistance apparatus according to an eighth implementation.

Referring to FIG. 23A, the processor 170 may acquire a forward image or an around view image of the vehicle via the camera 195 (S2310). Here, the camera 195 may be the camera as described above with reference to FIGS. 2A to 3C. In some implementations, three or more cameras 195 may be provided.

The camera 195 may capture a forward image or an around view image of the vehicle under control of the processor 170. The image captured by the camera 195 may include at least one object.

The camera 195 may capture an image of at least one of a traffic light, a traffic sign, and a road surface under control of the processor 170.

Once the forward image or the around view image of the vehicle has been acquired, the processor 170 may process the acquired forward image or the acquired around view image of the vehicle (S2315). The processor 170 detects an object from the forward image or the around view image of the vehicle. The processor 170 may detect information from the detected object. Here, the object may be at least one of a traffic light, a traffic sign and a road surface. In addition, the object may be at least one of a lane, an adjacent vehicle, a pedestrian, a light, and a traffic signal.

The information may be vehicle travel situation information. For example, the information may be U-turn information.

The processor 170 may detect a traffic sign from the forward image or the around view image of the vehicle. The processor 170 may detect a symbol or text from a traffic sign image. The processor 170 may detect U-turn information based on the detected symbol or text.

The processor 170 may detect a road surface from the forward image or the around view image of the vehicle. The processor 170 may detect a symbol or text from a road surface image. The processor 170 may detect U-turn information based on the detected symbol or text.

The processor 170 may verify U-turn information by comparing detected information with information stored in the memory 140.

The processor 170 may determine whether the vehicle 700 slows down or temporarily stops for U-turn in a U-turn lane (S2320).

The processor 170 may determine whether the vehicle 700 is located in a U-turn lane. The processor 170 detects information regarding a lane in which the vehicle 700 is located based on the forward image or the around view image of the processor 170. The processor 170 may determine whether the vehicle 700 is located in a U-turn lane based on the centerline of the lane information. Specifically, the processor 170 may determine that the vehicle 700 is located in a U-turn lane when the vehicle 700 is located in the lane closest to the centerline. The processor 170 may detect a yellow line among lines marked on a road surface and recognize the yellow line as the centerline.

The processor 170 may determine a U-turn situation of the vehicle 700 based on U-turn information and U-turn lane information detected based on a traffic sign or road surface image.

The processor 170 determines a U-turn situation based on navigation information or turn signal information.

For example, the processor 170 may determine a U-turn situation based on a travel routing to an input destination included in navigation information. Here, the processor 170 may receive navigation information from the AVN apparatus 400, the controller 770 or a separate navigation apparatus via the interface unit 130.

For example, the processor 170 may determine a U-turn situation based on turn signal information input in a state in which the vehicle 700 is located in a U-turn lane. Here, the processor 170 may receive turn signal information from the controller 770 via the interface unit 130. The turn signal information may be a turn-on signal of a turn signal for left-turn or right-turn input by the user. Upon receiving an input to turn on a left or right turn signal via the user input unit (724 in FIG. 7) of the vehicle 700, the processor 170 may receive turn signal information via the interface unit 130.

The processor 170 may determine whether the vehicle 700 slows down or temporarily stops. Here, slowing down is a condition that causes the ISG function to be turned on and may mean that the vehicle travels at a predetermined speed or less (e.g., 10 km/h or less). Here, temporary stop is a condition that causes the ISG function to be turned on and may mean that the vehicle stops during a short time (e.g., 1 second or less) and thereafter accelerates.

For example, the processor 170 may determine whether the vehicle 700 slows down or temporarily stops by detecting a prescribed object (e.g., a lane) from the forward image or the around view image of the vehicle and tracking the detected object. Specifically, the processor 170 may determine whether the vehicle 700 slows down or temporarily stops based on whether a relative distance or a speed relative to the detected object.

For example, the processor 170 may receive vehicle speed information from the sensing unit 760 or the controller 770 via the interface unit 130 and determine whether the vehicle slows down or temporarily stops based on a vehicle speed.

Upon judging that the vehicle 700 slows down or temporarily stops for U-turn in a U-turn lane, the processor 170 may generate a control signal to turn off the ISG function (S2330). The control signal may be provided to the controller 770.

Upon judging that the vehicle 700 is not located in a U-turn lane, the processor 170 may generate a control signal to turn on the ISG function (S2340). The control signal may be provided to the controller 770.

Upon judging that the vehicle 700 does not slow down or temporarily stop for U-turn even if the vehicle 700 is located in a U-turn lane, the processor 170 may generate a control signal to turn on the ISG function (S2340). The control signal may be provided to the controller 770.

Generally, when an input to the brake pedal 721*d* is received in a state in which the vehicle travels at a predetermined speed or less or stops and no input to the accelerator pedal 721*c* is received, the ISG function is turned on to stop operation of the power source. However, according to the eighth implementation, when the vehicle 700 slows down or temporarily stops for U-turn in a U-turn lane, the ISG function is not turned on even under an ISG function operating condition. This has the effect of preventing travel delay caused when the ISG function is unintentionally turned on, thereby preventing a collision accident with a vehicle in an opposite lane.

Figure 23B:
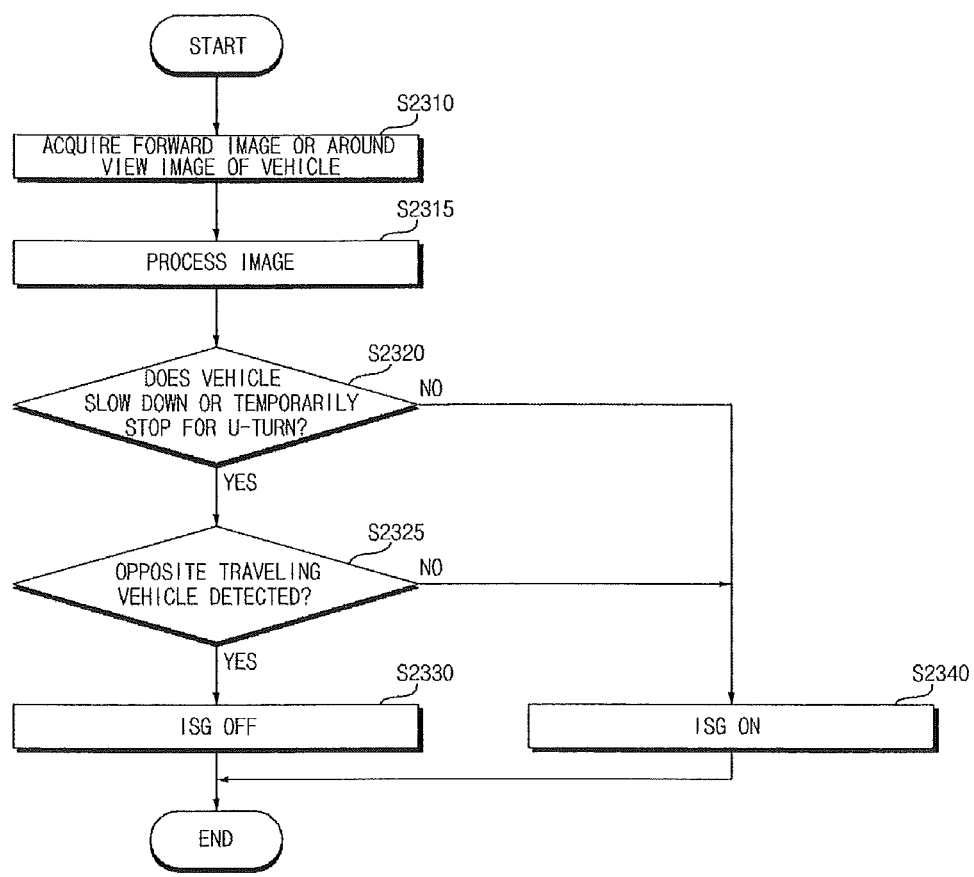

FIG. 23B further illustrates a step of detecting ab opposite traveling vehicle (S2325) between Step S2320 and S2330 or S2340 as compared to FIG. 23A.

In a state in which the vehicle 700 slows down or temporarily stops for U-turn in a U-turn lane, the processor 170 may detect an opposite traveling vehicle from a forward image of the vehicle (S2325). The processor 170 may detect the opposite traveling vehicle, a relative distance or a speed relative to the vehicle 700 of which decreases, from the forward image of the vehicle.

Upon detecting the opposite traveling vehicle, the processor 170 generates a control signal to turn on the ISG function (S2340). It is necessary to turn on the ISG function so as to stop operation of the power source upon detection of the opposite traveling vehicle because making a U-turn in an OFF state of the ISG function despite the presence of the opposite traveling vehicle may cause accidents.

When no opposite traveling vehicle is detected, the processor 170 may generate a control signal to turn off the ISG function (S2330).

Figure 23C:
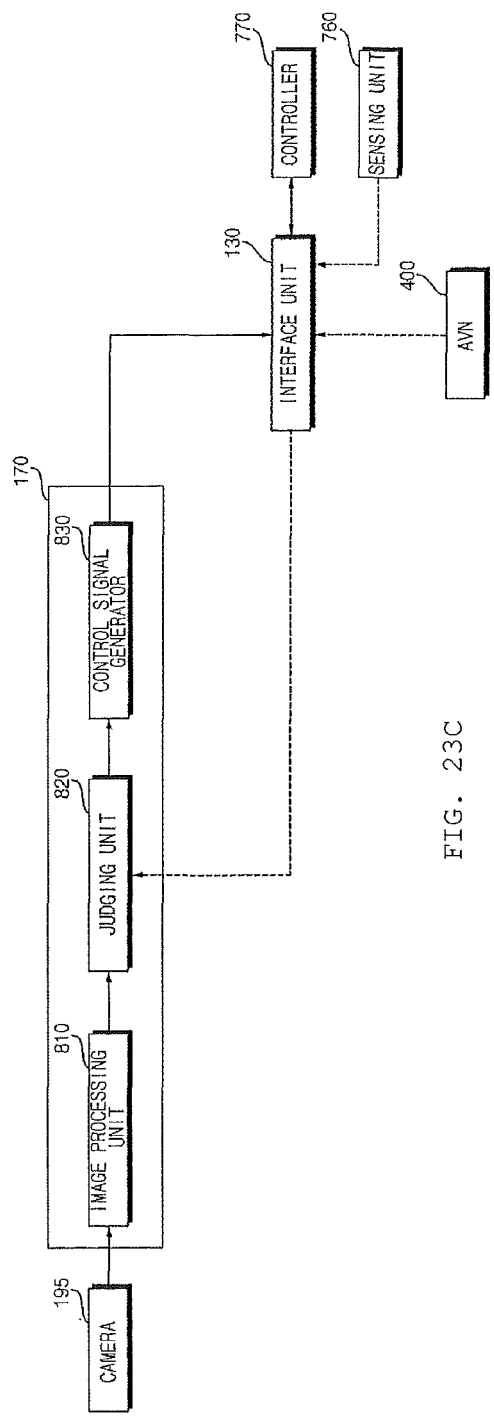
FIG. 23C is a block diagram illustrating an example of details of a processor according to the eighth implementation.

FIG. 23C is a detailed block diagram of the processor according to the eighth implementation.

Referring to FIG. 23C, the processor 170 may include the image processing unit 810, the judging unit 820, and the control signal generator 830.

The image processing unit 810 may process a forward image or an around view image of the vehicle acquired via the camera 195. The image processing unit 810 may detect an object based on the forward image or the around view image of the vehicle. The image processing unit 810 may detect information from the detected object. Here, the object may be at least one of a traffic light, a traffic sign, and a road surface. In addition, the object may be at least one of a lane, an adjacent vehicle, a pedestrian, a light, and a traffic signal.

The information may be vehicle travel situation information. For example, the information may be U-turn information.

The image processing unit 810 may detect ca traffic sign or a road surface from the forward image or the around view image of the vehicle. The image processing unit 810 may detect a symbol or text from the traffic sign image or the road surface image. The image processing unit 810 may detect U-turn information based on the detected symbol or text.

The judging unit 820 may determine whether the vehicle 700 is located in a U-turn lane. The image processing unit 810 detects information regarding a lane in which the vehicle 700 is located based on the forward image or the around view image of the processor 170. The processor 170 may determine whether the vehicle 700 is located in a U-turn lane based on the centerline of the lane information. Specifically, the processor 170 may determine that the vehicle 700 is located in a U-turn lane when the vehicle 700 is located in the lane closest to the centerline.

The judging unit 820 may determine a U-turn situation of the vehicle 700 based on U-turn information and U-turn lane information detected based on a traffic sign or road surface image.

The judging unit 820 may determine a U-turn situation based on a travel routing to an input destination included in navigation information.

The judging unit 820 may determine a U-turn situation based on turn-signal information input in a state in which the vehicle 700 is located in a U-turn lane.

The judging unit 820 may determine whether the vehicle 700 slows down or temporarily stops.

For example, the judging unit 820 may determine whether the vehicle 700 slows down or temporarily stops by detecting a prescribed object (e.g., a lane) from the forward image or the around view image of the vehicle and tracking the detected object. Specifically, the processor 170 may determine whether the vehicle 700 slows down or temporarily stops based on whether a relative distance or a speed relative to the detected object.

For example, the judging unit 820 may receive vehicle speed information from the sensing unit 760 or the controller 770 via the interface unit 130 and determine whether the vehicle slows down or temporarily stops based on a vehicle speed.

The control signal generator 830 may generate a control signal to turn the ISG function on or off based on a determined result of the judging unit 820.

When the determined result of the judging unit 820 is that the vehicle 700 slows down or temporarily stops for U-turn in a U-turn lane, the control signal generator 830 generates a control signal to turn off the ISG function.

When the determined result of the judging unit 820 is judging that the vehicle 700 is not located in a U-turn lane, the control signal generator 830 generates a control signal to turn on the ISG function.

When the determined result of the judging unit 820 is that the vehicle 700 does not slow down or temporarily stop for U-turn even if the vehicle 700 is located in a U-turn lane, the control signal generator 830 generates a control signal to turn on the ISG function.

When the determined result of the judging unit 820 is that an opposite traveling vehicle is detected even if the vehicle 700 slows down or temporarily stops for U-turn in a U-turn lane, the control signal generator 830 generates a control signal to turn on the ISG function.

The control signal generated in the control signal generator 830 may be provided to the controller 770. In this case, the control signal generator 830 may output the control signal to the controller 770 via the interface unit 130.

Figure 24A:
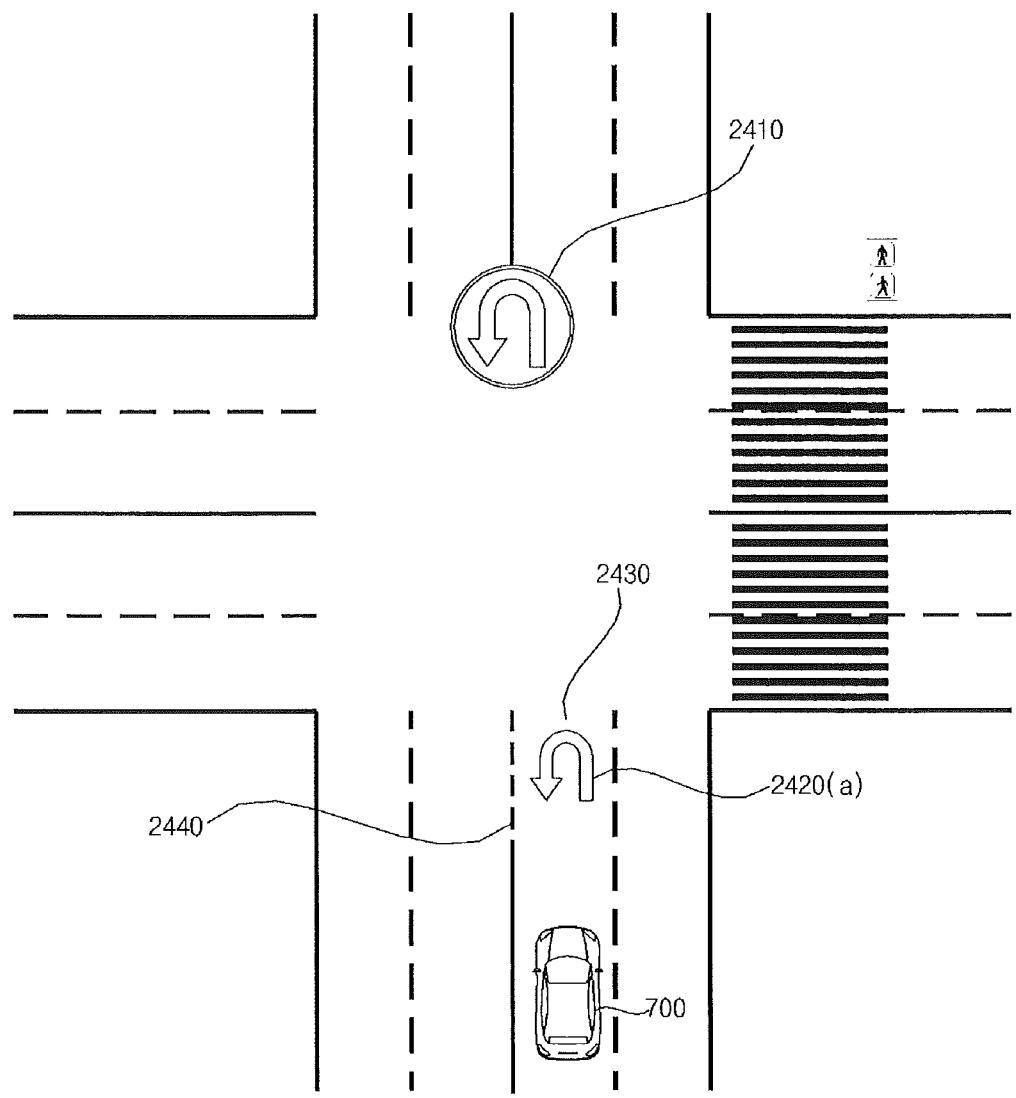
FIGS. 24A and 24B are diagrams illustrating examples of operations of a driver assistance apparatus when a vehicle slows down or temporarily stops for U-turn in a U-turn lane according to the eighth implementation.
Figure 24B:
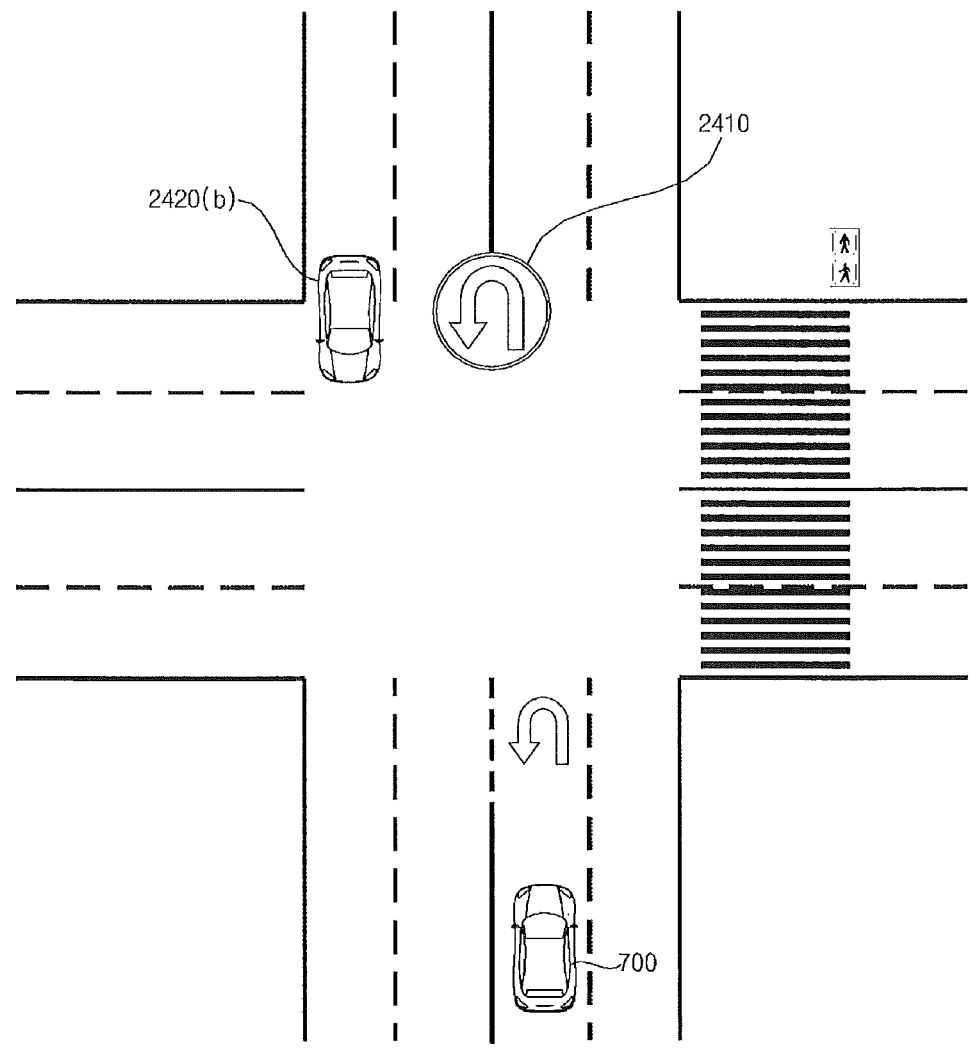

FIGS. 24A and 24B are views referenced to explain the driver assistance apparatus when the vehicle slows down or temporarily stops in a U-turn lane for U-turn according to the eighth implementation. FIGS. 24A and 24B illustrate bird's eye views.

Referring to FIG. 24A, the processor 170 acquires a forward image or an around view image of the vehicle via the camera 195.

The processor 170 may detect center left-turn lane information based on a traffic light, a traffic sign 2410, or a road surface included in the forward image or the around view image of the vehicle.

The processor 170 may detect the traffic sign 2410 or a road surface from the forward image or the around view image of the vehicle. The processor 170 may detect a picture or text 2420(a) from a traffic sign image or a road surface image. The processor 170 may detect U-turn information based on the detected picture or text.

The processor 170 may determine whether the vehicle 700 is located in a U-turn lane 2430. The processor 170 detects information regarding a lane in which the vehicle 700 is located based on the forward image or the around view image of the processor 170. The processor 170 may determine whether the vehicle 700 is located in a U-turn lane based on the centerline 2440 of the lane information. Specifically, the processor 170 may determine that the vehicle 700 is located in the U-turn lane 2430 when the vehicle 700 is located in the lane closest to the centerline 2440 among travel lanes.

The processor 170 may determine a U-turn situation of the vehicle 700 based on U-turn information and U-turn lane information detected based on a traffic sign or road surface image.

For example, the processor 170 may determine a U-turn situation based on a travel routing to an input destination included in navigation information.

For example, the processor 170 may determine a U-turn situation based on turn-signal information input in a state in which the vehicle 700 is located in a U-turn lane.

The processor 170 may determine whether the vehicle 700 slows down or temporarily stops.

For example, the processor 170 may determine whether the vehicle 700 slows down or temporarily stops by detecting a prescribed object (e.g., a lane) from the forward image or the around view image of the vehicle and tracking the detected object.

For example, the processor 170 may receive vehicle speed information from the sensing unit 760 or the controller 770 via the interface unit 130 and determine whether the vehicle slows down or temporarily stops based on a vehicle speed.

Upon judging that the vehicle 700 slows down or temporarily stops for U-turn in a U-turn lane, the processor 170 generates a control signal to turn off the ISG function.

In this case, the ISG function is not operated. As such, even if an input to the brake pedal 721d is received in a state in which the vehicle travels at a predetermined speed or less or stops and no input to the accelerator pedal 721c is received, operation of the power source does not stop. For example, the power source may be continuously operated.

That is, in the case where the vehicle 700 slows down or temporarily stops for U-turn in a U-turn lane, the ISG function may not be operated, even under an ISG function operating condition.

FIG. 24B differs from FIG. 24A as to detection of an opposite traveling vehicle 2420(b). The following description with reference to FIG. 24B will focus on this difference.

The processor 170 may detect an opposite traveling vehicle 2220 from a forward image in a state in which the vehicle 700 slows down or temporarily stops for left-turn in a center left-turn lane.

The processor 170 may detect an opposite traveling vehicle, a relative distance or a speed relative to the vehicle 700 of which decreases, from the forward image of the vehicle.

Upon detection of the opposite traveling vehicle, the processor 170 generates a control signal to turn on the ISG function.

As is apparent from the above description, the implementation described above may have one or more of the following effects.

First, the on/off of an ISG function may be controlled based on traffic information, detected from an image captured by a camera, or received navigation information. This has the effect of enabling precise control of the on/off of the ISG function.

Second, the on/off of the ISG function may be controlled based on traffic information detected from camera images of, for example, a traffic light, a traffic sign, a road surfaces. This has the effect of enabling more precise control of the on/off of the ISG function via acquisition of real-time vehicle situation information.

Third, the ISG function may be turned off when a vehicle slows down or temporarily stops to join a main road via a ramp. This has the effect of assisting the vehicle in rapidly joining the main road, thereby preventing traffic accidents.

Fourth, the ISG function may be turned off when a vehicle slows down or temporarily stops to go straight or turn to the left when a vehicle traffic light outputs a go signal at a crossroad. This has the effect of reducing side effects such as traveling delay caused as the ISG function is unnecessarily turned on.

Fifth, recognition of current vehicle situation information including GPS information or turn signal information has the effect of enabling accurate situation judgment.

Sixth, recognition of current vehicle situation information including information regarding a preceding vehicle that is traveling or stationary has the effect of enabling accurate situation judgment.

Seventh, there is the effect of providing more pleasant traveling environments by sufficiently reflecting the vehicle driver's intention.

The methods, techniques, systems, and apparatuses described herein may be implemented in digital electronic circuitry or computer hardware, for example, by executing instructions stored in tangible computer-readable storage media.

Apparatuses implementing these techniques may include appropriate input and output devices, a computer processor, and/or tangible computer-readable storage media storing instructions for execution by a processor.

A process implementing techniques disclosed herein may be performed by a processor executing instructions stored on a tangible computer-readable storage medium for performing desired functions by operating on input data and generating appropriate output. Suitable processors include, by way of example, both general and special purpose microprocessors. Suitable computer-readable storage devices for storing executable instructions include all forms of non-volatile memory, including, by way of example, semiconductor memory devices, such as Erasable Programmable Read-Only Memory (EPROM), Electrically Erasable Programmable Read-Only Memory (EEPROM), and flash memory devices; magnetic disks such as fixed, floppy, and removable disks; other magnetic media including tape; and optical media such as Compact Discs (CDs) or Digital Video Disks (DVDs). Any of the foregoing may be supplemented by, or incorporated in, specially designed application-specific integrated circuits (ASICs).

Although the operations of the disclosed techniques may be described herein as being performed in a certain order and/or in certain combinations, in some implementations, individual operations may be rearranged in a different order, combined with other operations described herein, and/or eliminated, and desired results still may be achieved. Similarly, components in the disclosed systems may be combined in a different manner and/or replaced or supplemented by other components and desired results still may be achieved.

What is claimed is:

1. A driver assistance apparatus included in a vehicle having an Idle Stop and Go (ISG) function that is turned on based at least in part on a condition comprising a vehicle speed, whether an acceleration input has been received, and whether a brake input has been received, the apparatus comprising:
    at least one camera; and
    at least one processor configured to:
        acquire, through the at least one camera, at least one image comprising at least one of a forward image or an around view image of the vehicle;
        detect information from the at least one image; and
        provide at least one control signal for turning off the ISG function based on the detected information, even when the condition is satisfied,
    wherein the condition being satisfied comprises the brake input being received in a state in which the vehicle speed is less than or equal to a threshold speed with no acceleration input being received,
    wherein the camera is configured to acquire the at least one image of at least one of a traffic light, a traffic sign, or a road surface,
    wherein the at least one processor is further configured to:
        detect, from the acquired at least one image, information regarding the at least one of the traffic light, the traffic sign, or the road surface, wherein the information comprises ramp information regarding an on-ramp on which the vehicle travels to join a main road,
    wherein the on-ramp is a sloping road junction that connects a first road at a first elevation with a second road at a second elevation different from the first elevation,
    wherein the at least one processor is further configured to:
        detect a side portion of a second vehicle from the acquired at least one image;
        determine whether the vehicle temporarily stops after entering the on-ramp based on the detected side portion of the second vehicle;
        determine whether a preceding vehicle is detected from the at least one image;
        determine whether the detected preceding vehicle is stationary based on a stop lamp of the detected preceding vehicle;
        provide, based on the preceding vehicle being detected and the detected preceding vehicle determined as being stationary, the at least one control signal to turn on the ISG function; and
        provide, based on the preceding vehicle not being detected or the detected preceding vehicle determined as being traveling, the at least one control signal to turn off the ISG function, and
    wherein the at least one processor is further configured to:
        provide the at least one control signal to turn off the ISG function based on the vehicle being a Left Hand Drive (LHD) vehicle and slowing down or temporarily stopping for a right-turn, or based on the vehicle being a Right Hand Drive (RHD) vehicle and slowing down or temporarily stopping for a left-turn; and
        provide the at least one control signal to turn off the ISG function based on detecting a pedestrian stop signal from the pedestrian traffic light detected from the at least one image.

2. The apparatus according to claim 1, wherein the at least one processor is further configured to receive, through an interface unit, navigation information, and
    wherein the at least one processor is configured to provide the at least one control signal for turning off the ISG function further based on the navigation information, even when the condition is satisfied.

3. The apparatus according to claim 2, wherein the at least one processor is further configured to acquire the ramp information based on the navigation information.

4. The apparatus according to claim 1, wherein the at least one processor is further configured to acquire the ramp information from the traffic sign in the acquired at least one image.

5. The apparatus according to claim 1, wherein the LHD vehicle is configured to join the main road from the on-ramp via a right-turn, and
    wherein the RHD vehicle is configured to join the main road from the on-ramp via a left-turn.

6. The apparatus according to claim 1, wherein the at least one processor is further configured to provide the at least one control signal to turn off the ISG function based on the vehicle slowing down or temporarily stopping in a state in which stop information indicating temporary stop is detected from the detected traffic sign while the vehicle travels on a road around a crossroad provided with no traffic light, or a stop line indicating temporary stop is detected from the detected road surface.

7. The apparatus according to claim 6, wherein the at least one processor is further configured to provide the at least one control signal to turn off the ISG function upon detecting the stop line at least a threshold number of times.

8. The apparatus according to claim 6, wherein the at least one processor is further configured to receive, through an interface unit, navigation information, and
    wherein the at least one processor is further configured to determine whether the vehicle travels on the road around the crossroad provided with no traffic light based on the navigation information.

9. The apparatus according to claim 1, wherein the at least one processor is further configured to provide the at least one control signal to turn off the ISG function based on the vehicle slowing down or temporarily stopping on a road without lane marks.

10. The apparatus according to claim 9, wherein the at least one processor is further configured to:
    determine whether a lane mark is detected from the at least one image including the road surface; and
    based on a determination that a lane mark is not detected from the at least one image, determine that the vehicle travels on the road without lane marks.

11. The apparatus according to claim 9, wherein the at least one processor is further configured to received, through an interface unit, navigation information, and
wherein the at least one processor is further configured to determine whether the vehicle travels on the road without lane marks based on the navigation information.

12. The apparatus according to claim 1, wherein the at least one processor is further configured to provide the at least one control signal to turn off the ISG function upon detecting go information from the traffic light detected from the at least one image based on the vehicle slowing down toward a crossroad or temporarily stopping in front of the crossroad.

13. The apparatus according to claim 12, wherein the at least one processor is further configured to:
detect the preceding vehicle from the forward image of the vehicle;
detect go information from the traffic light detected from the at least one image; and
provide the at least one control signal to turn off the ISG function based on the preceding vehicle traveling.

14. The apparatus according to claim 1, wherein the at least one processor is further configured to receive, through an interface unit, navigation information, and
wherein the at least one processor is further configured to:
determine that the vehicle is traveling at a crossroad based on the at least one image acquired by the camera or based on the navigation information; and
provide the at least one control signal to turn off the ISG function based on the vehicle traveling at the crossroad.

15. The apparatus according to claim 1, wherein the at least one processor is further configured to receive, through an interface unit, the navigation information or turn signal information, and
wherein the at least one processor is further configured to:
determine a right-turn or left-turn situation based on the navigation information, or
determine the right-turn or left-turn situation upon receiving the turn-signal information for right-turn or left-turn in a state in which the vehicle is located close to a crossroad.

16. The apparatus according to claim 1, wherein the at least one processor is further configured to:
detect the preceding vehicle from the forward image of the vehicle; and
provide the at least one control signal to turn on the ISG function based upon detecting that the stop lamp of the detected preceding vehicle is in an ON state.

17. The apparatus according to claim 1, wherein the at least one processor is further configured to:
determine a parking situation; and
provide the at least one control signal to turn off the ISG function based on information regarding the determined parking situation.

18. The apparatus according to claim 17, wherein the at least one processor is further configured to:
detect parking lot information from a traffic sign or a road surface detected from the at least one image; and
determine the parking situation based on the detected parking lot information.

19. The apparatus according to claim 18, wherein the at least one processor is further configured to:
detect a parking space from the detected road surface; and
detect the parking lot information based on the detected parking space.

20. The apparatus according to claim 17, wherein the at least one processor is further configured to receive, through an interface unit, vehicle speed information, steering wheel rotation angle information, or gearshift information, and
wherein the at least one processor is further configured to:
determine whether a parking operation is performed based on the vehicle speed information, the steering wheel rotation angle information, or the gearshift information; and
determine the parking situation based on whether implementation of the parking operation is detected.

21. The apparatus according to claim 17, wherein the at least one processor is further configured to receive, through an interface unit, user input to begin an automated parking mode,
wherein the at least one processor is further configured to determine the parking situation based on the user input.

22. The apparatus according to claim 17, wherein the at least one processor is further configured to determine the parking situation based on whether the vehicle is located in a parking lot among the navigation information.

23. The apparatus according to claim 1, wherein the at least one processor is further configured to provide the at least one control signal to turn off the ISG function based on the vehicle being an LHD vehicle and the LHD vehicle slowing down or temporarily stopping for a left-turn without presence of a traffic light, and
wherein the at least one processor is further configured to provide the at least one control signal to turn off the ISG function based on the vehicle being an RHD vehicle and the RHD vehicle slowing down or temporarily stopping for a right-turn without presence of the traffic light.

24. The apparatus according to claim 23, wherein the at least one processor is further configured to receive, through an interface unit, navigation information or turn signal information,
wherein the at least one processor is further configured to determine a left-turn without the presence of a traffic light situation or a right-turn without the presence of the traffic light situation based on at least one of a traffic sign detected from the at least one image, the navigation information, or the turn signal information.

25. The apparatus according to claim 1, wherein the traffic light includes the pedestrian traffic light, and
wherein the at least one processor is further configured to, based on the vehicle being an LHD vehicle and making a left-turn without presence of the traffic light, or based on the vehicle being an RHD vehicle and making a right-turn without presence of the traffic light, provide the at least one control signal to turn off the ISG function upon detecting pedestrian go information from the at least one image including the pedestrian traffic light as the vehicle makes the left-turn or the right-turn without the presence of the traffic light.

26. The apparatus according to claim 1, wherein the at least one processor is further configured to provide the at least one control signal to turn off the ISG function based on the vehicle slowing down or temporarily stopping for a left-turn in a center left-turn lane.

27. The apparatus according to claim 26, wherein the at least one processor is further configured to:
detect a center left-turn lane from the at least one image; and
determine whether the vehicle is located in the center left-turn lane based on the detected center left-turn lane.

28. The apparatus according to claim 27, wherein the at least one processor is further configured to receive, through an interface unit, turn signal information, and wherein the at least one processor is configured to provide the at least one control signal to turn off the ISG function upon receiving turn signal information for a left-turn in a state in which the center left-turn lane is detected.

29. The apparatus according to claim 1, wherein the at least one processor is further configured to receive, through an interface unit, traffic light change information acquired from an external server, and wherein the at least one processor is further configured to provide the at least one control signal to turn off the ISG function based on the information and the traffic light change information.

30. A vehicle comprising the driver assistance apparatus according to claim 1.

31. The apparatus according to claim 1, wherein the at least one processor is further configured to receive, through interface means, navigation information, and wherein the at least one processor is configured to provide the at least one control signal for turning off the ISG function further based on the navigation information, even when the condition is satisfied.

32. A control method of a driver assistance apparatus included in a vehicle having an Idle Stop and Go (ISG) function that is turned on based at least in part on a condition comprising a vehicle speed, whether an acceleration input has been received, and whether a brake input has been received, the method comprising:

acquiring at least one image comprising at least one of a forward image or an around view image of the vehicle via at least one camera;

detecting information from the at least one image; and providing at least one control signal for turning off the ISG function based on the detected information, even when the condition is satisfied, wherein the condition being satisfied comprises the brake input being received in a state in which the vehicle speed is less than or equal to a threshold speed with no acceleration input being received, wherein the camera is configured to acquire the at least one image of at least one of a traffic light, a traffic sign, or a road surface, wherein detecting the information from the at least one image comprises detecting, from the acquired at least one image, information regarding the at least one of the traffic light, the traffic sign, or the road surface, the information comprising ramp information regarding an on-ramp on which the vehicle travels to join a main road, wherein the on-ramp is a sloping road junction that connects a first road at a first elevation with a second road at a second elevation different from the first elevation, wherein the method further comprises:

detecting a side portion of a second vehicle from the acquired at least one image;

determining whether the vehicle temporarily stops after entering the on-ramp based on the detected side portion of the second vehicle;

determining whether a preceding vehicle is detected from the at least one image;

determining whether the detected preceding vehicle is stationary based on a stop lamp of the detected preceding vehicle;

providing, based on the preceding vehicle being detected and the detected preceding vehicle determined as being stationary, the at least one control signal to turn on the ISG function; and providing, based on the preceding vehicle not being detected or the detected preceding vehicle determined as being traveling, the at least one control signal to turn off the ISG function, and wherein the method further comprises:

providing the at least one control signal to turn off the ISG function based on the vehicle being a Left Hand Drive (LHD) vehicle and slowing down or temporarily stopping for a right-turn, or based on the vehicle being a Right Hand Drive (RHD) vehicle and slowing down or temporarily stopping for a left-turn; and providing the at least one control signal to turn off the ISG function based on detecting a pedestrian stop signal from the pedestrian traffic light detected from the at least one image.

* * * * *